US 6,733,675 B2

(12) United States Patent
Ando et al.

(10) Patent No.: US 6,733,675 B2
(45) Date of Patent: *May 11, 2004

(54) SPIRAL WOUND MEMBRANE ELEMENT, SPIRAL WOUND MEMBRANE MODULE AND TREATMENT SYSTEM EMPLOYING THE SAME AS WELL AS RUNNING METHOD AND WASHING METHOD THEREFOR

(75) Inventors: Masaaki Ando, Ibaraki (JP); Satoru Ishihara, Ibaraki (JP); Katsumi Ishii, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 276 days.

This patent is subject to a terminal disclaimer.

(21) Appl. No.: 09/907,762

(22) Filed: Jul. 18, 2001

(65) Prior Publication Data
US 2002/0027111 A1 Mar. 7, 2002

(30) Foreign Application Priority Data

Jul. 18, 2000 (JP) .................................. 2000-217939
Jul. 18, 2000 (JP) .................................. 2000-217940
Jul. 18, 2000 (JP) .................................. 2000-217941

(51) Int. Cl.$^7$ ................................................ C02F 1/44
(52) U.S. Cl. .................. 210/636; 210/321.74; 210/650; 210/321.83; 210/433.1; 210/433.01; 210/652
(58) Field of Search ............................... 210/636, 321.76

(56) References Cited

U.S. PATENT DOCUMENTS

| 5,843,351 | A | * | 12/1998 | Hirose et al. |
| 6,001,254 | A | | 12/1999 | Espenan et al. |
| 6,024,873 | A | * | 2/2000 | Hirose et al. |
| 6,190,557 | B1 | * | 2/2001 | Hisada et al. |
| 6,402,956 | B1 | * | 6/2002 | Andou et al. |
| 6,432,310 | B1 | * | 8/2002 | Andou et al. |
| 6,533,937 | B1 | * | 3/2003 | Adachi et al. |
| 2002/0060193 | A1 | | 5/2002 | Ando |

FOREIGN PATENT DOCUMENTS

| EP | 1 022 050 A2 | 7/2000 |
| JP | 6-98276 A | 10/1990 |
| JP | 10-192850 | 7/1998 |
| JP | 10-225626 A | 8/1998 |
| JP | 10-296060 | 11/1998 |
| JP | 2000-070685 | 3/2000 |
| JP | 2000-271454 A | 10/2000 |
| JP | 2000-271461 A | 10/2000 |
| JP | 2001-029756 A | 2/2001 |
| JP | 2001-029756 | 2/2001 |
| JP | 2001-113140 A | 4/2001 |
| JP | 2001-179058 | 7/2001 |

* cited by examiner

Primary Examiner—Ana Fortuna
(74) Attorney, Agent, or Firm—Akin Gump Strauss Hauer & Feld, L.L.P.

(57) ABSTRACT

A spiral wound membrane module comprises a spiral wound membrane element including a separation membrane having high back pressure strength. In filtration running, raw water introduced from a raw water inlet of a pressure vessel is subjected to dead end filtration, and permeate is taken out from a permeate outlet. In washing, wash water containing a chemical having a contaminant separating function is introduced from an end of a water collection pipe through the permeate outlet for performing back wash reverse filtration with a back pressure of 0.05 to 0.3 MPa. The filtration running is temporarily stopped for maintaining the pressure vessel in a state sealed with the raw water and the permeate for a prescribed time. Thus, contaminants adhering to the membrane surface of the spiral wound membrane element are separated. A treatment system is formed by connecting units comprising spiral wound membrane modules in parallel with each other. In the treatment system, one of the units is subjected to filtration running when another one of the units is washed. In washing, back wash reverse filtration and chemical soaking are performed.

37 Claims, 10 Drawing Sheets

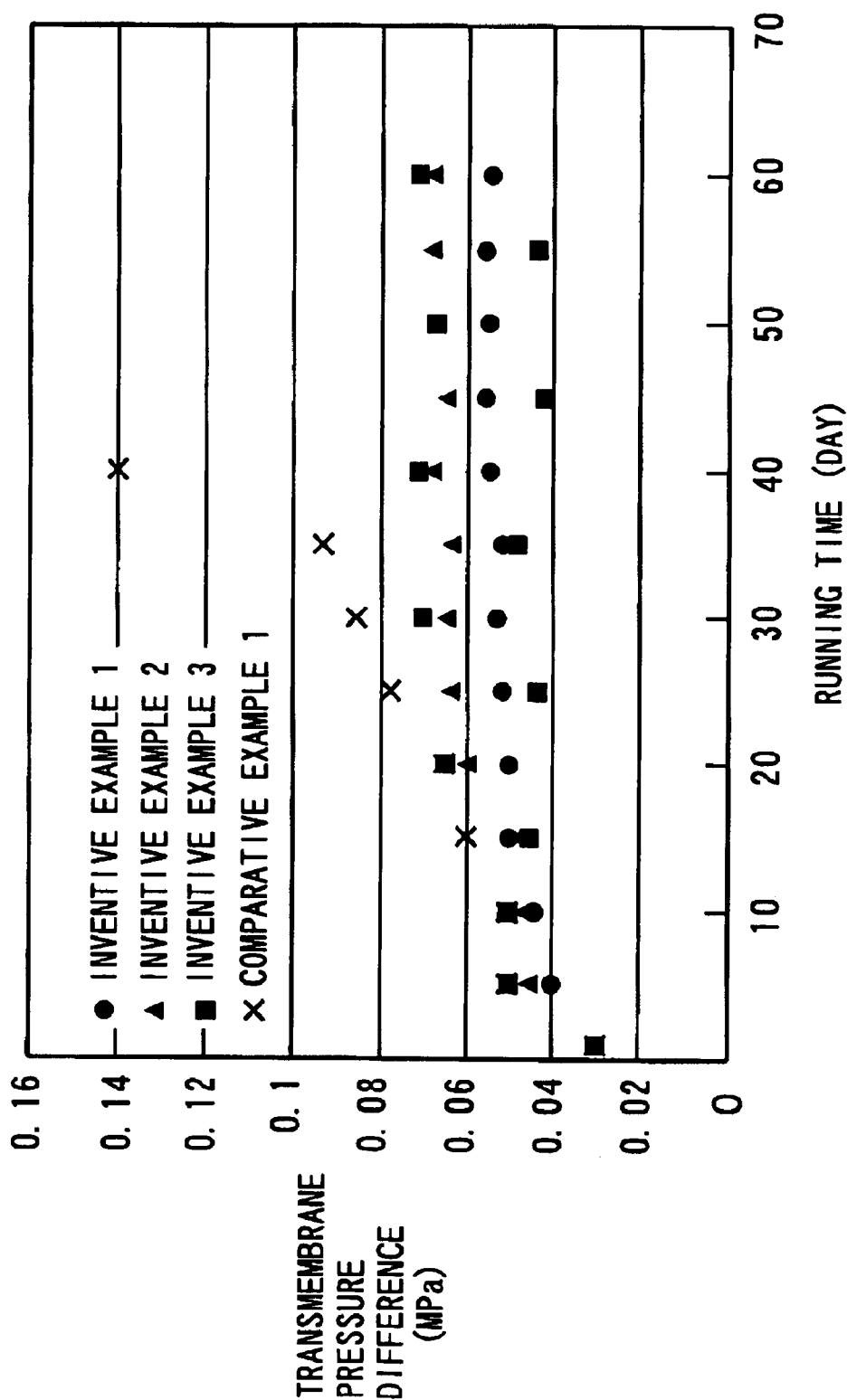

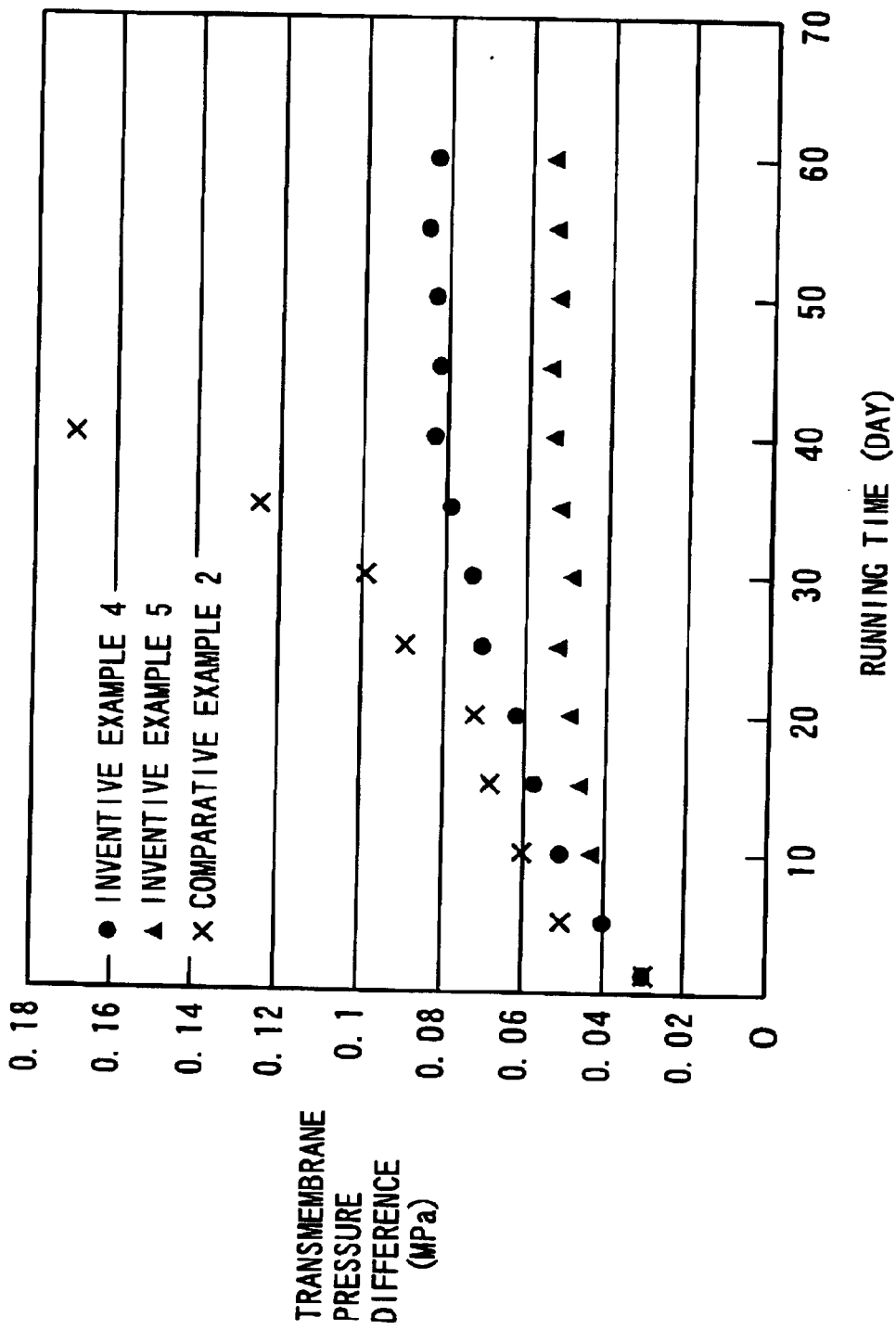

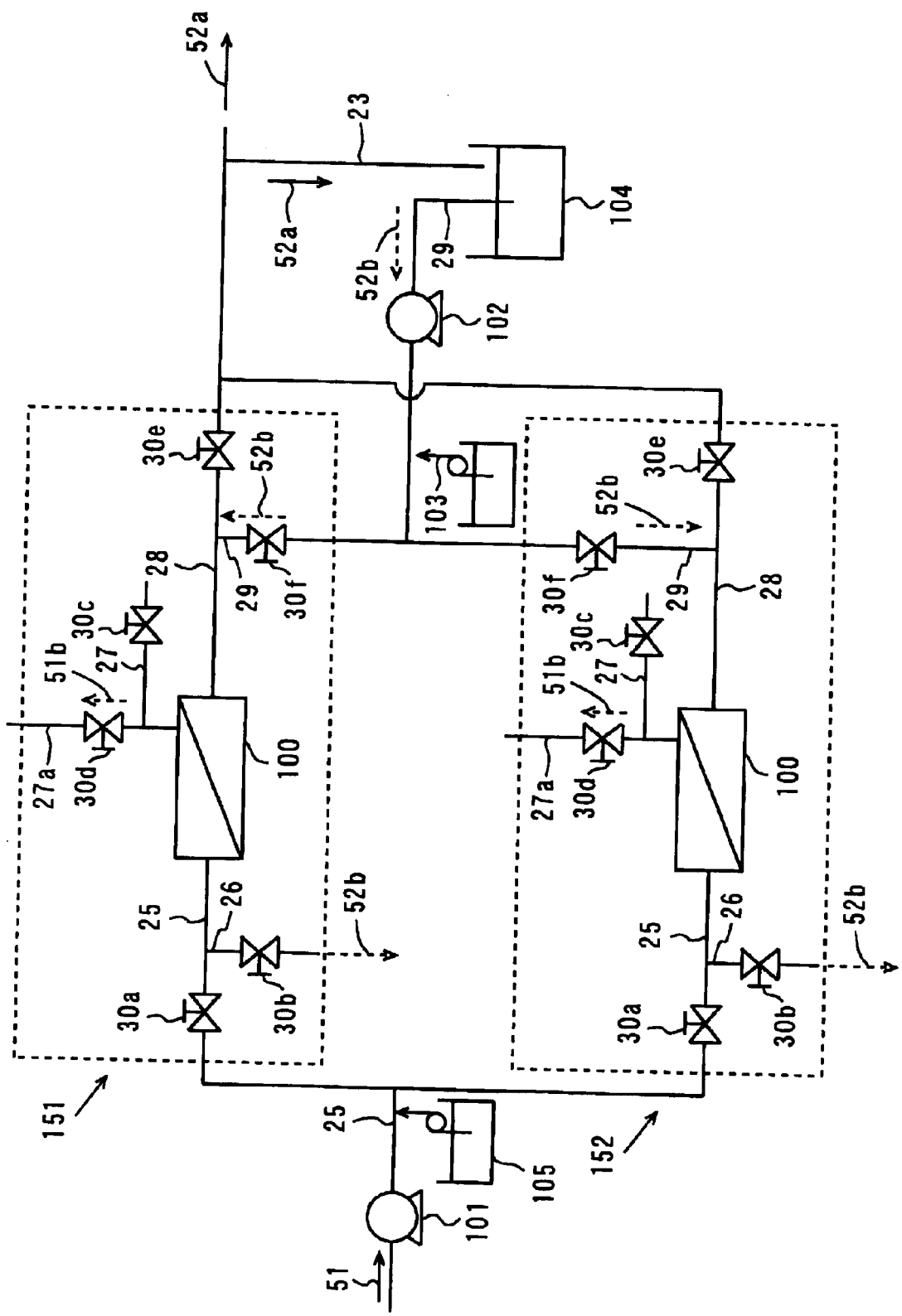

SPIRAL WOUND MEMBRANE ELEMENT, SPIRAL WOUND MEMBRANE MODULE AND TREATMENT SYSTEM EMPLOYING THE SAME AS WELL AS RUNNING METHOD AND WASHING METHOD THEREFOR

BACKGROUND OF THE INVENTION

1. Field of the Invention

The present invention relates to a running method and a washing method for a spiral wound membrane element and a spiral wound membrane module employed for a membrane separator such as a reverse osmosis membrane separator, an ultrafiltration membrane separator or a microfiltration membrane separator as well as a treatment system employing the same and a running method therefor.

2. Description of the Prior Art

Application of membrane separation is recently spread to water purification and waste water treatment, so that membrane separation is applied to hardly treatable liquid quality. In particular, recovery and recycling of industrial waste water through membrane separation is strongly demanded.

A hollow fiber membrane element is generally employed for such membrane separation in consideration of the membrane area (volumetric efficiency) per unit volume. However, the membrane of the hollow fiber membrane element is readily broken, and raw water is disadvantageously mixed into permeate to reduce separation performance when the membrane is broken.

Therefore, application of a spiral wound membrane element in place of the hollow fiber membrane element is proposed. The spiral wound membrane element can advantageously provide a large membrane area per unit volume similarly to the hollow fiber membrane element and maintain separation performance, and has high reliability.

When waste water containing a large amount of suspended, colloidal or dissolved matter is subjected to membrane separation, the suspended, colloidal or dissolved matter is deposited on a membrane surface as contaminants to reduce the water permeation velocity. Particularly in dead end filtration, contaminants are so readily deposited on the membrane surface that the water permeation velocity is remarkably reduced and it is difficult to continue stable filtration running.

In order to prevent the membrane surface from deposition of contaminants, cross flow filtration is performed. In this cross flow filtration, raw water is fed in parallel with the membrane surface for preventing the membrane surface from deposition of contaminants through shearing force caused on the interface between the membrane surface and the fluid. In such cross flow filtration, a sufficient membrane surface linear velocity must be obtained for preventing the membrane surface from deposition of contaminants, and hence a sufficient flow rate of raw water must be fed in parallel with the membrane surface. When the flow rate of the raw water fed in parallel with the membrane surface is increased, however, the recovery per spiral wound membrane element is reduced and a large pump is required for feeding the raw water, while the system cost is remarkably increased.

On the other hand, contaminants deposited on the membrane surface may be removed by back wash reverse filtration. This back wash reverse filtration is generally performed in a hollow fiber membrane element.

For example, Japanese Patent Publication No. 6-98276 (1994) proposes application of back wash reverse filtration to a spiral wound membrane element. However, back pressure strength of a separation membrane of a conventional spiral wound membrane element is so low that the separation membrane may be broken when subjected to a back pressure in back wash reverse filtration. Therefore, the aforementioned gazette states that the spiral wound membrane element is preferably subjected to back wash reverse filtration with a low back pressure of 0.1 to 0.5 $kgf/cm^2$ (0.01 to 0.05 MPa).

According to an experiment made by the inventor, however, it was difficult to sufficiently remove contaminants when a spiral wound membrane element was subjected to back wash reverse filtration with such a back pressure, and it was impossible to maintain a high permeate flux over a long period.

The inventor has proposed a structure of and a method of preparing a separation membrane having back pressure strength of at least 2 $kgf/cm^2$ in Japanese Patent Laying-Open No. 10-225626 (1998). However, it has not been sufficiently verified in relation to a spiral wound membrane element prepared with the separation membrane having such back pressure strength as to the level of a back pressure enabling back wash reverse filtration in practice and the range of the back pressure for back wash reverse filtration enabling the spiral wound membrane element to maintain a high permeate flux over a long period. Further, no verification has been made on a method of running a spiral wound membrane element including the aforementioned separation membrane having high back pressure strength and a method of running a spiral wound membrane module comprising such a spiral wound membrane element.

Also when the separation membrane having high back pressure strength is employed, stable filtration running cannot be performed in a spiral wound membrane element and a spiral wound membrane module without reducing the permeate flux over a long period unless optimum washing conditions and an optimum washing method are applied and the filtration running is performed by an optimum method.

SUMMARY OF THE INVENTION

An object of the present invention is to provide a running method and a washing method for a spiral wound membrane element and a spiral wound membrane module capable of performing stable filtration running at a low cost while maintaining a high permeate flux over a long period.

Another object of the present invention is to provide a treatment system employing a spiral wound membrane module allowing stable filtration running at a low cost while maintaining a high permeate flux over a long period and a method of running the same.

According to an aspect of the present invention, a method of running a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprises a step of feeding a raw liquid containing a chemical having a contaminant separating function or a sterilizing function from at least one end of the spiral wound membrane element and taking out a permeated liquid from at least one opening end of the perforated hollow pipe in running.

In this method of running a spiral wound membrane element, a washing liquid is introduced from at least one opening end of the perforated hollow pipe in washing. The washing liquid is guided into the envelope separation membrane from the outer peripheral surface of the perforated hollow pipe, and permeated through the separation membrane in a direction opposite to that in filtration. Thus, the separation membrane is subjected to back wash reverse filtration, so that contaminants deposited on the membrane surface of the separation membrane are separated from the separation membrane.

In this case, the separation membrane of the spiral wound membrane element can be subjected to back wash reverse filtration with the back pressure higher than 0.05 MPa and not more than 0.3 MPa, whereby a necessary amount of the washing liquid can be fed in a short time. Thus, contaminants deposited on the membrane surface of the separation membrane can be effectively removed. Consequently, stable filtration running can be performed while maintaining a high permeate flux over a long period.

When a raw liquid containing a chemical having a contaminant separating function is fed into the spiral wound membrane element in the aforementioned method, contaminants can be inhibited from adhering at least to the membrane surface of the spiral wound membrane element.

When a raw liquid containing a chemical having a sterilizing function is fed into the spiral wound membrane element, bacteria such as microorganisms can be inhibited from propagating on the membrane surface of the spiral wound membrane element.

Thus, the spiral wound membrane element can be stably run over a long period.

The chemical may be sodium hypochlorite, chloramine, hydrogen peroxide, peracetic acid or ozone. Such a chemical has a function of decomposing, dissolving and separating contaminants, whereby the membrane surface of the spiral wound membrane element can be prevented from adhesion of contaminants. The membrane surface can be further prevented from propagation of bacteria due to the sterilizing function of the chemical.

The raw liquid may contain a flocculant. In this case, the flocculant flocculates contaminants contained in the raw liquid, whereby the membrane surface can readily capture contaminants, possibly passing through the membrane if the chemical contains no flocculant, due to the flocculating function. Thus, precise filtration is enabled. The contaminants captured on the membrane surface in the aforementioned manner can be discharged from the spiral wound membrane element by back wash reverse filtration with a high back pressure higher than 0.05 MPa and not more than 0.3 MPa.

The method of running a spiral wound membrane element may further comprise a step of introducing a washing liquid containing a chemical having a contaminant separating function or a sterilizing function from at least one opening end of the perforated hollow pipe and discharging the washing liquid derived from the outer peripheral surface of the perforated hollow pipe from at least one end of the spiral wound membrane element in washing thereby performing back wash reverse filtration on the separation membrane with a back pressure higher than 0.05 MPa and not more than 0.3 MPa.

When the washing liquid is introduced from at least one opening end of the perforated hollow pipe, the washing liquid derived from the outer peripheral surface of the perforated hollow pipe is permeated through the separation membrane to axially flow through the spiral wound membrane element, and discharged from at least one end of the spiral wound membrane element. Therefore, contaminants captured on the membrane surface of the spiral wound membrane element, particularly in pores of the membrane, can be removed. Thus, a stable permeate flow rate can be regularly maintained when running the spiral wound membrane element.

Particularly in this case, the chemical, having a contaminant separating function, contained in the washing liquid readily removes contaminants adhering to the membrane surface of the spiral wound membrane element. Thus, the spiral wound membrane element can be effectively washed.

Further, the chemical, having a sterilizing function, contained in the washing liquid can effectively inhibit bacteria such as microorganisms from propagating on the membrane surface of the spiral wound membrane element.

Thus, the spiral wound membrane element can be stably run over a long period.

In this case, the permeated liquid may be employed as the washing liquid.

The method of running a spiral wound membrane element may further comprise a step of feeding a washing liquid containing a chemical having a contaminant separating function or a sterilizing function from at least one end of the spiral wound membrane element and axially feeding the washing liquid containing the chemical through the spiral wound membrane element in washing. In this case, contaminants adhering to the membrane surface of the spiral wound membrane element, particularly those forming a cake layer on the membrane surface can be removed. Thus, a constant permeate flow rate can be regularly maintained when running the spiral wound membrane element.

Particularly in this case, contaminants adhering to the membrane surface of the spiral wound membrane element can be readily removed due to the chemical, having a contaminant separating function, contained in the washing liquid. Thus, the spiral wound membrane element can be effectively washed.

Further, the chemical, having a sterilizing function, contained in the washing liquid can more effectively inhibit bacteria such as microorganisms from propagating on the membrane surface of the spiral wound membrane element.

Thus, the spiral wound membrane element can be stably run over a long period.

In this case, a raw liquid may be employed as the washing liquid.

The separation membrane may be formed by bonding a permeable membrane body to a surface of a porous sheet member, and the permeable membrane body may be bonded to the surface of the porous sheet member in an anchored state. In such a separation membrane, bonding between the porous sheet member and the permeable membrane body is reinforced to improve back pressure strength of the separation membrane. Thus, sufficient back wash reverse filtration can be performed with a back pressure higher than 0.05 MPa and not more than 0.3 MPa without breaking the separation membrane of the spiral wound membrane element.

In particular, back pressure strength of the separation membrane is preferably at least 0.2 MPa. Thus, back wash reverse filtration with a high back pressure is so enabled that stable membrane separation can be performed over a long period due to sufficient membrane washing.

In particular, the porous sheet member is preferably made of woven fabric, nonwoven fabric, a mesh net or a foaming sintered sheet of synthetic resin.

Further, the porous sheet member is preferably made of nonwoven fabric having a thickness of at least 0.08 mm and not more than 0.15 mm and density of at least $0.5/cm^3$ and not more than $0.8$ g/cm$^3$.

Thus, back pressure strength of at least 0.2 MPa can be attained, while increase of permeation resistance and separation of the permeable membrane body can be prevented while ensuring strength for serving as a reinforcing sheet.

According to another aspect of the present invention, a method of washing a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprises a step of introducing a washing liquid containing a chemical having a contaminant separating function or a sterilizing function from at least one opening end of the perforated hollow pipe and discharging the washing liquid derived from the outer peripheral surface of the perforated hollow pipe from at least one end of the spiral wound membrane element thereby performing back wash reverse filtration on the separation membrane with a back pressure higher than 0.05 MPa and not more than 0.3 MPa.

In this method of washing a spiral wound membrane element, the washing liquid introduced from at least one opening end of the perforated hollow pipe is guided into the envelope separation membrane from the outer peripheral surface of the perforated hollow pipe, and permeated through the separation membrane in a direction opposite to that in filtration. Thus, the separation membrane is subjected to back wash reverse filtration, so that contaminants deposited on the membrane surface of the separation membrane, particularly those clogging in pores of the separation membrane are separated from the separation membrane.

In this case, the spiral wound membrane element is subjected to back wash reverse filtration with the back pressure higher than 0.05 MPa and not more than 0.3 MPa, whereby a necessary amount of the washing liquid can be fed in a short time. Thus, contaminants deposited on the membrane surface of the separation membrane can be effectively removed. Consequently, stable filtration running can be performed while maintaining a high permeate flux over a long period.

When the washing liquid contains a chemical having a contaminant separating function, contaminants adhering to the membrane surface of the spiral wound membrane element, particularly those clogging in pores of the membrane can be readily removed. Thus, the spiral wound membrane element can be effectively washed.

When the washing liquid contains a chemical having a sterilizing function, bacteria such as microorganisms can be effectively inhibited from propagating on the membrane surface of the spiral wound membrane element.

Thus, the spiral wound membrane element can be stably run over a long period.

According to still another aspect of the present invention, a method of washing a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprises a step of feeding a washing liquid containing a chemical having a contaminant separating function or a sterilizing function from at least one end of the spiral wound membrane element and axially feeding the washing liquid containing the chemical through the spiral wound membrane element.

In this method of washing a spiral wound membrane element, the separation membrane of the spiral wound membrane element can be subjected to back wash reverse filtration with the back pressure higher than 0.05 MPa and not more than 0.3 MPa, whereby a necessary amount of the washing liquid can be fed in a short time. Thus, contaminants deposited on the membrane surface of the separation membrane can be effectively removed. Consequently, stable filtration running can be performed while maintaining a high permeate flux over a long period.

In the aforementioned method of running a spiral wound membrane element, the washing liquid containing the chemical having a contaminant separating function or a sterilizing function is fed from at least one end of the spiral wound membrane element, and axially fed through the spiral wound membrane element. Therefore, contaminants adhering to the membrane surface of the spiral wound membrane element, particularly those forming a cake layer on the membrane surface can be removed. Thus, a stable permeate flow rate can be regularly maintained when running the spiral wound membrane element.

Particularly in this case, the washing liquid containing the chemical having a contaminant separating function can readily remove contaminants adhering to the membrane surface of the spiral wound membrane element. Thus, the spiral wound membrane element can be effectively washed.

When the washing liquid contains a chemical having a sterilizing function, bacteria such as microorganisms can be effectively inhibited from propagating on the membrane surface of the spiral wound membrane element.

Thus, the spiral wound membrane element can be stably run over a long period.

In this case, a raw liquid may be employed as the washing liquid.

The method of washing a spiral wound membrane element may further comprise a step of regularly or periodically feeding the washing liquid containing the chemical from at least one end of the spiral wound membrane element in parallel with back wash reverse filtration performed by introducing the washing liquid containing the chemical from at least one opening end of the perforated hollow pipe. In this case, contaminants clogging in pores of the membrane and those forming a cake layer on the membrane surface can be simultaneously and effectively removed.

The method of washing a spiral wound membrane element may further comprise a step of soaking the spiral wound membrane element in the washing liquid containing the chemical.

In this case, the washing liquid containing the chemical is introduced into the spiral wound membrane element from the perforated hollow pipe, for soaking the spiral wound membrane element in the washing liquid for a prescribed time. In a spiral wound membrane module formed by charging the spiral wound membrane element in a pressure vessel, for example, the pressure vessel is filled with the washing liquid for soaking the spiral wound membrane element therein. Thereafter the washing liquid is discharged from the system. Contaminants adhering to the membrane surface of the spiral wound membrane element can be readily removed and the spiral wound membrane element can be readily washed due to such soaking. Thus, the spiral wound membrane element can be more effectively washed. Further, bacteria such as microorganisms can be more effectively inhibited from propagating on the membrane surface of the spiral wound membrane element.

Thus, the spiral wound membrane element can be stably run over a long period.

The chemical may be sodium hypochlorite, chloramine, sulfuric acid, hydrochloric acid, nitric acid, sodium hydroxide, peracetic acid, isopropyl alcohol, oxalic acid or citric acid. Such a chemical has a contaminant separating function such as decomposition, dissolution and separation of contaminants, whereby contaminants adhering to the membrane surface of the spiral wound membrane element can be removed so that the spiral wound membrane element can be effectively washed. Further, bacteria can be effectively inhibited from propagating on the membrane surface due to the sterilizing function of the chemical.

According to a further aspect of the present invention, a method of running a spiral wound membrane module, comprising a pressure vessel having a raw liquid inlet and one or a plurality of spiral wound membrane elements stored in the pressure vessel with each spiral wound membrane element comprising an envelope separation membrane wound on the outer peripheral surface of a perforated hollow pipe and allowing back wash reverse filtration with a back pressure higher than 0.05 MPa and not more than 0.3 MPa, comprises a step of feeding a raw liquid containing a chemical having a contaminant separating function or a sterilizing function from at least one end of the spiral wound membrane element through the raw liquid inlet of the pressure vessel and taking out a permeated liquid from at least one opening end of the perforated hollow pipe in running.

In this method of running a spiral wound membrane module, a washing liquid introduced from at least one opening end of the perforated hollow pipe is guided into the envelope separation membrane from the outer peripheral surface of the perforated hollow pipe in washing, and permeated through the separation membrane in a direction opposite to that in filtration. Thus, the separation membrane is subjected to back wash reverse filtration, so that contaminants deposited on the membrane surface of the separation membrane are separated from the separation membrane.

In this case, the separation membrane of the spiral wound membrane element can be subjected to back wash reverse filtration with the back pressure higher than 0.05 MPa and not more than 0.3 MPa, whereby a necessary amount of the washing liquid can be fed in a short time. Thus, contaminants deposited on the membrane surface of the separation membrane can be effectively removed. Consequently, stable filtration running can be performed while maintaining a high permeate flux over a long period.

In the aforementioned method of running a spiral wound membrane module, further, the raw liquid containing the chemical having a contaminant separating function is fed into the spiral wound membrane element. Thus, contaminants can be inhibited from adhering to the membrane surface of the spiral wound membrane element.

In addition, the raw liquid containing the chemical having a sterilizing function is fed into the spiral wound membrane element, whereby bacteria such as microorganisms can be inhibited from propagating on the membrane surface of the spiral wound membrane element.

Thus, the spiral wound membrane module can be stably run over a long period.

According to a further aspect of the present invention, a method of washing a spiral wound membrane module, comprising a pressure vessel and one or a plurality of spiral wound membrane elements stored in the pressure vessel with each spiral wound membrane element comprising an envelope separation membrane wound on the outer peripheral surface of a perforated hollow pipe and allowing back wash reverse filtration with a back pressure higher than 0.05 MPa and not more than 0.3 MPa, comprises a step of introducing a washing liquid containing a chemical having a contaminant separating function or a sterilizing function from at least one opening end of the perforated hollow pipe and discharging the washing liquid derived from the outer peripheral surface of the perforated hollow pipe from at least one end of the spiral wound membrane element for taking out the washing liquid from the pressure vessel thereby performing back wash reverse filtration on the separation membrane with a back pressure higher than 0.05 MPa and not more than 0.3 MPa.

According to this method of washing a spiral wound membrane module, the washing liquid introduced from at least one opening end of the perforated hollow pipe is guided into the envelope separation membrane from the outer peripheral surface of the perforated hollow pipe, and permeated through the separation membrane in a direction opposite to that in filtration. Thus, the separation membrane is subjected to back wash reverse filtration, so that contaminants deposited on the membrane surface of the separation membrane are separated from the separation membrane.

In this case, the separation membrane of the spiral wound membrane element is subjected to back wash reverse filtration with the back pressure higher than 0.05 MPa and not more than 0.3 MPa, whereby a necessary amount of the washing liquid can be fed in a short time. Thus, contaminants deposited on the membrane surface of the separation membrane can be effectively removed. Consequently, stable filtration running can be performed while maintaining a high permeate flux over a long period.

Particularly in this case, contaminants adhering to the membrane surface of the spiral wound membrane element, particularly those clogging in pores of the membrane can be readily removed due to the chemical, having a contaminant separating function, contained in the washing liquid. Thus, the spiral wound membrane element can be effectively washed.

Further, bacteria such as microorganisms can be effectively inhibited from propagating on the membrane surface of the spiral wound membrane element due to the chemical, having a sterilizing function, contained in the washing liquid.

Thus, the spiral wound membrane module can be stably run over a long period.

According to a further aspect of the present invention, a method of washing a spiral wound membrane module, comprising a pressure vessel and one or a plurality of spiral wound membrane elements stored in the pressure vessel with each spiral wound membrane element comprising an envelope separation membrane wound on the outer peripheral surface of a perforated hollow pipe and allowing back wash reverse filtration with a back pressure higher than 0.05 MPa and not more than 0.3 MPa, comprises a step of feeding a washing liquid containing a chemical having a contaminant separating function or a sterilizing function from at least one end of the spiral wound membrane element, axially feeding the washing liquid containing the chemical through the spiral wound membrane element and taking out the washing liquid from the pressure vessel.

In this method of washing a spiral wound membrane module, the separation membrane of the spiral wound membrane element can be subjected to back wash reverse filtration with the back pressure higher than 0.05 MPa and not more than 0.3 MPa, whereby a necessary amount of the washing liquid can be fed in a short time. Thus, contaminants deposited on the membrane surface of the separation membrane can be effectively removed. Consequently, stable filtration running can be performed while maintaining a high permeate flux over a long period.

In the aforementioned method of washing a spiral wound membrane module, the washing liquid containing the chemical having a contaminant separating function or a sterilizing function is fed from at least one end of the spiral wound membrane element and axially fed through the spiral wound membrane element. Therefore, contaminants adhering to the membrane surface of the spiral wound membrane element, particularly those forming a cake layer on the membrane surface can be removed. Thus, a constant permeate flow rate can be regularly maintained when running the spiral wound membrane element.

Particularly in this case, contaminants adhering to the membrane surface of the spiral wound membrane element can be readily removed when the washing liquid contains a chemical having a contaminant separating function. Thus, the spiral wound membrane element can be effectively washed.

When the washing liquid contains a chemical having a sterilizing function, bacteria such as microorganisms can be effectively inhibited from propagating on the membrane surface of the spiral wound membrane element.

Thus, the spiral wound membrane element can be stably run over a long period.

According to a further aspect of the present invention, a method of running a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprises a step of temporarily stopping running and holding the spiral wound membrane element in a state soaked in a liquid for a prescribed time in a running period.

In this method of running a spiral wound membrane element, contaminants adhering to the membrane surface of the spiral wound membrane element can be separated for recovering the membrane function of the spiral wound membrane element by holding the spiral wound membrane element in the state soaked in the liquid for the prescribed time. Thus, reliable and stable running can be performed. Such an operation, which can be readily performed with no requirement for particular equipment for separating the contaminants without employing a washing chemical, can be executed at a low cost.

As a first mode of the method of running a spiral wound membrane element according to this aspect, the step of temporarily stopping running may include steps of feeding a raw liquid from an end of the spiral wound membrane element and taking out a permeated liquid from at least one opening end of the perforated hollow pipe in filtration running in the running period and stopping the filtration running for holding the spiral wound membrane element in the state soaked in the liquid for the prescribed time.

In this case, the raw liquid is fed from an end of the spiral wound membrane element while filtration is performed for capturing contaminants on the membrane surface of the spiral wound membrane element.

Further, contaminants adhering to the membrane surface of the spiral wound membrane element following filtration running can be separated by stopping filtration running and soaking the spiral wound membrane element in the liquid for a prescribed time.

In the aforementioned method of running a spiral wound membrane element, part of the raw liquid may be regularly or periodically fed axially through the spiral wound membrane element. Thus, contaminants contained in the raw liquid can be inhibited from adhering to the membrane surface of the spiral wound membrane element due to shearing force acting on the membrane surface, and more stable running can be performed.

At least part of the raw liquid axially fed through the spiral wound membrane element is preferably returned to the feeding side of the spiral wound membrane element again. Thus, a permeated liquid can be obtained with high recovery by circulating the raw liquid.

As a second mode of the method of running a spiral wound membrane element according to this aspect, the step of temporarily stopping running may include steps of introducing a washing liquid from at least one opening end of the perforated hollow pipe and discharging the washing liquid from at least one end of the spiral wound membrane element thereby performing back wash reverse filtration on the separation membrane with a back pressure higher than 0.05 MPa and not more than 0.3 MPa in back wash reverse filtration in the running period and stopping the back wash reverse filtration for holding the spiral wound membrane element in the state soaked in the liquid for the prescribed time.

In back wash reverse filtration, the washing liquid is introduced from at least one opening end of the perforated hollow pipe. The washing liquid is guided into the envelope separation membrane from the outer peripheral surface of the perforated hollow pipe, and permeated through the separation membrane in a direction opposite to that in filtration. Thus, the separation membrane is subjected to back wash reverse filtration, so that contaminants deposited on the membrane surface of the separation membrane are separated from the separation membrane.

In this case, the separation membrane is subjected to back wash reverse filtration with the back pressure higher than 0.05 MPa and not more than 0.3 MPa, whereby a necessary amount of the washing liquid can be fed in a short time. Thus, contaminants deposited on the membrane surface of the separation membrane can be effectively removed. Consequently, stable filtration running can be performed while maintaining a high permeate flux over a long period also in dead end filtration readily causing deposition of contaminants on the membrane surface.

Thus, filtration can be stably performed, whereby a permeated liquid can be efficiently obtained. Further, no large pump is required for feeding the raw liquid but the scale of the system can be reduced. Thus, the system cost is reduced.

Further, contaminants adhering to the membrane surface of the spiral wound membrane element following filtration can be more effectively separated by stopping back wash reverse filtration and soaking the spiral wound membrane element in the liquid for a prescribed time.

In the aforementioned first mode, the step of temporarily stopping running may further include a step of restarting the filtration running after holding the spiral wound membrane element in the state soaked in the liquid for the prescribed time. In this case, contaminants adhering to the membrane surface of the spiral wound membrane element can be separated by soaking the spiral wound membrane element in the liquid for a prescribed time, whereby high reliability and stability can be attained in the restarted filtration running.

Alternatively, the step of temporarily stopping running may further include a step of holding the spiral wound membrane element in the state soaked in the liquid for the prescribed time and thereafter introducing a washing liquid from at least one opening end of the perforated hollow pipe and discharging the washing liquid from at least one end of the spiral wound membrane element thereby performing back wash reverse filtration on the separation membrane with a back pressure higher than 0.05 MPa and not more than 0.3 MPa. In this case, back wash reverse filtration is performed after soaking the spiral wound membrane element in the liquid for a prescribed time, whereby contaminants adhering to the membrane surface of the spiral wound membrane element can be readily and reliably separated. Thus, reliable and stable filtration running can be performed.

In the aforementioned second mode, the step of temporarily stopping running may further include a step of holding the spiral wound membrane element in the state soaked in the liquid for the prescribed time and thereafter restarting the back wash reverse filtration. In this case, back wash reverse filtration is performed after soaking the spiral wound membrane element in the liquid for a prescribed time, whereby contaminants adhering to the membrane surface of the spiral wound membrane element can be readily and reliably separated. Thus, reliable and stable filtration running can be performed.

Alternatively, the step of temporarily stopping running may further include a step of holding the spiral wound membrane element in the state soaked in the liquid for the prescribed time and thereafter feeding a raw liquid from an end of the spiral wound membrane element while taking out a permeated liquid from at least one opening end of the perforated hollow pipe thereby performing filtration running. In this case, contaminants adhering to the membrane surface of the spiral wound membrane element can be separated by soaking the spiral wound membrane element in the liquid for a prescribed time, whereby high reliability and stability can be attained in filtration running after the soaking.

In each of the aforementioned first and second modes, the step of temporarily stopping running may further include a step of holding the spiral wound membrane element in the state soaked in the liquid for the prescribed time and thereafter axially feeding a raw liquid through the spiral wound membrane element thereby performing flushing. In this case, contaminants adhering to the membrane surface of the spiral wound membrane element can be readily separated by flushing, and the contaminants separated from the spiral wound membrane element can be readily and reliably discharged.

In addition, the step of temporarily stopping running may include a step of feeding a liquid containing a chemical having a sterilizing function or a contaminant separating function into the spiral wound membrane element and soaking the spiral wound membrane element in the liquid containing the chemical. Thus, bacteria propagating on the membrane surface of the spiral wound membrane element can be sterilized, or contaminants adhering to the membrane surface of the spiral wound membrane element can be more effectively and reliably separated.

According to a further aspect of the present invention, a method of running a spiral wound membrane module, comprising a pressure vessel having a raw liquid inlet and one or a plurality of spiral wound membrane elements stored in the pressure vessel with each spiral wound membrane element comprising an envelope separation membrane wound on the outer peripheral surface of a perforated hollow pipe and allowing back wash reverse filtration with a back pressure higher than 0.05 MPa and not more than 0.3 MPa, comprises a step of temporarily stopping running in a running period and holding the pressure vessel in a state filled with a liquid and sealed for a prescribed time.

In this method of running a spiral wound membrane module, contaminants adhering to the membrane surface of the spiral wound membrane element can be separated for recovering the membrane function of the spiral wound membrane element by sealing the pressure vessel filled with the liquid and soaking the spiral wound membrane element in the liquid. Thus, the spiral wound membrane module can be reliably and stably run. Such an operation can be readily performed with no requirement for special equipment, and can be executed at a low cost.

The liquid may contain a chemical having a sterilizing function or a contaminant separating function. Thus, bacteria propagating on the membrane surface of the spiral wound membrane element can be sterilized, or contaminants adhering to the membrane surface of the spiral wound membrane element can be more effectively and reliably separated.

The separation membrane may be formed by bonding a permeable membrane body to a surface of a porous sheet member, and the permeable membrane body may be bonded to the surface of the porous sheet member in an anchored state. In such a separation membrane, bonding between the porous sheet member and the permeable membrane body is reinforced to improve back pressure strength of the separation membrane. Thus, sufficient back wash filtration can be performed with a back pressure higher than 0.05 MPa and not more than 0.3 MPa without breaking the separation membrane of the spiral wound membrane element.

In particular, back pressure strength of the separation membrane is preferably at least 0.2 MPa. Thus, back wash reverse filtration with a high back pressure is enabled so that stable membrane separation can be performed over a long period by sufficiently washing the separation membrane.

In particular, the porous sheet member is preferably made of woven fabric, nonwoven fabric, a mesh net or a foaming sintered sheet of synthetic rein.

Further, the porous sheet member is preferably made of nonwoven fabric having a thickness of at least 0.08 mm and not more than 0.15 mm and density of at least $0.5/cm^3$ and not more than $0.8 \text{ g/cm}^3$.

Thus, back pressure strength of at least 0.2 MPa can be attained, and increase of permeation resistance as well as separation of the permeable membrane body can be prevented while ensuring strength for serving as a reinforcing sheet.

According to a further aspect of the present invention, a method of running a treatment system, comprising a plurality of spiral wound membrane modules connected in parallel with each other, each comprising a pressure vessel having a raw liquid inlet and one or a plurality of spiral wound membrane elements stored in the pressure vessel with each spiral wound membrane element comprising an envelope separation membrane wound on the outer peripheral surface of a perforated hollow pipe and allowing back wash reverse filtration with a back pressure higher than 0.05 MPa and not more than 0.3 MPa, comprises steps of feeding a raw liquid from an end of the spiral wound membrane element through the raw liquid inlet of the pressure vessel of each spiral wound membrane module and taking out a permeated liquid from the pressure vessel from at least one opening end of the perforated hollow pipe in filtration running and performing, when washing any of the plurality of spiral wound membrane modules, the filtration running on at least one of the remaining spiral wound membrane modules.

When any of the plurality of spiral wound membrane modules is washed in this method of running a treatment system, at least one of the remaining spiral wound membrane modules is subjected to filtration running, whereby the filtration running can be continuously performed. Thus, efficient running can be performed with high productivity. Further, the spiral wound membrane elements of the plurality of spiral wound membrane modules can be successively washed, whereby filtration running can be performed with a spiral wound membrane element recovering the membrane function. Thus, reliable and stable running can be performed over a long period.

This filtration running includes periodically performed back wash reverse filtration. When one of the spiral wound membrane modules is subjected to back wash reverse filtration in filtration running, therefore, one of the remaining spiral wound membrane modules may be washed. In the filtration running, however, back wash reverse filtration is performed for a short time, to hardly influence continuity of the filtration running in the treatment system.

Thus, an extremely practical and useful treatment system is implemented.

In the aforementioned treatment system, further, a raw liquid is fed from an end of the spiral wound membrane element to be subjected to filtration when the spiral wound membrane module is subjected to filtration running.

When the aforementioned spiral wound membrane module is subjected to filtration running, part of the raw liquid may be regularly or periodically fed axially through the spiral wound membrane element. Thus, contaminants contained in the raw liquid can be inhibited from adhering to the membrane surface of the spiral wound membrane element due to shearing force acting on the membrane surface, so that more stable running can be performed.

At least part of the raw liquid axially fed through the spiral wound membrane element is preferably returned to the feeding side of the spiral wound membrane element again. A permeated liquid can be obtained with high recovery by circulating the raw liquid in the aforementioned manner.

The washing may include introducing a washing liquid from at least one opening end of the perforated hollow pipe of each spiral wound membrane module and discharging the washing liquid from at least one end of the spiral wound membrane element for taking out the washing liquid from the pressure vessel thereby performing back wash reverse filtration on the separation membrane with a back pressure higher than 0.05 MPa and not more than 0.3 MPa.

When the washing liquid is introduced from at least one opening end of the perforated hollow pipe in washing, the washing liquid is guided into the envelope separation membrane from the outer peripheral surface of the perforated hollow pipe and permeated through the separation membrane in a direction opposite to that in filtration. Thus, the separation membrane is subjected to back wash reverse filtration, so that contaminants deposited on the membrane surface of the separation membrane are separated from the separation membrane.

In this case, the separation membrane is subjected to back wash reverse filtration with a back pressure higher than 0.05 MPa and not more than 0.3 MPa, whereby a necessary amount of the washing liquid can be fed in a short time. Thus, contaminants deposited on the membrane surface of the separation membrane can be effectively removed. Consequently, stable filtration running can be performed while maintaining a high permeate flux over a long period also in dead end filtration readily causing deposition of contaminants on the membrane surface.

According to the aforementioned method of running a treatment system, as hereinabove described, filtration can be so stably performed that a permeated liquid can be efficiently obtained. Further, no large pump is required for feeding a raw liquid but the scale of the system can be reduced. Thus, the system cost is reduced.

The washing may include holding the pressure vessel of each spiral wound membrane module in a state filled with the washing liquid for a prescribed time.

In this case, contaminants adhering to the membrane surface of the spiral wound membrane element can be separated for more effectively performing washing and recovering the membrane function of the spiral wound membrane element by filling the pressure vessel with the washing liquid and holding the spiral wound membrane element in a state soaked in the washing liquid. Thus, the spiral wound membrane element can be stably run over a long period.

The washing liquid may be a permeated liquid or water equivalent to a permeated liquid. Alternatively, the washing liquid may contain a chemical having a contaminant separating function or a sterilizing function. When the spiral wound membrane element is soaked in such a washing liquid, contaminants adhering to the membrane surface of the spiral wound membrane element can be separated. Particularly when the spiral wound membrane element is soaked in a washing liquid containing a chemical having a contaminant separating function or a sterilizing function, the spiral wound membrane element can be more effectively washed and bacteria such as microorganisms can be more effectively inhibited from propagating on the membrane surface.

The washing liquid may be introduced into the pressure vessel through the raw liquid inlet. Alternatively, the washing liquid may be introduced into the pressure vessel from at least one opening end of the perforated hollow pipe. Thus, the washing liquid is introduced from the raw liquid feeding side or a permeated liquid takeout side of the spiral wound membrane module, to be filled in the pressure vessel.

The method of running a treatment system may further comprise steps of connecting a raw liquid feeding pipe and a washing liquid discharge pipe to the raw liquid inlet of each spiral wound membrane module while connecting a permeated liquid takeout pipe and a washing liquid feeding pipe to at least one opening end of the perforated hollow pipe, inserting a first valve in the raw liquid feeding pipe, inserting a second valve in the washing liquid discharge pipe, inserting a third valve in the permeated liquid takeout pipe and inserting a fourth valve in the washing liquid feeding pipe, and switching the filtration running and the washing of each spiral wound membrane module through an operation of opening/closing the first, second, third and fourth valves. Thus, when any of the plurality of spiral wound membrane modules is washed, at least one of the remaining spiral wound membrane modules can be subjected to filtration running.

According to a further aspect of the present invention, a treatment system comprises a plurality of spiral wound membrane modules connected in parallel with each other, each comprising a pressure vessel and one or a plurality of spiral wound membrane elements stored in the pressure vessel with each spiral wound membrane element comprising an envelope separation membrane wound on the outer periphery of a perforated hollow pipe and allowing back wash reverse filtration with a back pressure higher than 0.05 MPa and not more than 0.3 MPa, feeding means feeding a raw liquid from an end of the spiral wound membrane element through a raw liquid inlet of the pressure vessel of each spiral wound membrane module in filtration running, takeout means taking out a permeated liquid from the pressure vessel from at least one opening end of the perforated hollow pipe in the filtration running, and passage switching means capable of switching a passage so that, when any of the plurality of spiral wound membrane modules is washed, at least one of the remaining spiral wound membrane modules is subjected to the filtration running.

When any of the plurality of spiral wound membrane modules is washed, at least one of the remaining spiral wound membrane modules is subjected to the filtration running through the passage switching means in this treatment system, whereby the filtration running can be continuously performed. Thus, efficient running can be performed with high productivity. The spiral wound membrane elements of the plurality of spiral wound membrane modules can be successively washed, whereby a spiral wound membrane element recovering the membrane function can be regularly employed for filtration running. Thus, reliable and stable running can be performed over a long period.

Therefore, an extremely practical and useful system is implemented.

In the aforementioned treatment system, the raw liquid is fed from an end of the spiral wound membrane element in filtration running of the spiral wound membrane module, to be subjected to filtration.

In filtration running of the aforementioned spiral wound membrane module, part of the raw liquid may be regularly or periodically fed axially through the spiral wound membrane element. Thus, contaminants contained in the raw liquid can be inhibited from adhering to the membrane surface of the spiral wound membrane element due to shearing force acting on the membrane surface, so that more stable running can be performed.

At least part of the raw liquid axially fed through the spiral wound membrane element is preferably returned to the feeding side of the spiral wound membrane element again. A permeated liquid can be obtained with high recovery by circulating the raw liquid in the aforementioned manner.

In washing, a washing liquid introduced from at least one opening end of the perforated hollow pipe is guided into the envelope separation membrane from the outer peripheral surface of the perforated hollow pipe, and permeated through the separation membrane in a direction opposite to that in filtration. Thus, the separation membrane is subjected to back wash reverse filtration, so that contaminants deposited on the membrane surface of the separation membrane are separated from the separation membrane.

In this case, the separation membrane is subjected to back wash reverse filtration with a back pressure higher than 0.05 MPa and not more than 0.3 MPa, whereby a necessary amount of the washing liquid can be fed in a short time. Thus, contaminants deposited on the membrane surface of the separation membrane can be effectively removed. Consequently, stable filtration running can be performed while maintaining a high permeate flux over a long period also in dead end filtration readily causing deposition of contaminants on the membrane surface.

According to the aforementioned treatment system, as hereinabove described, filtration can be so stably performed that the permeated liquid can be efficiently obtained. Further, no large pump is required for feeding the raw liquid but the scale of the system can be reduced. Thus, the system cost is reduced.

The passage switching means may include a raw liquid feeding pipe and a washing liquid discharge pipe connected to the raw liquid inlet of each spiral wound membrane module, a permeated liquid takeout pipe and a washing liquid feeding pipe connected to at least one opening end of the perforated hollow pipe, a first valve inserted in the raw liquid feeding pipe, a second valve inserted in the washing liquid discharge pipe, a third valve inserted in the permeated liquid takeout pipe and a fourth valve inserted in the washing liquid feeding pipe. Thus, when any of the plurality of spiral wound membrane modules is washed, at least one of the remaining spiral wound membrane modules can be subjected to filtration running.

Each of the first to fourth valves may be an automatic valve, and the passage switching means may further include control means controlling opening/closing each of the first to fourth automatic valves. In this case, the passage can be automatically switched by automatically opening/closing the first to fourth valves with the control means.

The control means may control the operation of opening/closing each of the first to fourth automatic valves on the basis of time setting. Thus, the passage can be automatically switched on the basis of the time setting for switching filtration running and washing at a prescribed time interval.

The control means may control the operation of opening/closing each of the first to fourth automatic valves in response to the pressure or the flow rate for feeding the raw liquid in the filtration running of each spiral wound membrane module. Alternatively, the control means may control the operation of opening/closing each of the first to fourth automatic valves in response to the pressure in the permeate liquid takeout pipe or the flow rate of the permeated liquid in the filtration running of the spiral wound membrane module. Further alternatively, the control means may control the operation of opening/closing each of the first to fourth automatic valves in response to the pressure difference between a raw liquid feeding side and a permeated liquid takeout side in the filtration running of each spiral wound membrane module. In this case, the passage can be automatically switched in response to the state of contamination of the spiral wound membrane element in the spiral wound membrane module for switching filtration running and washing.

The separation membrane may be formed by bonding a permeable membrane body to a surface of a porous sheet member, and the permeable membrane body may be bonded to the surface of the porous sheet member in an anchored state. In such a separation membrane, bonding between the porous sheet member and the permeable membrane body is reinforced to improve back pressure strength of the separation membrane. Thus, sufficient back wash reverse filtration can be performed with a back pressure higher than 0.05 MPa and not more than 0.3 MPa without breaking the separation membrane of the spiral wound membrane element.

In particular, back pressure strength of the separation membrane is preferably at least 0.2 MPa. Thus, back wash reverse filtration with a high back pressure is so enabled that stable membrane separation can be performed over a long period by sufficiently washing the separation membrane.

In particular, the porous sheet member is preferably made of woven fabric, nonwoven fabric, a mesh net or a foaming sintered body of synthetic resin.

Further, the porous sheet member is preferably made of nonwoven fabric having a thickness of at least 0.08 mm and not more than 0.15 mm and density of at least 0.5 $g/cm^3$ and not more than 0.8 $g/cm^3$.

Thus, back pressure strength of at least 0.2 MPa can be attained, and increase of permeation resistance as well as separation of the permeable membrane body can be prevented while ensuring strength for serving as a reinforcing sheet.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 illustrates time change of transmembrane pressure differences of spiral wound membrane modules according to Inventive Examples 1 to 3 and comparative example 1;

FIG. 9 illustrates time change of transmembrane pressure differences of spiral wound membrane modules according to Inventive Examples 4 and 5 and comparative example 2; and FIG. 10 is a schematic sectional view of a spiral wound membrane module employed for a treatment system according to the present invention.

DESCRIPTION OF THE PREFERRED EMBODIMENTS (1) First Embodiment

Figure 1:
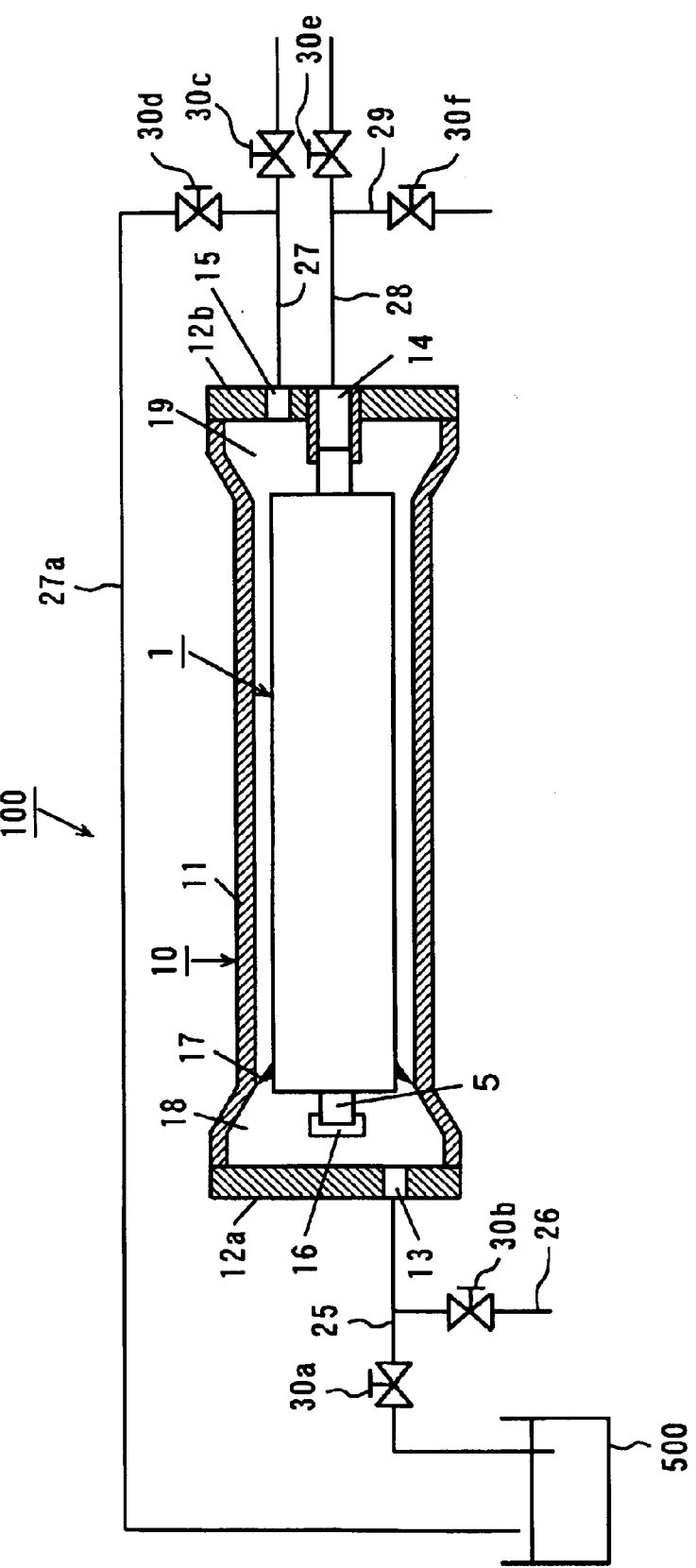
FIG. 1 is a model diagram showing an exemplary spiral wound membrane module according to an embodiment of the present invention.

FIG. 1 is a schematic sectional view showing an exemplary spiral wound membrane module 100 according to a first embodiment of the present invention.

As shown in FIG. 1, the spiral wound membrane module 100 is formed by storing a spiral wound membrane element 1 in a pressure vessel (pressure-resistant vessel) 10. The pressure vessel 10 is formed by a tubular case 11 and a pair of end plates 12a and 12b. The first end plate 12a is formed with a raw water inlet 13, and the second end plate 12b is formed with a raw water outlet 15. A permeate outlet 14 is provided on the central portion of the second end plate 12b. The structure of the pressure vessel 10 is not restricted to that shown in FIG. 1 but a pressure vessel of a side entry shape having a tubular case provided with a raw water inlet and a raw water outlet as described later.

The spiral wound membrane element 1 having a packing 17 mounted in the vicinity of an end of its outer peripheral surface is charged in the tubular case 11, and both opening ends of the tubular case 11 are sealed with the end plates 12a and 12b respectively. A first opening end of a water collection pipe 5 is engaged with the permeate outlet 14 of the end plate 12b, and an end cap 16 is mounted on a second opening end thereof. The packing 17 divides the internal space of the pressure vessel 10 into a first liquid chamber 18 and a second liquid chamber 19.

The raw water inlet 13 of the spiral wound membrane module 100 is connected to a raw water tank 500 through a pipe 25. A valve 30a is interposed in the pipe 25, and a pipe 26 having a valve 30b interposed therein is connected downstream the valve 30a. A pipe 27 having a valve 30c interposed therein is connected to the raw water outlet 15, and a pipe 27a having a valve 30d interposed therein is connected upstream the valve 30c of the pipe 27. The raw water outlet 15 is connected to the raw water tank 500 through the pipe 27a. A pipe 28 having a valve 30e interposed therein is connected to the permeate outlet 14, and a pipe 29 having a valve 30f interposed therein is connected upstream the valve 30e.

Figure 5:
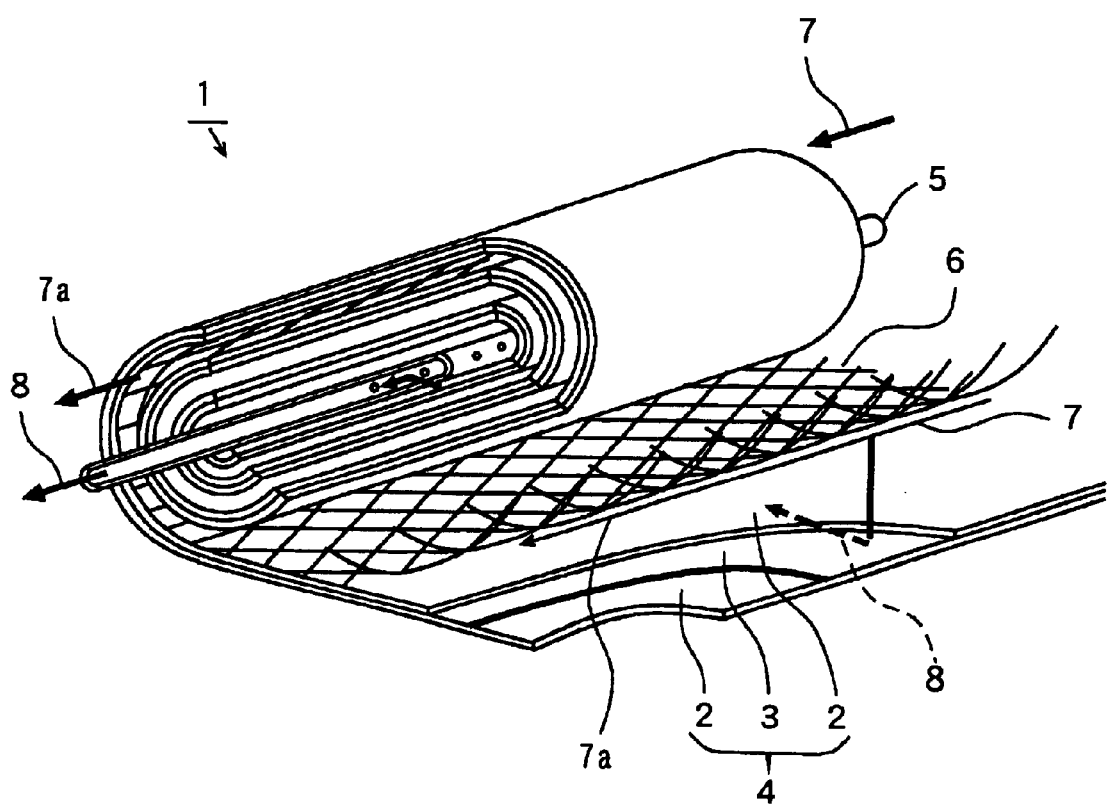
FIG. 5 is a partially fragmented perspective view of a spiral wound membrane element employed for the spiral wound membrane module shown in FIG. 1.

FIG. 5 is a partially fragmented perspective view of the spiral wound membrane element 1 employed for the spiral wound membrane module 100 shown in FIG. 1.

As shown in FIG. 5, the spiral wound membrane element 1 is formed by superposing separation membranes 2 on both surfaces of a permeate spacer 3 made of a net of synthetic resin and bonding the former to the latter on three sides thereby forming an envelope membrane 4, mounting an opening of the envelope membrane 4 on the water collection pipe 5 and spirally winding the envelope membrane 4 on the outer peripheral surface of the water collection pipe 5 along with a raw water spacer 6 formed by a net of synthetic resin. The outer peripheral surface of the spiral wound membrane element 1 is covered with a sheath member.

This spiral wound membrane element 1 can be subjected to back wash reverse filtration with a back pressure of 0.05 to 0.3 MPa by employing the separation membranes 2 having a structure described later.

Figure 2:
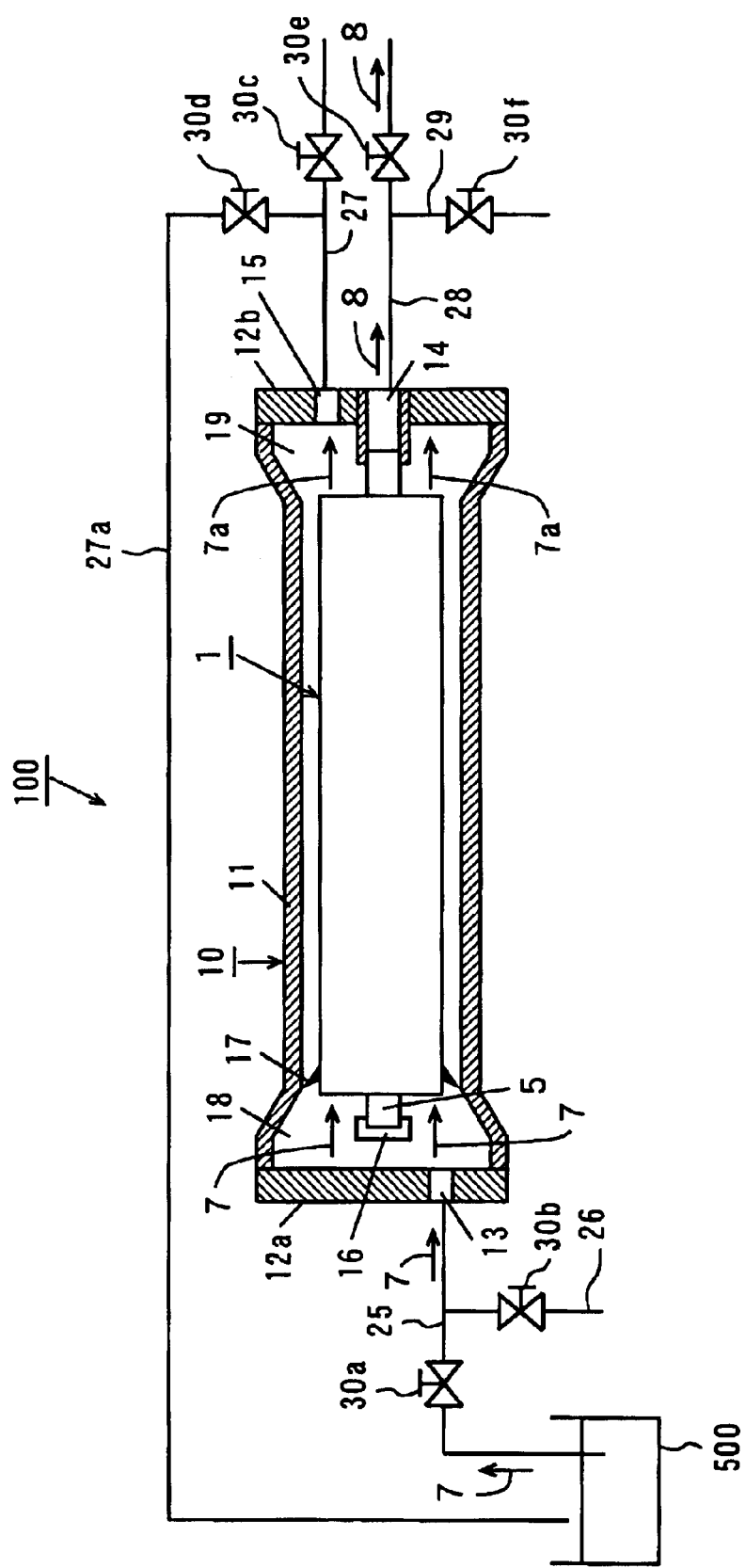
FIGS. 2 and 3 are schematic sectional views showing an exemplary method of running a spiral wound membrane module according to the present invention.
Figure 3:
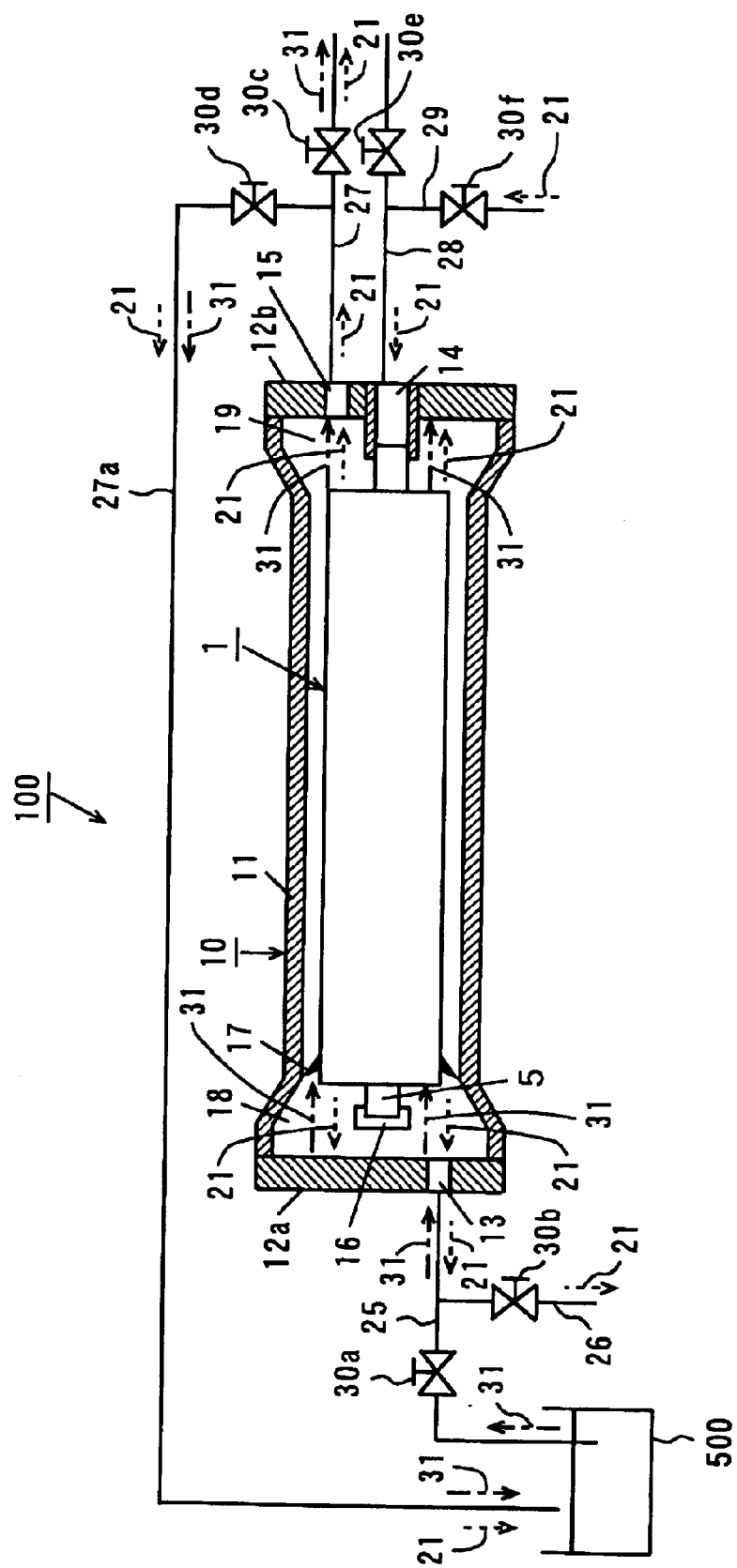

FIGS. 2 and 3 are schematic sectional views showing an exemplary method of running a spiral wound membrane module according to the present invention. This running method is applied to the spiral wound membrane module 100 shown in FIG. 1, and FIG. 2 shows a running method in filtration, while FIG. 3 shows a running method in washing.

As shown in FIG. 2, the valves 30a and 30e of the pipes 25 and 28 are opened and the valves 30b, 30c, 30d and 30f of the pipes 26, 27, 27a and 29 are closed in filtration.

Raw water 7 taken from the raw water tank 500 is fed into the pressure vessel 10 from the raw water inlet 13 through the pipe 25. In the spiral wound membrane module 100, the fed raw water 7 is introduced into the first liquid chamber 18 of the pressure vessel 10 from the raw water inlet 13, and further fed into the spiral wound membrane element 1 from an end thereof.

As shown in FIG. 5, the raw water 7 fed into the spiral wound membrane element 1 from the first end surface thereof linearly flows toward the second end surface along the raw water spacer 6 in a direction (axial direction) parallel to the water collection pipe 5. In the process of the flow of the raw water 7 along the raw water spacer 6, part of the raw water 7 is permeated through the separation membranes 2 due to the pressure difference between the raw water side and a permeate side. This permeate 8 flows into the water collection pipe 5 along the permeate spacer 3, and is discharged from the end of the water collection pipe 5. The remaining raw water 7a not permeated through the separation membranes 2 is discharged from the second end surface of the spiral wound membrane element 1.

The permeate 8 discharged from the end of the water collection pipe 5 is taken out from the pressure vessel 10 from the permeate outlet 14 through the pipe 28, as shown in FIG. 2. The raw water 7a discharged from the second end surface of the spiral wound membrane element 1 is guided into the second liquid chamber 19. In this case, the valve 30c of the pipe 27 connected to the raw water outlet 15 and the valve 30d of the pipe 27a are closed, whereby permeation through the separation membranes 2 is facilitated in the spiral wound membrane element 1 for performing dead end filtration.

In the aforementioned filtration process, suspended, colloidal or dissolved matter contained in the raw water 7 is deposited on the membrane surfaces of the separation membranes 2 of the spiral wound membrane element 1 as contaminants. In particular, contaminants are readily deposited on the membrane surfaces of the separation membranes 2 in dead end filtration. Such deposition of contaminants results in reduction of the water permeation velocity, and hence the contaminants are removed by the following washing:

As shown in FIG. 3, the valves 30a, 30e and 30d of the pipes 25, 28 and 27a are closed and the valves 30b, 30f and 30c of the pipes 26, 29 and 27 are opened in washing, for performing back wash reverse filtration.

In this back wash reverse filtration, wash water 21 is fed to the opening end of the water collection pipe 5 from the permeate outlet 14 through the pipes 29 and 28, and introduced into the water collection pipe 5. The wash water 21 is prepared from the permeate 8, for example. The wash water 21 introduced into the water collection pipe 5 is guided into the separation membranes 2 from the outer peripheral surface of the water collection pipe 5, and permeated through the separation membranes 2 in a direction opposite to that in filtration. At this time, contaminants deposited on the membrane surfaces of the separation membranes 2 are separated from the separation membranes 2. The outer peripheral surface of the spiral wound membrane element 1 is covered with the sheath member, whereby the wash water 21 permeated through the separation membranes 2 axially flows through the spiral wound membrane element 1 along the raw water spacer 6, and is discharged into the first and second liquid chambers 18 and 19 from both ends of the spiral wound membrane element 1. Further, the wash water 21 is taken out from the raw water inlet 13 and the raw water outlet 15 through the pipes 26 and 27 respectively.

In this case, pressures on the sides of the permeate outlet 14, the raw water inlet 13 and the raw water outlet 15 are set to apply a back pressure of 0.05 to 0.3 MPa to the separation membranes 2. Thus, a necessary amount of the wash water 21 can be fed in a short time, so that contaminants clogging in pores of the separation membranes 2 can be effectively separated. Further, the separated contaminants can be inhibited from being captured by the raw water spacer 6 before the same are discharged from the end of the spiral wound membrane element 1, to be effectively removed.

While the wash water 21 taken out from the raw water inlet 13 is totally discharged from the system as waste water in this example, the wash water 21 may alternatively be partially discharged from the system as waste water and partially recycled as the raw water 7. For example, a further pipe may be provided downstream the valve 30b of the pipe 27 and connected to the raw water tank 500, for partially returning the wash water 21 to the raw water tank 500.

While the wash water 21 taken out from the raw water outlet 15 is totally discharged from the system as waste water in this example, the wash water 21 may alternatively be partially discharged from the system as waste water and partially recycled as the raw water 7. For example, the valves 30c and 30d of the pipes 27 and 27a may be opened for partially returning the wash water 21 to the raw water tank 500 through the pipe 27a.

While the wash water 21 is discharged from both ends of the spiral wound membrane element 1 and taken out from the raw water inlet 13 and the raw water outlet 15 through the pipes 26 and 27 respectively in back wash reverse filtration in the example shown in FIG. 3, the pressures on the sides of the permeate outlet 14 and the raw water inlet 13 may alternatively be so set that the wash water 21 is discharged into the first liquid chamber 18 from the first end of the spiral wound membrane element 1 and taken out from the raw water inlet 13 through the pipe 26. In this case, the valve 30c of the pipe 27 and the raw water outlet 15 are closed. Further alternatively, the pressures on the sides of the permeate outlet 14 and the raw water outlet 15 may be so set that the wash water 21 is discharged into the second liquid chamber 19 from the second end of the spiral wound membrane element 1 and taken out from the raw water outlet 15 through the pipe 27. In this case, the valve 30b of the pipe 26 and the raw water inlet 13 are closed.

After performing back wash reverse filtration in the aforementioned manner, the valves 30b and 30f of the pipes 26 and 29 are closed and the valve 30a of the pipe 25 is opened. Thus, raw water 31 taken from the raw water tank 500 is fed into the pressure vessel 10 from the raw water inlet 13 through the pipe 25, and introduced into the first liquid chamber 18. The raw water 31 is fed into the spiral wound membrane element 1 from the first end thereof, axially flows through the spiral wound membrane element 1 along the raw water spacer 6 and is thereafter discharged from the second end. Thus, contaminants separated from the separation membranes 2 are carried from the first end toward the second end of the spiral wound membrane element 1 along with the raw water 31, and discharged from the second end of the spiral wound membrane element 1 into the second liquid chamber 19 along with the wash water 21 remaining in the spiral wound membrane element 1. Further, the contaminants are taken out from the pressure vessel 10 from the raw water outlet 15 through the pipe 27 along with the raw water 31.

Therefore, the contaminants separated from separation membranes 2 in the spiral wound membrane element 1 can be quickly discharged from the system by performing flushing of feeding the raw water 31 in the same direction as that in filtration after back wash reverse filtration. Thus, the contaminants separated from the separation membranes 2 can be prevented from adhering to the separation membranes 2 again.

According to the aforementioned running method in washing, contaminants deposited on the separation membranes 2 in filtration can be effectively removed, whereby stable running can be performed without reducing the permeate flux over a long period also in dead end filtration readily causing deposition of contaminants on the membrane surfaces.

While flushing of axially feeding the raw water 31 is performed after back wash reverse filtration in this example, the former may alternatively be performed before the latter. According to this washing method, most contaminants captured on the membrane surface of the spiral wound membrane element 1 are removed by flushing, and contaminants remaining on the membrane surface of the spiral wound membrane element 1 can be removed by further introducing the wash water 21. Therefore, an effect similar to that of the aforementioned back wash reverse filtration can be attained also in this case.

Alternatively, flushing of axially feeding the raw water 31 may be performed in parallel with back wash reverse filtration. For example, the valves 30*a*, 30*b*, 30*c* and 30*f* of the pipes 25, 26, 27 and 29 may be simultaneously opened in washing for feeding the wash water 21 from the permeate side while feeding the raw water 31 from the raw water side. In this case, an effect similar to that attained when feeding the raw water 31 after back wash reverse filtration as described above can be attained.

While the raw water 31 is fed from the raw water inlet 13 and taken out from the raw water outlet 15 in this example, the raw water 31 may alternatively be fed from the raw water outlet 15 and taken out from the raw water inlet 13, to be fed through the spiral wound membrane element 1 in the direction opposite to that in filtration. In this case, an effect similar to that attained when feeding the raw water 31 in the same direction as that in filtration as described above can be attained.

When the raw water 31 is fed in the same direction as that in filtration, contaminants deposited on a side closer to the second liquid chamber 19 of the spiral wound membrane element 1 can be readily removed and discharged in particular. When the raw water 31 is fed in the direction opposite to that in filtration, contaminants deposited on a side closer to the first liquid chamber 18 of the spiral wound membrane element 1 can be readily removed and discharged in particular.

Further alternatively, raw water may be successively fed in the same direction as and in the opposite direction to that in filtration. In this case, contaminants distributed along the overall spiral wound membrane element 1 can be homogeneously removed and discharged.

While the raw water 31 taken out from the raw water outlet 15 is totally discharged from the system as waste water in this example, the raw water 31 may alternatively be partially discharged from the system as waste water and partially recycled as raw water. For example, the valves 30*c* and 30*d* of the pipes 27 and 27*a* may be opened for partially returning the raw water 31 to the raw water tank 500 through the pipe 27*a*.

According to this exemplary running method shown in FIGS. 2 and 3, contaminants deposited on the membrane surface of the spiral wound membrane element 1 can be sufficiently removed, whereby dead end filtration can be stably performed while maintaining a high permeate flux in the spiral wound membrane module 100 shown in FIG. 1, for efficiently obtaining the permeate 8. In this case, dead end filtration is performed, whereby no large pump may be required for feeding the raw water 7 but the scale of the system can be reduced. Thus, the system cost is reduced.

In this example, the fed raw water 7 (FIG. 2) may contain a chemical such as sodium hypochlorite having a contaminant separating function such as a function of dissolving, decomposing or separating contaminants or a sterilizing function. When the raw water 7 fed into the spiral wound membrane element 1 contains sodium hypochlorite having a contaminant separating function and a sterilizing function, for example, contaminants adhering to the membrane surface of the spiral wound membrane element 1 can be separated and deposition of contaminants can be suppressed, while microorganisms can be inhibited from propagating on the membrane surface. Thus, the spiral wound membrane element 1 can attain further stable performance over a long period.

Alternatively, the raw water 7 may contain ozone, hydrogen peroxide, chloramine or peracetic acid in place of sodium hypochlorite. Such a chemical having a sterilizing function can inhibit microorganisms from propagating on the membrane surface of the spiral wound membrane element 1 similarly to sodium hypochlorite.

The chemical is injected into the raw water 7 before the raw water 7 is fed into the spiral wound membrane module 100, for example.

The chemical may be continuously and regularly or intermittently injected into the raw water 7. When the chemical is intermittently injected, injection of the chemical is controlled with a timer, for example. Alternatively, the state of contamination of the spiral wound membrane element 1 may be checked from the operating pressure or the permeate flow rate, for injecting the chemical when contaminants are deposited on the spiral wound membrane element 1, i.e., when the operating pressure is increased or the permeate flow rate is reduced. In this case, a measuring instrument such as an operating pressure gauge, a permeate flow meter or a transmembrane pressure difference meter is set in an apparatus into which the spiral wound membrane module 100 is assembled, for injecting the chemical according to a signal received from the measuring instrument.

In addition to the aforementioned chemical having a contaminant separating function and/or a sterilizing function, a flocculant may be injected into the raw water 7. In this case, contaminants contained in the raw water 7 are so flocculated that the spiral wound membrane element 1 can readily capture contaminants, possibly permeated through the membranes of the spiral wound membrane element 1 if the raw water 7 contains no flocculant, on the membrane surface due to the flocculating function. The contaminants captured on the membrane surface of the spiral wound membrane element 1 in the aforementioned manner can be discharged from the system by the aforementioned back wash reverse filtration with a high back pressure.

In this example, the permeate 8 containing a chemical having a contaminant separating function such as a function of dissolving, decomposing or separating contaminants may be employed as the wash water 21 (FIG. 3) applied to back wash reverse filtration. Alternatively, the permeate 8 may contain a chemical having a sterilizing function. For example, the permeate 8 containing sodium hypochlorite of 1 to 10000 ppm in concentration, chloramine of 0.1 to 10 ppm in concentration, hydrogen peroxide of 10 to 10000 ppm in concentration, sulfuric acid of pH 1 to 3, nitric acid of pH 1 to 3, hydrochloric acid of pH 1 to 3, sodium hydroxide of pH 10 to 13, peracetic acid of 10 to 10000 ppm in concentration, isopropyl alcohol of 0.1 to 50% in concentration, citric acid of 0.2 to 2% in concentration or oxalic acid of 0.2 to 2% in concentration is employed as the wash water 21. When the wash water 21 contains such a chemical, contaminants adhering to the membrane surface of the spiral wound membrane element 1, particularly those clogging in the pores of the separation membranes 2 can be effectively removed, and microorganisms can be inhibited from propagating on the membrane surface.

Particularly when turbid raw water 7 (FIG. 2) containing a large quantity of contaminants is subjected to dead end filtration, turbid components (contaminants) contained in the raw water 7 are captured on the separation membranes 2 of the spiral wound membrane element 1 in a large quantity to clog in pores of the separation membranes 2. If only the permeate 8 is employed as the wash water 21 in back wash reverse filtration, therefore, it is difficult to completely remove the contaminants. When the aforementioned chemical is injected into the permeate 8 employed as the wash water 21 for back wash reverse filtration in this case, contaminants can be readily removed for enabling effective washing.

The chemical may be continuously injected into the permeate 8, or the chemical may be injected after performing back wash reverse filtration with the permeate 8 a number of times.

In this example, the raw water 31 (FIG. 3) fed from at least one end of the spiral wound membrane element 1 to axially flow through the spiral wound membrane element 1 in washing may contain the aforementioned chemical having a contaminant removing function or a sterilizing function. When the raw water 31 contains such a chemical, contaminants adhering to the membrane surface of the spiral wound membrane element 1, particularly those deposited on the membrane surface to form a cake layer can be readily removed while microorganisms can be inhibited from propagating on the membrane surface.

Particularly when the pores of the membranes of the spiral wound membrane element 1 are clogged with contaminants and a cake layer is simultaneously formed on the membrane surfaces due to deposition of contaminants, the raw water 31 containing the chemical is preferably regularly or periodically introduced into the spiral wound membrane element 1 from at least one end thereof and axially fed through the spiral wound membrane element 1 in parallel with back wash reverse filtration performed by introducing the wash water 21 containing the chemical from at least one opening end of the perforated hollow pipe 5. Thus, the clogging in the pores of the membranes of the spiral wound membrane element 1 and the cake layer formed on the membrane surfaces can be simultaneously removed for enabling effective washing.

When the aforementioned spiral wound membrane element 1 is washed, the spiral wound membrane element 1 may be soaked in the wash water 21 or the raw liquid 31 containing the chemical for several 10 minutes to several hours after introducing the wash water 21 containing the chemical into the spiral wound membrane element 1 from an end of the water collection pipe 2 or introducing the raw liquid 31 containing the chemical from at least one end of the spiral wound membrane element 1. Thus, contaminants clogging in the pores of the membranes of the spiral wound membrane element 1 and those deposited on the membrane surfaces to form a cake layer can be further readily removed for enabling more effective washing. Further, microorganisms can be more effectively inhibited from propagating on the membrane surfaces. In addition, contaminants can be discharged from the spiral wound membrane module 100 by further performing back wash reverse filtration on the spiral wound membrane element 1 soaked in the wash water 21 or the raw water 31 containing the chemical or feeding the raw water 31 from an end of the spiral wound membrane element 1.

The spiral wound membrane element 1 is washed by the aforementioned soaking once to several times a day or in response to change of running conditions for the spiral wound membrane module 100 such as increase of the operating pressure or reduction of the permeate flow rate, for example.

Figure 4:
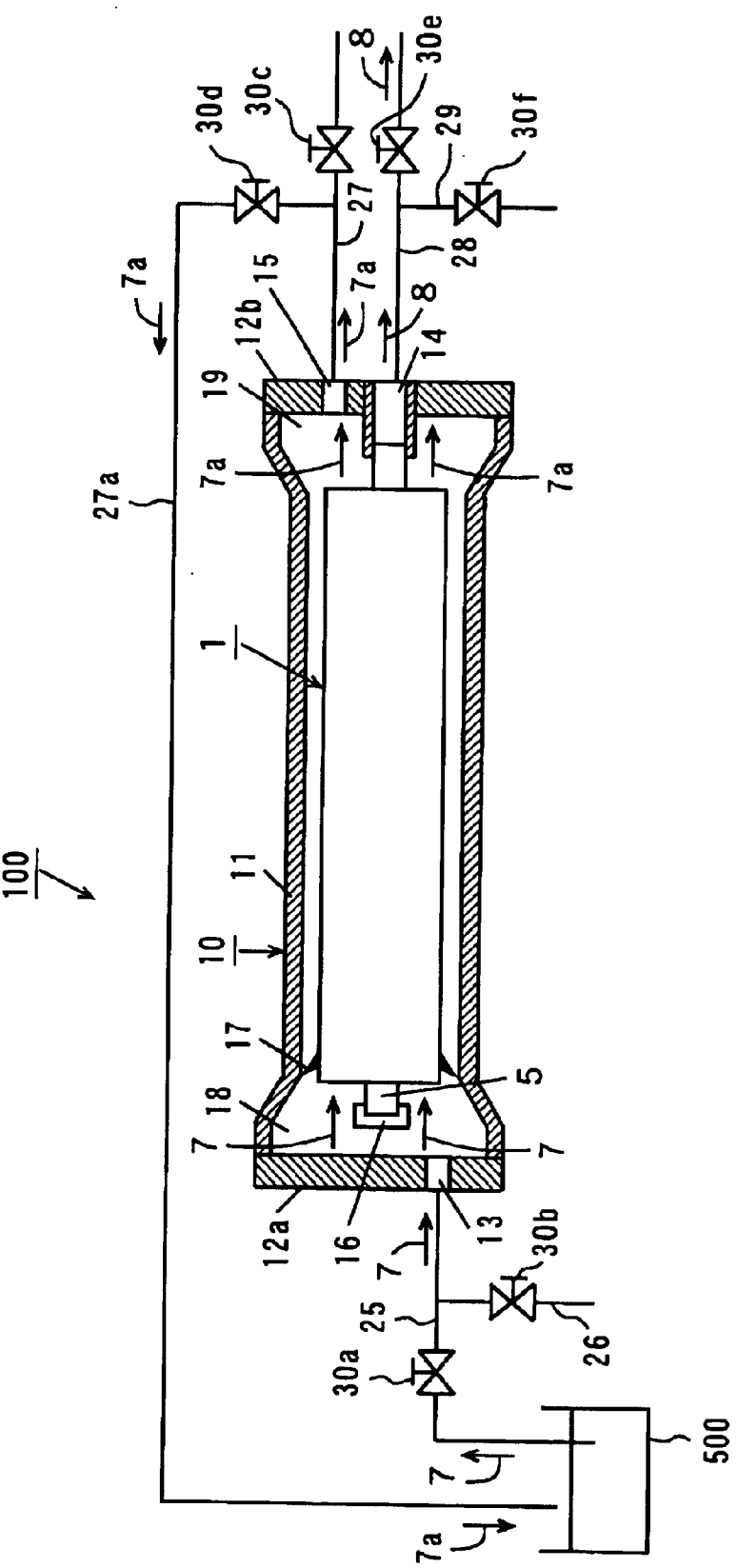
FIG. 4 is a schematic sectional view showing another exemplary method of running a spiral wound membrane module according to the present invention.

FIG. 4 is a schematic sectional view showing another exemplary method of running a spiral wound membrane module according to the present invention. The running method shown in FIG. 4, employed in filtration, is applied to the spiral wound membrane module 100 shown in FIG. 1 also in this case. In this example, a running method in washing is similar to the aforementioned running method shown in FIG. 3.

As shown in FIG. 4, the valves 30a, 30e and 30d of the pipes 25, 28 and 27a are opened and the valves 30b, 30c and 30f of the pipes 26, 27 and 29 are closed in filtration.

In this case, the raw water 7 taken from the raw water tank 500 is introduced into the first liquid chamber 18 of the pressure vessel 10 from the raw water inlet 13 through the pipe 25, similarly to the case shown in FIG. 2. Further, the raw water 7 is fed into the spiral wound membrane element 1 from the first end thereof.

As shown in FIG. 5, partial raw water is permeated through the separation membranes 2, flows into the water collection pipe 5 and is discharged from the end of the water collection pipe 5 as the permeate 8 in the spiral wound membrane element 1. The remaining raw water 7a not permeated through the separation membranes 2 is discharged from the second end surface of the spiral wound membrane element 1.

The permeate 8 discharged from the end of the water collection pipe 5 is taken out from the pressure vessel 10 from the permeate outlet 14 through the pipe 28, as shown in FIG. 4. The raw water 7a discharged from the second end surface of the spiral wound membrane element 1 is guided into the second liquid chamber 19 and thereafter taken out from the raw water outlet 15 through the pipe 27a, to be returned to the raw water tank 500. Thus, filtration is performed in the spiral wound membrane module 100 while taking out the partial raw water 7a from the raw water outlet 15 in this example. Thus, retention of any liquid can be suppressed in the clearance between the outer peripheral surface of the spiral wound membrane element 1 and the inner peripheral surface of the pressure vessel 10. Further, an axial flow of the raw water from the first end toward the second end is formed in the spiral wound membrane element 1, whereby partial contaminants can be discharged from the pressure vessel 10 along with the raw water 7a while suppressing sedimentation of contaminants contained in the raw water.

While the valve 30d is regularly opened for taking out the raw water 7a in the above description, the valve 30d may alternatively be intermittently opened for taking out the raw water 7a. Also in this case, the separation membranes 2 can be inhibited from adhesion of contaminants similarly to the case of regularly taking out the raw water 7a.

While the raw water 7a taken out from the pressure vessel 10 is totally returned to the raw water tank 500 in the above description, the taken out raw water 7a may alternatively be partially discharged from the system. For example, the valves 30d and 30c may be opened for partially discharging the raw water 7a from the system through the pipe 27.

Also in this example, back wash reverse filtration is performed with a high back pressure in washing by the running method in washing shown in FIG. 3 while introducing the raw water 31. Thus, contaminants deposited on the separation membranes 2 in filtration can be effectively removed.

According to the running method of this example, as hereinabove described, contaminants deposited on the membrane surface can be sufficiently removed, whereby stable running can be performed without reducing the permeate flux over a long period.

Particularly in this example, partial contaminants can be discharged from the pressure vessel 10 along with the raw water 7a while inhibiting contaminants contained in the raw water 7 from sedimenting on the membrane surface by taking out the partial raw water 7a from the pressure vessel 10 in filtration as shown in FIG. 4, whereby more stable filtration running can be performed. In this case, the raw water 7a taken out from the raw water outlet 15 is circulated through the pipe 27a, whereby the permeate 8 can be obtained with high recovery. Further, no large pump may be employed for feeding the raw water 7 but the scale of the system can be reduced. Thus, the system cost is reduced.

Also in running of the spiral wound membrane element 1 shown in FIG. 4, the fed raw water 7 may contain a chemical such as sodium hypochlorite having a contaminant removing function or a sterilizing function or a flocculant, similarly to that in running of the spiral wound membrane element 1 shown in FIG. 1. Further, the permeate 8 employed as the wash water 21 in washing and the raw water 31 fed from at least the end of eth spiral wound membrane element 1 in washing may contain a chemical such as sodium hypochlorite having a contaminant removing function or a sterilizing function.

While the spiral wound membrane module 100 comprising the single spiral wound membrane element 1 is run in the above description, the running method according to the present invention is also applicable to a spiral wound membrane module comprising a plurality of spirally wound membrane elements.

Figure 6:
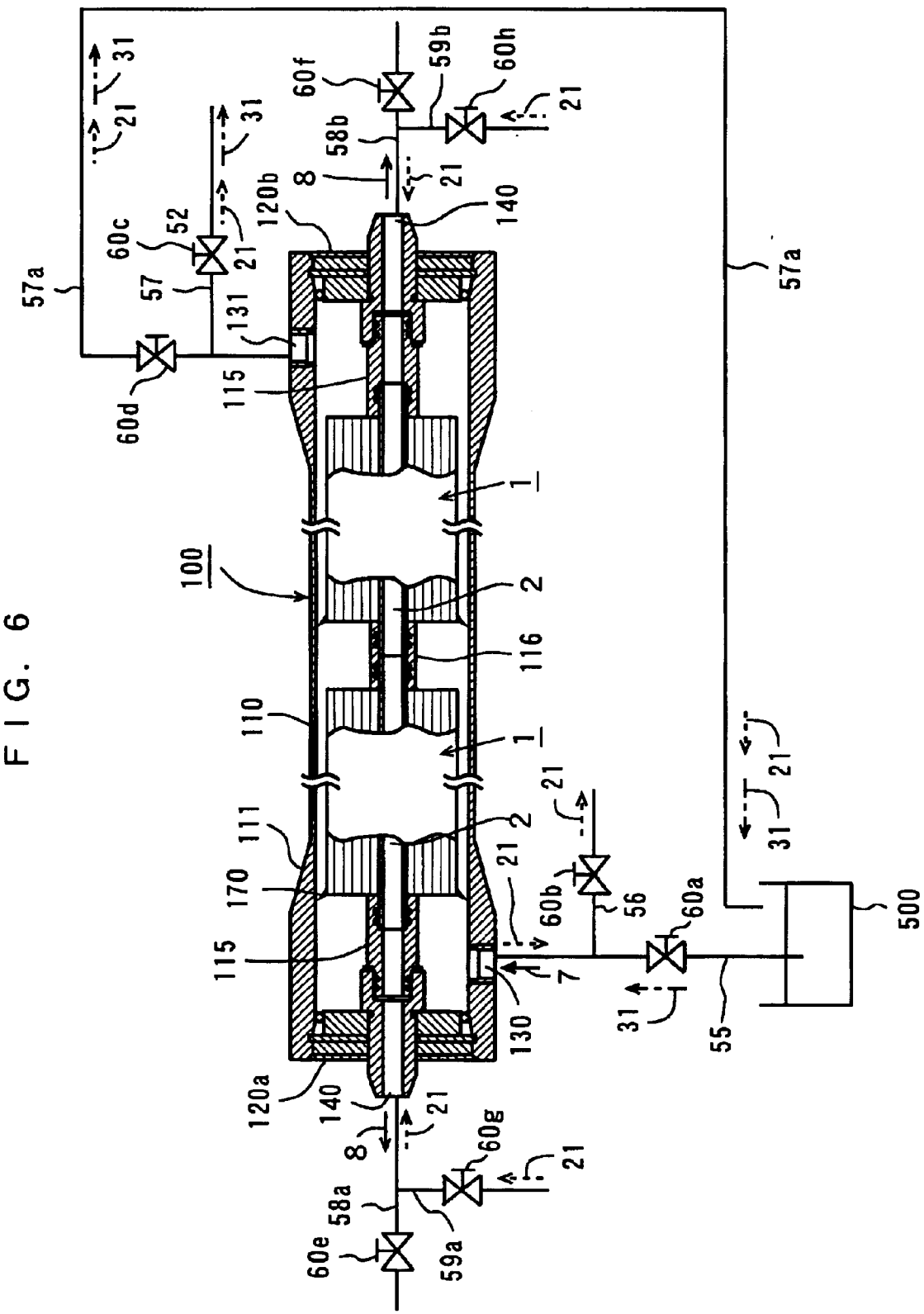
FIG. 6 is a schematic sectional view showing still another exemplary method of running a spiral wound membrane module according to the present invention.

FIG. 6 is a schematic sectional view showing still another exemplary method of running a spirally wound membrane module according to the present invention.

As shown in FIG. 6, this spiral wound membrane module 100 is formed by storing a plurality of spirally wound membrane elements 1 in a pressure vessel 110. The pressure vessel 110 is formed by a tubular case 111 and a pair of end plates 120a and 120b. A raw water outlet 130 is formed on the bottom portion of the tubular case 111, and a raw water outlet 131 is formed on the upper portion thereof. Thus, the pressure vessel 110 has a side entry shape. The raw water outlet 131 is employed also for deairing. Permeate outlets 140 are provided on the central portions of the end plates 120a and 120b.

The plurality of spiral wound membrane elements 1 having water collection pipes 5 serially connected with each other by interconnectors 116 are stored in the tubular case 111, and both opening ends of the tubular case 111 are sealed with the end plates 120a and 120b respectively. Each of the spiral wound membrane elements 1 is formed by the spiral wound membrane element 1 shown in FIG. 5. Single ends of the water collection pipes 5 of the endmost spiral wound membrane elements 1 are engaged with the permeate outlets 140 of the end plates 120a and 120b respectively through adaptors 115. Packings 170 are mounted on portions closer to single ends of the outer peripheral surfaces of the spiral wound membrane elements 1, to separate the internal space of the pressure vessel 110 into a plurality of liquid chambers.

The raw water inlet 130 of the spiral wound membrane module 100 is connected to a raw water tank 500 through a pipe 55. A valve 60a is interposed in the pipe 55, and a pipe 56 having a valve 60b interposed therein is connected downstream the valve 30a. A pipe 57 having a valve 60c interposed therein is connected to the raw water outlet 131, and a pipe 57a having a valve 60d interposed therein is connected upstream the valve 60c of the pipe 57. The raw water outlet 131 is connected to the raw water tank 500 through the pipe 57a. A pipe 58a having a valve 60e interposed therein is connected to the permeate outlet 140 of the end plate 120a, and a pipe 59a having a valve 60g interposed therein is connected upstream the valve 60e. A pipe 58b having a valve 60f interposed therein is connected to the permeate outlet 140 of the end plate 120b, and a pipe 59b having a valve 60h interposed therein is connected upstream the valve 60f.

In filtration of the spiral wound membrane module 100, the valves 60a, 60e and 60f of the pipes 55, 58a and 58b are opened, and the valves 60b, 60g, 60h, 60c and 60d of the pipes 56, 59a, 59b, 57 and 57a are closed.

Raw water 7 taken from the raw water tank 500 is fed into the pressure vessel 110 from the raw water inlet 130 through the pipe 55. In the spiral wound membrane module 100, the raw water 7 fed from the raw water inlet 130 is introduced into the endmost spiral wound membrane element 1 closer to the end plate 120a from a first end surface thereof. In this spiral wound membrane element 1, partial raw water is permeated through the separation membranes 2 to flow into the water collection pipe 5, and discharged from an end of the water collection pipe 5 as permeate 8, as shown in FIG. 6. The remaining raw water 7a not permeated through the separation membranes 2 is discharged from a second end surface. The discharged raw water 7a is introduced into the subsequent spiral wound membrane element 1 from a first end surface thereof, and separated into permeate 8 and raw water 7a similarly to the above. Thus, membrane separation is performed in each of the plurality of spiral wound membrane elements 1 serially connected with each other. In this case, the valves 60c and 60d of the pipes 57 and 57a are closed and hence permeation through the separation membranes 2 is facilitated in each spiral wound membrane element 1, for performing dead end filtration in the spiral wound membrane module 100.

In the aforementioned filtration process, contaminants contained in the raw water 7 are deposited on the membrane surfaces of the separation membranes 2 of the spiral wound membrane elements 1. Particularly when dead end filtration is performed in the spiral wound membrane module 100 comprising the plurality of spiral wound membrane elements 1 as described above, contaminants are readily deposited on the membrane surfaces of the separation membranes 2. Such deposition of contaminants results in reduction of the water permeation velocity, and hence the contaminants are removed by the following washing:

In washing, the valves 60a, 60e, 60f and 60d of the pipes 55, 58a, 58b and 57a are closed and the valves 60b, 60c, 60g and 60h of the pipes 56, 57, 59a and 59b are opened for performing back wash reverse filtration.

In back wash reverse filtration, wash water 21 is fed to first ends of the water collection pipes 5 closer to the end plate 120a from the permeate outlet 140 through the pipes 59a and 58a. Further, wash water 21 is fed to second ends of the water collection pipes 5 closer to the end plate 120b from the permeate outlet 140 through the pipes 59b and 58b. Thus, the wash water 21 is introduced into the water collection pipes 5 from both ends thereof. The wash water 21 introduced into the water collection pipes 5 is guided into the separation membranes 2 from the outer peripheral surface of the water collection pipe 5 in each spiral wound membrane element 1, and permeated through the separation membranes 2 in a direction opposite to that in filtration. At this time, contaminants deposited on the membrane surfaces of the separation membranes 2 are separated from the separation membranes 2. The wash water 21 permeated through the separation membranes 2 axially flows through the spiral wound membrane element 1 along a raw water spacer 6, and is discharged from both ends of each spiral wound membrane element 1. The discharged wash water 21 is taken out from the raw water inlet 130 and the raw water outlet 131 through the pies 56 and 57 respectively.

In this case, pressures on the sides of the permeate outlets 140, the raw water inlet 130 and the raw water outlet 131 are set to apply a back pressure of 0.05 to 0.3 MPa to the separation membranes 2 of each spiral wound membrane element 1. Thus, a necessary amount of the wash water 21 can be fed in a short time, for effectively separating contaminants deposited on the membrane surfaces of the separation membranes 2. Further, the separated contaminants can be inhibited from being captured by the raw water spacer 6 before the same are discharged from an end of each spiral wound membrane element 1, to be effectively removed.

While the wash water 21 taken out from the raw water inlet 130 is totally discharged from the system as waste water in this example, the wash water 21 may alternatively be partially discharged from the system as waste water and partially recycled as the raw water 7. For example, a further pipe may be provided downstream the valve 60b of the pipe 56 and connected to the raw water tank 500, thereby partially returning the wash water 21 to the raw water tank 500.

While the wash water 21 taken out from the raw water outlet 131 totally discharged from the system as waste water in this example, the wash water 21 may alternatively be partially discharged from the system as waste water and partially recycled as the raw water 7. For example, the valves 60c and 60d of the pipes 57 and 57a may be opened for partially returning the wash water 21 to the raw water tank 500 through the pipe 57a.

While the wash water 21 is taken out from the raw water inlet 130 and the raw water outlet 131 through the pipes 56 and 57 respectively in back wash reverse filtration in the example shown in FIG. 6, the pressures on the sides of the permeate outlets 140 and the raw water inlet 130 may alternatively be so set that the wash water 21 is taken out from the raw water inlet 130 through the pipe 56. In this case, the valve 60c of the pipe 57 and the raw water outlet 131 are closed. Further alternatively, the pressures on the sides of the permeate outlets 140 and the raw water outlet 131 may be so set that the wash water 21 is taken out from the raw water outlet 131 through the pipe 57. In this case, the valve 60b of the pipe 56 and the raw water inlet 130 are closed.

After performing back wash reverse filtration in the aforementioned manner, the valves 60b, 60g and 60h of the pipes 56, 59a and 59b are closed and the valve 60a of the pipe 55 is opened. Thus, raw water 31 taken from the raw water tank 500 is fed into the pressure vessel 110 from the raw water inlet 130 through the pipe 55. The raw water 31 is introduced into each spiral wound membrane element 1 from the first end thereof, axially flows through the spiral wound membrane element 1 along the raw water spacer 6 and is thereafter discharged from the second end. Thus, contaminants separated from the separation membranes 2 are carried from the first end toward the second end of the spiral wound membrane element 1 by the raw water 31, and discharged from the second end of the spiral wound membrane element 1 along with the wash water 21 remaining in the spiral wound membrane element 1. Further, contaminants and the wash water 21 are taken out from the pressure vessel 110 from the raw water outlet 131 through the pipe 57 along with the raw water 31.

Therefore, the contaminants separated from the separation membranes 2 in each spiral wound membrane element 1 can be quickly discharged from the system by feeding the raw water 31 in the same direction as that in filtration after back wash reverse filtration. Thus, the contaminants separated from the separation membranes 2 can be prevented from adhering to the separation membranes 2 again.

While flushing of axially feeding the raw water 31 is performed after back wash reverse filtration in this example, the former may alternatively be performed before the latter. According to this washing method, most contaminants captured on the membrane surface of the spiral wound membrane element are removed by flushing, and contaminants remaining on the membrane surface of the spiral wound membrane element 1 can be removed by further introducing the wash water 21. Therefore, an effect similar to that of the aforementioned back wash reverse filtration can be attained also in this case.

Further alternatively, the raw water 31 may be axially fed in parallel with back wash reverse filtration. For example, the valves 60a, 60b, 60c, 60g and 60h of the pipes 55, 56, 57, 59a and 59b may be simultaneously opened in washing for feeding the wash water 21 from the permeate side while feeding the raw water 31 from the raw water side. In this case, an effect similar to that attained when feeding the raw water 31 after back wash reverse filtration as described above can be attained.

While the raw water 31 is fed from the raw water inlet 130 and taken out from the raw water outlet 131 in this example, raw water may alternatively be fed from the raw water outlet 131 and taken out from the raw water inlet 130 to be fed in the direction opposite to that in filtration in each spiral wound membrane element 1. In this case, an effect similar to that attained when feeding the raw water 31 in the same direction as that in filtration as described above can be attained. Further alternatively, raw water may be successively fed in the same direction as and in the opposite direction to that in filtration. In this case, contaminants distributed along the overall spiral wound membrane element 1 can be homogeneously removed and discharged.

While the raw water 31 taken out from the raw water outlet 131 is totally discharged from the system as waste water in this example, the raw water 31 may alternatively be partially discharged from the system as waste water and partially recycled as the raw water 7. For example, the valves 60c and 60d of the pipes 57 and 57a may be opened for partially returning the raw water 31 to the raw water tank 500 through the pipe 57a.

According to the aforementioned running method in washing, contaminants deposited on the separation membranes 2 in filtration can be effectively removed.

According to this running method, as hereinabove described, contaminants deposited on the membrane surfaces can be sufficiently removed, whereby running can be stably performed while maintaining a high permeate flux also in dead end filtration readily causing deposition of contaminants on the membrane surfaces, for efficiently obtaining the permeate 8. In this case, dead end filtration is performed, whereby no large pump may be employed for feeding the raw water 7 but the scale of the system can be reduced. Thus, the system cost is reduced.

Also in this example, the fed raw water 7 may contain a chemical such as sodium hypochlorite having a contaminant removing function or a sterilizing function, similarly to the method of running a spiral wound membrane element and a spiral wound membrane module shown in FIG. 1. In this case, contaminants adhering to the membrane surface of each spiral wound membrane element 1 can be removed and inhibited from deposition, while microorganisms can be inhibited from propagating on the membrane surface. Thus, the spiral wound membrane module can attain more stable performance over a long period.

When washing the spiral wound membrane module, the permeate 8 containing a chemical such as sodium hypochlorite having a contaminant removing function or a sterilizing function may be employed as the wash water 21 for back wash reverse filtration. In this case, contaminants clogging in the pores of the spiral wound membrane element 1 can be effectively removed, and microorganisms can be inhibited from propagating on the membrane surface. Thus, the spiral wound membrane module attains more stable performance over a long period.

Further, the raw water 31 containing a chemical having a contaminant removing function or a sterilizing function may be fed from at least one end of the spiral wound membrane element 1 in washing. In this case, contaminants deposited on the membrane surface of each spiral wound membrane element 1 to form a cake layer can be effectively removed, and microorganisms can be inhibited from propagating on the membrane surface. Thus, the spiral wound membrane module attains more stable performance over a long period.

While the spiral wound membrane module 100 shown in FIG. 6 is subjected to dead end filtration similarly to the example shown in FIG. 2 in the above description, the spiral wound membrane module 100 shown in FIG. 6 may alternatively be subjected to filtration while taking out the partial raw water 7a from the pressure vessel 110 similarly to the example shown in FIG. 4.

In filtration of the spiral wound membrane module 100 shown in FIG. 6, for example, the valve 60d of the pipe 57a may be regularly or intermittently opened for taking out the partial raw water 7a not permeated through the separation membranes 2 of the spiral wound membrane element 1 in the raw water 7 fed into the pressure vessel 110 from the pressure vessel 110 from the raw water outlet 131 through the pipe 57a and returning the same to the raw water tank 500. Thus, retention of any liquid can be suppressed in the clearance between the outer periphery of each spiral wound membrane element 1 and the inner peripheral surface of the pressure vessel 110. Further, an axial flow of raw water is formed from the first end toward the second end in each spiral wound membrane element 1, whereby partial contaminants can be discharged from the pressure vessel 110 along with the raw water 7a while suppressing sedimentation of contaminants contained in the raw water.

According to the running method performing filtration while partially taking out the raw water, more stable running can be performed without reducing the permeate flux over a long period. In this case, the taken out raw water 7a is circulated through the pipe 57a, whereby the permeate 8 can be obtained with high recovery. Further, no large pump may be employed for feeding the raw water 7 but the scale of the system can be reduced. Thus, the system cost is reduced.

Figure 7:
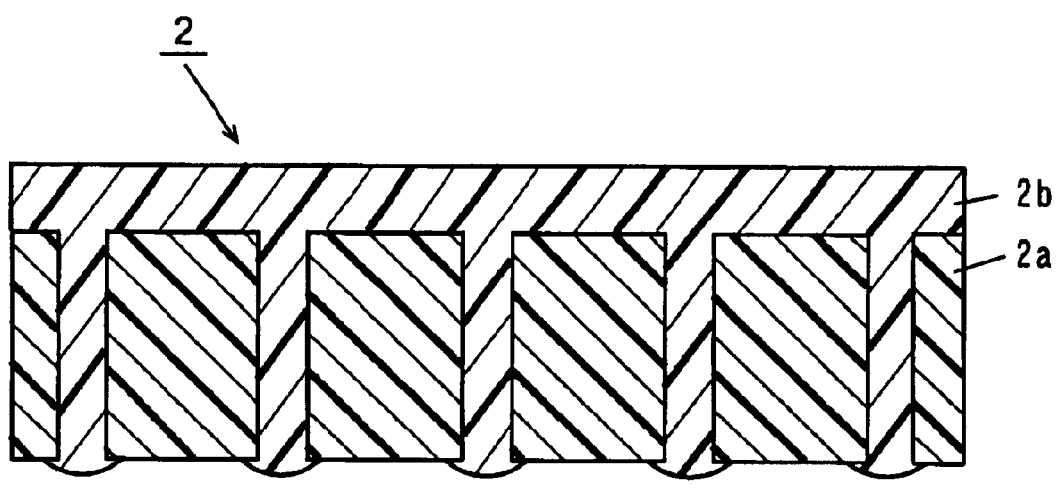
FIG. 7 is a sectional view of a separation membrane employed for the spiral wound membrane element shown in FIG. 5.

FIG. 7 is a sectional view of each separation membrane 2 employed for the spiral wound membrane element 1 shown in FIG. 5. The separation membrane 2 is formed by closely integrating a permeable membrane body 2b having a substantial separation function with a surface of a porous reinforcing sheet (porous sheet member) 2a.

The permeable membrane body 2b is made of a single type of polysulfone resin or a mixture of at least two types of polysulfone resin, or a copolymer or a mixture of polysulfone resin and a polymer such as polyimide or fluorine-containing polyimide resin.

The porous reinforcing sheet 2a is made of woven fabric, nonwoven fabric, a mesh net or a foaming sintered sheet prepared from polyester, polypropylene, polyethylene or polyamide, and the nonwoven fabric is preferable in consideration of the membrane forming property and the cost.

The porous reinforcing sheet 2a and the permeable membrane body 2b are bonded to each other in such an anchored state that the resin component forming the permeable membrane body 2b is partially charged into pores of the porous reinforcing sheet 2a.

Back pressure strength of the separation membrane 2 lined with the porous reinforcing sheet 2a is improved to 0.4 to 0.5 MPa beyond 0.2 MPa. A method of defining the back pressure strength is described later.

In order to attain back pressure strength of at least 0.2 MPa by employing nonwoven fabric as the material for the porous reinforcing sheet 2a, the nonwoven fabric is preferably 0.08 to 0.15 mm in thickness and 0.5 to 0.8 g/cm$^3$ in density. If the thickness is smaller than 0.08 mm or the density is smaller than 0.5 g/cm$^3$, sufficient strength for serving as the reinforcing sheet 2a cannot be attained but it is difficult to ensure back pressure strength of at least 0.2 MPa for the separation membrane 2. If the thickness is larger than 0.15 mm or the density is larger than 0.8 g/cm$^3$, on the other hand, filtration resistance of the porous reinforcing sheet 2a may be increased or the anchoring effect to the nonwoven fabric (porous reinforcing sheet 2a) is reduced to readily cause separation between the permeable membrane body 2b and the nonwoven fabric.

A method of preparing the aforementioned separation membrane 2 is now described. First, a solvent, a non-solvent and a swelling agent are added to polysulfone and the mixture is heated/dissolved for preparing a homogeneous membrane forming solution. The polysulfone resin is not particularly restricted so far as the same has at least one (—SO$_2$—) site in its molecular structure, as shown in the following structural formula (1):

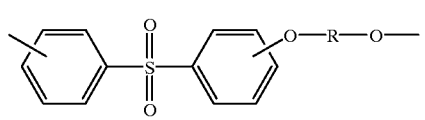

(1)

where R represents a bivalent aromatic, alicyclic or aliphatic hydrocarbon radical or a bivalent organic radical formed by bonding such hydrocarbon radicals with a bivalent organic bonding radical.

Preferably, polysulfone expressed in any of the following structural formulas (2) to (4) is employed:

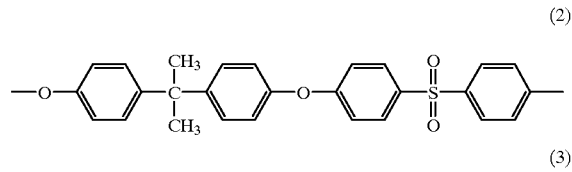

(2)

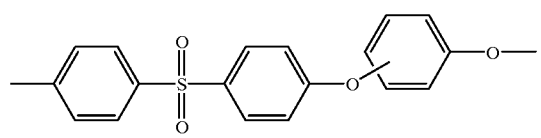

(3)

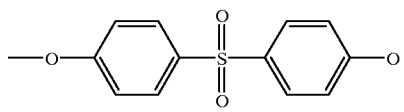

(4)

As the solvent for polysulfone, N-methyl-2-pyrolidone, dimethylformamide, dimethylacetamide, dimethylsulfoxide or the like is preferably employed. As the non-solvent, aliphatic polyhydric alcohol such as ethylene glycol, diethylene glycol, propylene glycol, polyethylene glycol or glycerin, lower aliphatic alcohol such as methanol, ethanol or isopropyl alcohol or lower aliphatic ketone such as methyl ethyl ketone is preferably employed.

The content of the non-solvent in the mixture, not particularly restricted so far as the obtained mixture is homogeneous, is generally 5 to 50 percent by weight, and preferably 20 to 45 percent by weight.

As the swelling agent employed for prompting or controlling formation of a porous structure, metal salt such as lithium chloride, sodium chloride or lithium nitrate, a water-soluble polymer such as polyethylene glycol, polyvinyl alcohol, polyvinyl pyrolidone or polyacrylic acid or metal salt thereof, formamide or the like is employed. The content of the swelling agent in the mixture, not particularly restricted so far as the membrane forming solution is homogeneous, is generally 1 to 50 percent by weight.

The concentration of polysulfone in the membrane forming solution is preferably 10 to 30 percent by weight in general. Permeability of the obtained porous separation membrane is inferior in practicalness if the concentration exceeds 30 percent by weight, while mechanical strength of the obtained porous separation membrane is so inferior that sufficient back pressure strength cannot be attained if the concentration is smaller than 10 percent by weight.

A film of the aforementioned membrane forming solution is formed on a nonwoven fabric support. In other words, a support sheet of nonwoven fabric or the like is successively taken out from a continuous membrane forming apparatus so that the membrane forming solution is applied onto its surface. The membrane forming solution is applied onto the nonwoven fabric support with a gap coater such as a knife coater or a roll coater. When the roll coater is employed, for example, the membrane forming solution is stored between two rolls to be applied onto the nonwoven fabric support and sufficiently impregnated into the nonwoven fabric at the same time, and thereafter passed through a low humidity atmosphere for absorbing a small amount of moisture contained in the atmosphere in the surface of the liquid film applied onto the nonwoven fabric and causing microphase separation on the surface layer of the liquid film. Thereafter the liquid film is soaked in a solidification water tank to be entirely phase-separated and solidified, and the solvent is removed by washing in a washing tank. Thus, the separation membrane 2 is formed.

Thus, the aforementioned separation membrane 2 having high back pressure strength is prevented from breakage also when employed for the spiral wound membrane element 1 shown in FIG. 1 or 6 and subjected to back wash reverse filtration with a back pressure of 0.05 to 0.3 MPa.

EXAMPLES

In each of Inventive Examples 1 to 3 and comparative example 1, a spiral wound ultrafiltration membrane element including ultrafiltration membranes having the structure shown in FIG. 7 as the separation membranes 2 was so prepared as to perform a continuous water filtration test on the spiral wound membrane module shown in FIG. 1 comprising this spiral wound ultrafiltration membrane element.

Table 1 shows the specifications of the spiral wound ultrafiltration membrane elements employed for Inventive Examples 1 to 3 and comparative example 1.

TABLE 1

| Shape | Spiral |
| --- | --- |
| Material | Polysulfone |
| Size | 202 mm in diameter by 1016 mm in length |
| Membrane Area | 40 m²/Element |

Each ultrafiltration membrane employed for the spiral wound ultrafiltration membrane elements of Inventive Examples 1 to 3 and comparative example 1 was prepared as follows:

16.5 parts by weight of polysulfone (P-3500 by BP Amoco), 50 parts by weight of N-methyl-2-pyrolidone, 24.5 parts by weight of diethylene glycol and 1 part by weight of formamide were heated/dissolved for obtaining a homogeneous membrane forming solution. The membrane forming solution was impregnated into/applied to the surface of polyester nonwoven fabric of 0.1 mm in thickness and 0.8 g/cm³ in density with a roll coater having a coater gap adjusted to 0.13 mm.

Thereafter the nonwoven fabric was passed through an atmosphere (low humidity atmosphere) having relative humidity of 25% and a temperature of 30° C. for causing microphase separation, thereafter soaked in a solidification water tank of 35° C. to be de-solvented and solidified, and thereafter the remaining solvent was removed by washing in a washing tank for obtaining a separation membrane 2. The microphase separation time (the time for passing through the low humidity atmosphere) for the separation membrane 2 was 4.5 seconds in each of Inventive Examples 1 and 2.

The ultrafiltration membrane prepared in the aforementioned manner exhibited a permeate flow rate of 1700 L/m².hr and back pressure strength of 0.3 MPa, and rejection of polyethylene oxide having a mean molecular weight of 1,000,000 was 99%.

The back pressure strength is defined by a pressure applied when a membrane of 47 mm in diameter is set on a back pressure strength holder (perforated diameter: 23 mm), a water pressure is gradually applied from the side of the porous reinforcing sheet 2a and the permeable membrane body 2b is separated from the porous reinforcing sheet 2a or the permeable membrane body 2b and the porous reinforcing sheet 2a are simultaneously broken.

The rejection of polyethylene oxide was obtained from concentrations of a raw liquid and a permeated liquid through the following formula by permeating a polyethylene oxide solution of 500 ppm in concentration with a pressure of 1 kgf/cm²:

Rejection (%)=[1−(concentration of permeated liquid/concentration of raw liquid)]×100

A continuous water filtration test of each spiral wound membrane module comprising ultrafiltration membranes prepared in the aforementioned manner is now described. In this continuous water filtration test, industrial water (pH: 6 to 8, water temperature: 10 to 30° C.) was fed as the raw water 7.

INVENTIVE EXAMPLE 1

In Inventive Example 1, sodium hypochlorite having a sterilizing function and a contaminant removing function was regularly injected into the raw water 7 fed into the spiral wound membrane module shown in FIG. 1 for performing filtration. Table 2 shows running conditions for the spiral wound membrane module in Inventive Example 1.

TABLE 2

| Running Method | Constant Flow Rate Filtration |
| --- | --- |
| Filtration System | Dead End Filtration (FIG. 2) |
| Filtration Rate | 2 $m^3/m^2$/day |
| Physical Washing Interval | 30 min. |
| Back Wash Reverse Filtration Time | 40 sec. |
| Chemical injection (sodium hypochlorite) | injected into raw water by 1 ppm |

In back wash reverse filtration, the permeate 8 (FIG. 2) was employed as the wash water 21 (FIG. 3) and fed with a back pressure of 0.1 to 0.2 MPa and a flow rate of 56 L/min. In this case, the raw water 31 (FIG. 3) was fed into the spiral wound membrane module after back wash reverse filtration, and fed through the spiral wound ultrafiltration membrane element in the same direction as that for feeding the raw water 7 (FIG. 2) in filtration.

The aforementioned filtration and washing were repeated for continuously running the spiral wound ultrafiltration membrane element. The relation between the running time and the transmembrane pressure difference in the spiral wound ultrafiltration membrane element was investigated.

INVENTIVE EXAMPLE 2

In Inventive Example 2, sodium hypochlorite having a sterilizing function and a contaminant removing function was injected into the wash water 21 (FIG. 3) in back wash reverse filtration of the spiral wound membrane module shown in FIG. 1, for performing back wash reverse filtration with the wash water 21 (back wash reverse filtration water). Table 3 shows running conditions for the spiral wound membrane module in Inventive Example 2.

TABLE 3

| Running Method | Constant Flow Rate Filtration |
| --- | --- |
| Filtration System | Dead End Filtration (FIG. 2) |
| Filtration Rate | 2 $m^3/m^2$/day |
| Physical Washing Interval | 30 min. |
| Back Wash Reverse Filtration Time | 40 sec. |
| Chemical injection (sodium hypochlorite) | injected into back wash reverse filtration water by 5 ppm |

In back wash reverse filtration, the permeate 8 (FIG. 2) was employed as the wash water 21 (FIG. 3) and fed with a back pressure of 0.1 to 0.2 MPa and a flow rate of 56 L/min. In this case, the raw water 31 (FIG. 3) was fed into the spiral wound membrane module after back wash reverse filtration, and fed through the spiral wound ultrafiltration membrane element in the same direction as that for feeding the raw water 7 (FIG. 2) in filtration.

The aforementioned filtration and washing were repeated for continuously running the spiral wound ultrafiltration membrane element. The relation between the running time and the transmembrane pressure difference in the spiral wound ultrafiltration membrane element was investigated.

INVENTIVE EXAMPLE 3

In Inventive Example 3, the spiral wound membrane module shown in FIG. 1 was continuously run for five days, and thereafter wash water containing sodium hypochlorite having a sterilizing function and a contaminant removing function was fed into the spiral wound membrane module for soaking/washing the spiral wound ultrafiltration membrane element therein. Table 4 shows running conditions for the spiral wound membrane module in Inventive Example 3.

TABLE 4

| Running Method | Constant Flow Rate Filtration |
| --- | --- |
| Filtration System | Dead End Filtration (FIG. 2) |
| Filtration Rate | 2 $m^3/m^2$/day |
| Physical Washing Interval | 30 min. |
| Back Wash Reverse Filtration Time | 40 sec. |
| Chemical injection (sodium hypochlorite) | injected into wash water by 100 ppm for soaking for 1 h. |

In back wash reverse filtration, the permeate 8 (FIG. 2) was employed as the wash water 21 (FIG. 3) and fed with a back pressure of 0.1 to 0.2 MPa and a flow rate of 56 L/min. In this case, the raw water 31 (FIG. 3) was fed into the spiral wound membrane module after back wash reverse filtration, and fed through the spiral wound ultrafiltration membrane element in the same direction as that for feeding the raw water 7 (FIG. 2) in filtration.

In Inventive Example 3, sodium hypochlorite was properly injected into the wash water 21 for back wash reverse filtration in soak washing, and the wash water 21 containing the injected sodium hypochlorite was employed as wash water for soak washing.

The aforementioned filtration and washing were repeated for continuously running the spiral wound membrane module. The relation between the running time and the transmembrane pressure difference in the spiral wound ultrafiltration membrane element was investigated.

COMPARATIVE EXAMPLE 1

In comparative example 1, no chemical was injected in filtration running and washing of the spiral wound membrane module shown in FIG. 1. Table 5 shows running conditions for the spiral wound membrane module in comparative example 1.

TABLE 5

| Running Method | Constant Flow Rate Filtration |
| --- | --- |
| Filtration System | Dead End Filtration (FIG. 2) |
| Filtration Rate | 2 $m^3/m^2$/day |
| Physical Washing Interval | 30 min. |
| Back Wash Reverse Filtration Time | 40 sec. |
| Chemical Injection (sodium hypochlorite) | neither into raw water nor into wash water |

In back wash reverse filtration, the permeate 8 (FIG. 2) was employed as the wash water 21 (FIG. 3) and fed with a back pressure of 0.1 to 0.2 MPa and a flow rate of 56 L/min. In this case, the raw water 31 (FIG. 3) was fed into the spiral wound membrane module after back wash reverse filtration, and fed through the spiral wound ultrafiltration membrane element in the same direction as that for feeding the raw water 7 (FIG. 2) in filtration.

The aforementioned filtration and washing were repeated for continuously running the spiral wound membrane module. The relation between the running time and the transmembrane pressure difference in the spiral wound ultrafiltration membrane element was investigated.

FIG. 8 shows time change of the transmembrane pressure differences of the spiral wound membrane modules in Inventive Examples 1 to 3 and comparative example 1.

As shown in FIG. 8, microorganisms can be inhibited from propagating on the membrane surface and contaminants can be prevented from adhering to the membrane surface in Inventive Example 1 regularly injecting sodium hypochlorite into the raw water 7. Therefore, change of the transmembrane pressure difference of the spiral wound ultrafiltration membrane element was so small that it was possible to stably run the spiral wound membrane module continuously over a long period.

In Inventive Example 2 injecting sodium hypochlorite into the wash water 21 in back wash reverse filtration, the membrane surface comes into contact with sodium hypochlorite only at a constant interval, an hence the effect thereof is reduced as compared with Inventive Example 1. Also in this case, however, increase of the transmembrane pressure difference can be sufficiently suppressed in the spiral wound ultrafiltration membrane element, and change of the transmembrane pressure difference can be reduced. Therefore, it was possible to stably run the spiral wound membrane module continuously over a long period.

In Inventive Example 3, no chemical is injected in filtration and back wash reverse filtration and hence the transmembrane pressure difference is increased as the running time elapses. In this case, however, soak washing is performed with the wash water containing sodium hypochlorite following increase of the transmembrane pressure difference, and hence increase of the transmembrane pressure difference can be suppressed. Therefore, it was possible to stably run the spiral wound membrane module continuously over a long period.

In comparative example 1 injecting no chemical injection in filtration and washing, it was impossible to continuously run the spiral wound membrane module due to abrupt increase of the transmembrane pressure difference caused as the running time elapses.

(2) Second Embodiment

A method of running a spiral wound membrane module according to a second embodiment of the present invention is now described. The structure of the spiral wound membrane module employed in this embodiment is similar to that of the spiral wound membrane module 100 shown in FIG. 1 or 5.

An exemplary method of running a spiral wound membrane module according to this embodiment is described with reference to FIGS. 2 and 3. This running method is applied to the spiral wound membrane module 100 shown in FIG. 1.

As shown in FIG. 2, the valves 30a and 30e of the pipes 25 and 28 are opened and the valves 30b, 30c, 30d and 30f of the pipes 26, 27, 27a and 29 are closed in filtration.

Raw water 7 taken from the raw water tank 500 is fed into the pressure vessel 10 from the raw water inlet 13 through the pipe 25. In the spiral wound membrane module, the fed raw water 7 is introduced into the first liquid chamber 18 of the pressure vessel 10 from the raw water inlet 13, and further fed into the spiral wound membrane element 1 from an end thereof.

As shown in FIG. 5, the raw water 7 fed into the spiral wound membrane element 1 from the first end surface thereof linearly flows toward the second end surface along the raw water spacer 6 in a direction (axial direction) parallel to the water collection pipe 5. In the process of the flow of the raw water 7 along the raw water spacer 6, part of the raw water 7 is permeated through the separation membranes 2 due to the pressure difference between the raw water side and a permeate side. This permeate 8 flows into the water collection pipe 5 along the permeate spacer 3, and is discharged from the end of the water collection pipe 5. The remaining raw water 7a not permeated through the separation membranes 2 is discharged from the second end surface of the spiral wound membrane element 1.

The permeate 8 discharged from the end of the water collection pipe 5 is taken out from the pressure vessel 10 from the permeate outlet 14 through the pipe 28, as shown in FIG. 2. The raw water 7a discharged from the second end surface of the spiral wound membrane element 1 is guided into the second liquid chamber 19. In this case, the valve 30c of the pipe 27 connected to the raw water outlet 15 and the valve 30d of the pipe 27a are closed, whereby permeation through the separation membranes 2 is facilitated in the spiral wound membrane element 1 for performing dead end filtration.

In the aforementioned filtration process, suspended, colloidal or dissolved matter contained in the raw water 7 is deposited on the membrane surfaces of the separation membranes 2 of the spiral wound membrane element 1 as contaminants. In particular, contaminants are readily deposited on the membrane surfaces of the separation membranes 2 in dead end filtration. Such deposition of contaminants results in reduction of the water permeation velocity, and hence the contaminants are removed by the following washing:

In filtration running of the aforementioned spiral wound membrane module 100, the valve 30a of the pipe 25 is temporarily closed for stopping feeding the raw water 7 while stopping taking out the permeate 8 from the permeate outlet 14. Thus, the filtration running is temporarily stopped and the pressure vessel 10 is held for a prescribed time in a state filled with the raw water 7, the raw water 7a and the permeate 8 and sealed (liquid seal stopping). After performing such liquid seal stopping for a prescribed time, the valve 30a of the pipe 25 is reopened for feeding the raw water 7 into the spiral wound membrane element 1 and taking out the permeate 8 from the permeate outlet 14 thereby restarting filtration running. When performing this filtration running while taking out the partial raw water 7a by opening the valve 30c of the pipe 27, the valve 30c of the pipe 27 is opened/closed in association with the valve 30a of the pipe 25.

Thus, the aforementioned filtration running and liquid seal stopping are repeated in the running period of the spiral wound membrane module 100.

In the spiral wound membrane module 100 subjected to liquid seal stopping in filtration running, the pressures on the raw water side and the permeate side of the separation membranes 2 of the spiral wound membrane element 1 are substantially held at the atmospheric pressure, so that no flows of any liquid are formed on the raw water side and the permeate side. Due to this liquid seal stopping, contaminants adhering to the membrane surface of the spiral wound membrane element 1 following continuous filtration running of the spiral wound membrane module 100 can be separated. Thus, the membrane function of the spiral wound membrane element 1 reduced by adhesion of contaminants is recovered.

The aforementioned liquid seal stopping in filtration running may be periodically or unperiodically performed. Liquid seal stopping is unperiodically performed when the permeate flow rate is reduced in the spiral wound membrane module 100, for example.

As shown in FIG. 3, the valves 30a, 30e and 30d of the pipes 25, 28 and 27a are closed and the valves 30b, 30f and 30c of the pipes 26, 29 and 27 are opened in washing, for performing back wash reverse filtration.

In this back wash reverse filtration, wash water 21 is fed to the opening end of the water collection pipe 5 from the permeate outlet 14 through the pipes 29 and 28, and introduced into the water collection pipe 5. The wash water 21 is prepared from the permeate 8, for example. The wash water 21 introduced into the water collection pipe 5 is guided into the separation membranes 2 from the outer peripheral surface of the water collection pipe 5, and permeated through the separation membranes 2 in a direction opposite to that in filtration. At this time, contaminants deposited on the membrane surfaces of the separation membranes 2 are separated from the separation membranes 2. The outer peripheral surface of the spiral wound membrane element 1 is covered with the sheath member, whereby the wash water 21 permeated through the separation membranes 2 axially flows through the spiral wound membrane element 1 along the raw water spacer 6, and is discharged into the first and second liquid chambers 18 and 19 from both ends of the spiral wound membrane element 1. Further, the wash water 21 is taken out from the raw water inlet 13 and the raw water outlet 15 through the pipes 26 and 27 respectively.

In this case, pressures on the sides of the permeate outlet 14, the raw water inlet 13 and the raw water outlet 15 are set to apply a back pressure of 0.05 to 0.3 MPa to the separation membranes 2. Thus, a necessary amount of the wash water 21 can be fed in a short time, so that contaminants deposited on the membrane surfaces of the separation membranes 2 can be effectively separated. Further, the separated contaminants can be inhibited from being captured by the raw water spacer 6 before the same are discharged from the end of the spiral wound membrane element 1, to be effectively removed.

While the wash water 21 taken out from the raw water inlet 13 is totally discharged from the system as waste water in this example, the wash water 21 may alternatively be partially discharged from the system as waste water and partially recycled as the raw water 7. For example, a further pipe may be provided downstream the valve 30b of the pipe 27 and connected to the raw water tank 500, for partially returning the wash water 21 to the raw water tank 500.

While the wash water 21 taken out from the raw water outlet 15 is totally discharged from the system as waste water in this example, the wash water 21 may alternatively be partially discharged from the system as waste water and partially recycled as the raw water 7. For example, the valves 30c and 30d of the pipes 27 and 27a may be opened for partially returning the wash water 21 to the raw water tank 500 through the pipe 27a.

While the wash water 21 is discharged from both ends of the spiral wound membrane element 1 and taken out from the raw water inlet 13 and the raw water outlet 15 through the pipes 26 and 27 respectively in back wash reverse filtration in the example shown in FIG. 3, the pressures on the sides of the permeate outlet 14 and the raw water inlet 13 may alternatively be so set that the wash water 21 is discharged into the first liquid chamber 18 from the first end of the spiral wound membrane element 1 and taken out from the raw water inlet 13 through the pipe 26. In this case, the valve 30c of the pipe 27 and the raw water outlet 15 are closed. Further alternatively, the pressures on the sides of the permeate outlet 14 and the raw water outlet 15 may be so set that the wash water 21 is discharged into the second liquid chamber 19 from the second end of the spiral wound membrane element 1 and taken out from the raw water outlet 15 through the pipe 27. In this case, the valve 30b of the pipe 26 and the raw water inlet 13 are closed.

Liquid seal stopping may be performed in the aforementioned back wash reverse filtration. In this case, the valve 30b of the pipe 26 is closed for stopping discharging the wash water 21 while stopping introducing the wash water 21 into the water collection pipe 5, for holding the pressure vessel 10 in a state filled with the wash water 21 and sealed for a prescribed time. After performing such liquid seal stopping for the prescribed time, the valve 30b of the pipe 26 is opened for discharging the wash water 21 and introducing the wash water 21 into the water collection pipe 5 thereby restarting back wash reverse filtration.

In the spiral wound membrane module 100 subjected to liquid seal stopping in back wash reverse filtration, the pressures on the raw water side and the permeate side of the separation membranes 2 of the spiral wound membrane element 1 are substantially held at the atmospheric pressure so that no flows of any liquid are formed on the raw water side and the permeate side. Contaminants adhering to the membrane surface of the spiral wound membrane element 1 can be more effectively separated due to such liquid seal stopping.

After performing back wash reverse filtration in the aforementioned manner, the valves 30b and 30f of the pipes 26 and 29 are closed and the valve 30a of the pipe 25 is opened. Thus, raw water 31 taken from the raw water tank 500 is fed into the pressure vessel 10 from the raw water inlet 13 through the pipe 25, and introduced into the first liquid chamber 18. The raw water 31 is fed into the spiral wound membrane element 1 from the first end thereof, axially flows through the spiral wound membrane element 1 along the raw water spacer 6 and is thereafter discharged from the second end. Thus, contaminants separated from the separation membranes 2 are carried from the first end toward the second end of the spiral wound membrane element 1 along with the raw water 31, and discharged from the second end of the spiral wound membrane element 1 into the second liquid chamber 19 along with the wash water 21 remaining in the spiral wound membrane element 1. Further, the contaminants are taken out from the pressure vessel 10 from the raw water outlet 15 through the pipe 27 along with the raw water 31.

Therefore, the contaminants separated from the separation membranes 2 in the spiral wound membrane element 1 can be quickly discharged from the system by performing flushing of feeding the raw water 31 in the same direction as that in filtration after back wash reverse filtration. Thus, the contaminants separated from the separation membranes 2 can be prevented from adhering to the separation membranes 2 again.

According to the aforementioned running method in washing, contaminants deposited on the separation membranes 2 in filtration can be effectively removed, whereby stable running can be performed without reducing the permeate flux over a long period also in dead end filtration readily causing deposition of contaminants on the membrane surfaces.

While flushing of axially feeding the raw water 31 is performed after back wash reverse filtration in this example, the former may alternatively be performed before the latter. According to this washing method, most contaminants captured on the membrane surface of the spiral wound membrane element 1 are removed by flushing, and contaminants remaining on the membrane surface of the spiral wound membrane element 1 can be removed by further introducing the wash water 21. Therefore, an effect similar to that of the aforementioned back wash reverse filtration can be attained also in this case.

Alternatively, flushing of axially feeding the raw water 31 may be performed in parallel with back wash reverse filtration. For example, the valves 30a, 30b, 30c and 30f of the pipes 25, 26, 27 and 29 may be simultaneously opened in washing for feeding the wash water 21 from the permeate side while feeding the raw water 31 from the raw water side. In this case, an effect similar to that attained when feeding the raw water 31 after back wash reverse filtration as described above can be attained.

While the raw water 31 is fed from the raw water inlet 13 and taken out from the raw water outlet 15 in this example, the raw water 31 may alternatively be fed from the raw water outlet 15 and taken out from the raw water inlet 13, to be fed through the spiral wound membrane element 1 in the direction opposite to that in filtration. In this case, an effect similar to that attained when feeding the raw water 31 in the same direction as that in filtration as described above can be attained.

When the raw water 31 is fed in the same direction as that in filtration, contaminants deposited on a side closer to the second liquid chamber 19 of the spiral wound membrane element 1 can be readily removed and discharged in particular. When the raw water 31 is fed in the direction opposite to that in filtration, contaminants deposited on a side closer to the first liquid chamber 18 of the spiral wound membrane element 1 can be readily removed and discharged in particular.

Further alternatively, raw water may be successively fed in the same direction as and in the opposite direction to that in filtration. In this case, contaminants distributed along the overall spiral wound membrane element 1 can be homogeneously removed and discharged.

While the raw water 31 taken out from the raw water outlet 15 is totally discharged from the system as waste water in this example, the raw water 31 may alternatively be partially discharged from the system as waste water and partially recycled as raw water. For example, the valves 30c and 30d of the pipes 27 and 27a may be opened for partially returning the raw water 31 to the raw water tank 500 through the pipe 27a.

According to this exemplary running method shown in FIGS. 2 and 3, as hereinabove described, contaminants deposited on the membrane surface of the spiral wound membrane element 1 can be sufficiently removed, whereby dead end filtration can be stably performed while maintaining a high permeate flux in the spiral wound membrane module 100 shown in FIG. 1, for efficiently obtaining the permeate 8. In this case, dead end filtration is performed, whereby no large pump may be required for feeding the raw water 7 but the scale of the system can be reduced. Thus, the system cost is reduced.

As hereinabove described, contaminants adhering to the membrane surface of the spiral wound membrane element 1 can be separated by performing liquid seal stopping of the spiral wound membrane module 100 in filtration running or back wash reverse filtration, for enabling more reliable and stable running. Such liquid seal stopping can be performed by opening/closing the valves 30a and 30b of the pipes 25 and 26 or the like, whereby no specific equipment is required but the operation can be readily performed. Further, contaminants can be separated with liquids containing no washing chemicals, whereby the cost for such washing chemicals can be saved and liquid seal stopping can be executed at a low cost.

The time for performing liquid seal stopping in the aforementioned filtration running or back wash reverse filtration of the spiral wound membrane module 100 is preferably set to at least 1 minute and not more than 24 hours. If the time for liquid seal stopping is less than 1 minute, the sealing time is so short that contaminants cannot be sufficiently separated from the membrane surface of the spiral wound membrane element 1. If the time for liquid seal stopping exceeds 24 hours, the effect of separating contaminants is not improved any more when exceeding a certain extent, while the target filtration running time is improperly compressed. In this case, further, bacteria or the like unpreferably propagate due to retention of the liquids.

In the aforementioned liquid seal stopping in filtration running and/or back wash reverse filtration of the spiral wound membrane module 100, the liquid with which the pressure vessel 10 is filled is not restricted to the raw water 7 or 7a or the permeate 8. The pressure vessel 10 may be filled with a liquid such as pure water, for example, in place of the raw water 7 or 7a or the permeate 8. In this case, the pressure vessel 10 is fed with and filled with pure water and sealed in filtration running and back wash reverse filtration. Also when sealing the pressure vessel 10 filled with pure water, contaminants can be separated from the membrane surface of the spiral wound membrane element 1 similarly to the case of sealing the pressure vessel 10 filled with the raw water 7 or 7a or the permeate 8.

While the aforementioned spiral wound membrane module 100 is subjected to liquid seal stopping in filtration running or back wash reverse filtration, the period for performing liquid seal stopping is not particularly restricted but liquid seal stopping may be performed in a period other than the aforementioned period in the running period.

For example, liquid seal stopping may be performed after filtration running, and back wash reverse filtration may be performed immediately after this liquid seal stopping. Alternatively, liquid seal stopping may be performed after filtration running and flushing with the raw water may be performed after this liquid seal stopping, for thereafter restarting filtration running. Flushing is performed by a method similar to the method described above with reference to back wash reverse filtration. Further alternatively, liquid seal stopping may be performed after back wash reverse filtration, for restarting filtration running immediately after this liquid seal stopping.

Further alternatively, liquid seal stopping may be performed in filtration running or back wash reverse filtration for thereafter feeding raw water or permeate containing a chemical into the spiral wound membrane module 100 and soaking the spiral wound membrane element 1 in the liquid containing the chemical (chemical soaking). In this case, a chemical having a sterilizing function or a contaminant separating function such as sodium hypochlorite of 10 to 10000 ppm in concentration, chloramine of 0.1 to 10 ppm in concentration, hydrogen peroxide of 10 to 10000 ppm in concentration, sulfuric acid of pH 1 to 3, hydrochloric acid of pH 1 to 3, sodium hydroxide of pH 10 to 13, peracetic acid of 10 to 10000 ppm in concentration, isopropyl alcohol of 0.1 to 50% in concentration, citric acid of 0.2 to 2% in concentration or oxalic acid of 0.2 to 2% in concentration, for example, is employed. Due to such chemical soaking of the spiral wound membrane element 1, contaminants adhering to the inner part of the spiral wound membrane module 100, particularly to the membrane surface of the spiral wound membrane element 1, can be more effectively separated and propagation of bacteria can be more effectively suppressed. After performing such chemical soaking, filtration running or back wash reverse filtration is performed.

Another exemplary method of running a spiral wound membrane module according to this embodiment is described with reference to FIG. 4. FIG. 4 shows a running method in filtration, which is applied to the spiral wound membrane module 100 shown in FIG. 1 also in this example. A running method in washing is similar to the aforementioned running method shown in FIG. 3.

As shown in FIG. 4, the valves 30a, 30e and 30d of the pipes 25, 28 and 27a are opened and the valves 30b, 30c and 30f of the pipes 26, 27 and 29 are closed in filtration.

In this case, the raw water 7 taken from the raw water tank 500 is introduced into the first liquid chamber 18 of the pressure vessel 10 from the raw water inlet 13 through the pipe 25, similarly to the example shown in FIG. 2. Further, the raw water 7 is fed into the spiral wound membrane element 1 from the first end thereof.

As shown in FIG. 5, partial raw water is permeated through the separation membranes 2, flows into the water collection pipe 5 and is discharged from the end of the water collection pipe 5 as the permeate 8 in the spiral wound membrane element 1. The remaining raw water 7a not permeated through the separation membranes 2 is discharged from the second end surface of the spiral wound membrane element 1.

The permeate 8 discharged from the end of the water collection pipe 5 is taken out from the pressure vessel 10 from the permeate outlet 14 through the pipe 28, as shown in FIG. 4. The raw water 7a discharged from the second end surface of the spiral wound membrane element 1 is guided into the second liquid chamber 19 and thereafter taken out from the raw water outlet 15 through the pipe 27a, to be returned to the raw water tank 500. Thus, filtration is performed in the spiral wound membrane module while taking out the partial raw water 7a from the raw water outlet 15 in this example. Thus, retention of any liquid can be suppressed in the clearance between the outer peripheral surface of the spiral wound membrane element 1 and the inner peripheral surface of the pressure vessel 10. Further, an axial flow of the raw water from the first end toward the second end is formed in the spiral wound membrane element 1, whereby partial contaminants can be discharged from the pressure vessel 10 along with the raw water 7a while suppressing sedimentation of contaminants contained in the raw water.

While the valve 30d is regularly opened for taking out the raw water 7a in the above description, the valve 30d may alternatively be intermittently opened for taking out the raw water 7a. Also in this case, the separation membranes 2 can be inhibited from adhesion of contaminants similarly to the case of regularly taking out the raw water 7a.

While the raw water 7a taken out from the pressure vessel 10 is totally returned to the raw water tank 500 in the above description, the raw water 7a taken out may alternatively be partially discharged from the system. For example, the valves 30d and 30c may be opened for partially discharging the raw water 7a from the system through the pipe 27.

Also in this example, back wash reverse filtration is performed with a high back pressure in washing by the running method in washing shown in FIG. 3 while introducing the raw water 31. Thus, contaminants deposited on the separation membranes 2 in filtration can be effectively removed.

According to the running method of this example, as hereinabove described, contaminants deposited on the membrane surfaces can be sufficiently removed, whereby stable running can be performed without reducing the permeate flux over a long period.

Particularly in this example, partial contaminants can be discharged from the pressure vessel 10 along with the raw water 7a while inhibiting contaminants contained in the raw water 7 from sedimenting on the membrane surfaces by taking out the partial raw water 7a from the pressure vessel 10 in filtration as shown in FIG. 4, whereby more stable filtration running can be performed. In this case, the raw water 7a taken out from the raw water outlet 15 is circulated through the pipe 27a, whereby the permeate 8 can be obtained with high recovery. Further, no large pump may be employed for feeding the raw water 7 but the scale of the system can be reduced. Thus, the system cost is reduced.

Also in this case, liquid seal stopping is performed in filtration running of the spiral wound membrane module 100, as described with reference to FIG. 2. Thus, contaminants adhering to the membrane surface of the spiral wound membrane element 1 following continuous filtration running of the spiral wound membrane module 100 can be separated for recovering the membrane function of the spiral wound membrane element 1 reduced by adhesion of contaminants.

After performing filtration running for a constant time in the running period, the spiral wound membrane element 1 is subjected to back wash reverse filtration by a method similar to the washing method described above with reference to FIG. 3.

Also in the aforementioned back wash reverse filtration, liquid seal stopping may be performed with the wash water 21 as described with reference to FIG. 3. Thus, contaminants adhering to the membrane surface of the spiral wound membrane element 1 can be more effectively separated.

As hereinabove described, contaminants adhering to the membrane surface of the spiral wound membrane element 1 can be separated by performing liquid seal stopping of the spiral wound membrane module 100 in filtration running or back wash reverse filtration, for enabling more reliable and stable running. Such liquid seal stopping can be performed by opening/closing the valves 30a and 30b of the pipes 25 and 26 (FIG. 4) or the like, whereby no specific equipment is required but the operation can be readily performed. Further, the contaminants can be separated with liquids containing no washing chemicals, whereby the cost for such washing chemicals can be saved and liquid seal stopping can be executed at a low cost. The time for liquid seal stopping in filtration running or back wash reverse filtration, timing for liquid seal stopping and liquids for sealing are identical to those described above with reference to FIGS. 2 and 3.

While the spiral wound membrane module comprising the single spiral wound membrane element 1 is run in the above description, the running method according to the present invention is also applicable to a spiral wound membrane module comprising a plurality of spirally wound membrane elements.

Still another exemplary method of running a spiral wound membrane module according to this embodiment is now described with reference to FIG. 6. The structure of the spiral wound membrane module employed in this running method is similar to that of the spiral wound membrane module 100 shown in FIG. 6.

In filtration of the spiral wound membrane module 100, the valves 60a, 60e and 60f of the pipes 55, 58a and 58b are opened, and the valves 60b, 60g, 60h, 60c and 60d of the pipes 56, 59a, 59b, 57 and 57a are closed.

Raw water 7 taken from the raw water tank 500 is fed into the pressure vessel 110 from the raw water inlet 130 through the pipe 55. In the spiral wound membrane module 100, the raw water 7 fed from the raw water inlet 130 is introduced into the endmost spiral wound membrane element 1 closer to the end plate 120a from a first end surface thereof. In this spiral wound membrane element 1, partial raw water is permeated through the separation membranes 2 to flow into the water collection pipe 5, and discharged from an end of the water collection pipe 5, as shown in FIG. 6. The remaining raw water 7a not permeated through the separation membranes 2 is discharged from a second end surface. The discharged raw water 7a is introduced into the subsequent spiral wound membrane element 1 from a first end surface thereof, and separated into permeate 8 and raw water 7a similarly to the above. Thus, membrane separation is performed in each of the plurality of spiral wound membrane elements 1 serially connected with each other. In this case, the valves 60c and 60d of the pipes 57 and 57a are closed and hence permeation through the separation membranes 2 is facilitated in each spiral wound membrane element 1, for performing dead end filtration in the spiral wound membrane module 100.

In the aforementioned filtration running of the spiral wound membrane module 100, feeding of the raw water 7 as well as takeout of the permeate 8 from the permeate outlet 140 are temporarily stopped. Thus, the filtration running is temporarily stopped for holding the pressure vessel 110 in a state filled with the raw water 7 and the permeate 8 and sealed for a prescribed time. After performing such liquid seal stopping for the prescribed time, the raw water 7 is fed again and the permeate 8 is taken out from the permeate outlet 140, for restarting filtration running.

Thus, filtration running and liquid seal stopping are repeated in the running period of the spiral wound membrane module 100 shown in FIG. 6, similarly to the running method for the spiral wound membrane module 100 shown in FIGS. 2 and 3.

In the spiral wound membrane module 100 subjected to liquid seal stopping in filtration running, the pressures on the raw water side and the permeate side of the separation membranes of the spiral wound membrane element 1 are held at the atmospheric pressure, so that no flows of any liquid are formed on the raw water side and the permeate side. Due to this liquid seal stopping, contaminants adhering to the membrane surface of each spiral wound membrane element 1 following continuous filtration running of the spiral wound membrane module 100 can be separated. Thus, the membrane function of each spiral wound membrane element 1 reduced by adhesion of contaminants is recovered.

In the aforementioned filtration process, contaminants contained in the raw water 7 are deposited on the membrane surfaces of the separation membranes 2 of the spiral wound membrane elements 1. Particularly when dead end filtration is performed in the spiral wound membrane module 100 comprising a plurality of spiral wound membrane elements 1 as described above, contaminants are readily deposited on the membrane surfaces of the separation membranes 2. Such deposition of contaminants results in reduction of the water permeation velocity, and hence the contaminants are removed by the following washing:

In washing, the valves 60a, 60e, 60f and 60d of the pipes 55, 58a, 58b and 57a are closed and the valves 60b, 60c, 60g and 60h of the pipes 56, 57, 59a and 59b are opened for performing back wash reverse filtration.

In back wash reverse filtration, wash water 21 is fed to first ends of the water collection pipes 5 closer to the end plate 120a from the permeate outlet 140 through the pipes 59a and 58a. Further, wash water 21 is fed to second ends of the water collection pipes 5 closer to the end plate 120b from the permeate outlet 140 through the pipes 59b and 58b. Thus, the wash water 21 is introduced into the water collection pipes 5 from both ends thereof. The wash water 21 introduced into the water collection pipes 5 is guided into the separation membranes 2 from the outer peripheral surface of the water collection pipe 5 in each spiral wound membrane element 1, and permeated through the separation membranes 2 in a direction opposite to that in filtration. At this time, contaminants deposited on the membrane surfaces of the separation membranes 2 are separated from the separation membranes 2. The wash water 21 permeated through the separation membranes 2 axially flows through the spiral wound membrane element 1 along the raw water spacer 6, and is discharged from both ends of each spiral wound membrane element 1. The discharged wash water 21 is taken out from the raw water inlet 130 and the raw water outlet 131 through the pies 56 and 57 respectively.

In this case, pressures on the sides of the permeate outlets 140, the raw water inlet 130 and the raw water outlet 131 are set to apply a back pressure of 0.05 to 0.3 MPa to the separation membranes 2 of each spiral wound membrane element 1. Thus, a necessary amount of the wash water 21 can be fed in a short time, for effectively separating contaminants deposited on the membrane surfaces of the separation membranes 2. Further, the separated contaminants can be inhibited from being captured by the raw water spacer 6 before the same are discharged from an end of each spiral wound membrane element 1, to be effectively removed.

While the wash water 21 taken out from the raw water inlet 130 is totally discharged from the system as waste water in this example, the wash water 21 may alternatively be partially discharged from the system as waste water and partially recycled as the raw water 7. For example, a further pipe may be provided downstream the valve 60b of the pipe 56 and connected to the raw water tank 500, thereby partially returning the wash water 21 to the raw water tank 500.

While the wash water 21 taken out from the raw water outlet 131 is totally discharged from the system as waste water in this example, the wash water 21 may alternatively be partially discharged from the system as waste water and partially recycled as the raw water 7. For example, the valves 60c and 60d of the pipes 57 and 57a may be opened for partially returning the wash water 21 to the raw water tank 500 through the pipe 57a.

While wash water 21 is taken out from the raw water inlet 130 and the raw water outlet 131 through the pipes 56 and 57 respectively in back wash reverse filtration in the example shown in FIG. 6, the pressures on the sides of the permeate outlets 140 and the raw water inlet 130 may alternatively be so set that the wash water 21 is taken out from the raw water inlet 130 through the pipe 56. In this case, the valve 60c of the pipe 57 and the raw water outlet 131 are closed. Further alternatively, the pressures on the sides of the permeate outlets 140 and the raw water outlet 131 may be so set that the wash water 21 is taken out from the raw water outlet 131 through the pipe 57. In this case, the valve 60b of the pipe 56 and the raw water inlet 130 are closed.

Liquid seal stopping may be performed in the aforementioned back wash reverse filtration. In this case, introduction of the wash water 21 into the water collection pipe 5 as well as discharge of the wash water 21 are stopped, for holding the pressure vessel 110 in a state filled with the wash water 21 and sealed for a prescribed time. After such liquid seal stopping is performed for the prescribed time, the wash water 21 is introduced into the water collection pipe 5 again while the wash water 21 is discharged, for restarting back wash reverse filtration.

In the spiral wound membrane module 100 subjected to liquid seal stopping in back wash reverse filtration, the pressures on the raw water side and the permeate side of the separation membranes of each spiral wound membrane element 1 are substantially held at the atmospheric pressure, so that no flows of any liquid are formed on the raw water side and the permeate side. Due to this liquid seal stopping, contaminants adhering to the membrane surface of the spiral wound membrane element 1 can be more effectively separated.

After performing back wash reverse filtration in the aforementioned manner, the valves 60b, 60g and 60h of the pipes 56,59a and 59b are closed and the valve 60a of the pipe 55 is opened. Thus, raw water 31 taken from the raw water tank 500 is fed into the pressure vessel 110 from the raw water inlet 130 through the pipe 55. The raw water 31 is introduced into each spiral wound membrane element 1 from the first end thereof, axially flows through the spiral wound membrane element 1 along the raw water spacer 6 and is thereafter discharged from the second end. Thus, contaminants separated from the separation membranes 2 are carried from the first end toward the second end of the spiral wound membrane element 1 by the raw water 31, and discharged from the second end of the spiral wound membrane element 1 along with the wash water 21 remaining in the spiral wound membrane element 1. Further, contaminants and the wash water 21 are taken out from the pressure vessel 110 from the raw water outlet 131 through the pipe 57 along with the raw water 31.

Therefore, the contaminants separated from the separation membranes 2 in each spiral wound membrane element 1 can be quickly discharged from the system by performing flushing of feeding the raw water 31 in the same direction as that in filtration after back wash reverse filtration. Thus, the contaminants separated from the separation membranes 2 can be prevented from adhering to the separation membranes 2 again.

While flushing of axially feeding the raw water 31 is performed after back wash reverse filtration in this example, the former may alternatively be performed before the latter. According to this washing method, most contaminants captured on the membrane surface of the spiral wound membrane element 1 are removed by flushing, and contaminants remaining on the membrane surface of the spiral wound membrane element 1 can be removed by further introducing the wash water 21. Therefore, an effect similar to that of the aforementioned back wash reverse filtration can be attained also in this case.

Further alternatively, the raw water 31 may be axially fed in parallel with back wash reverse filtration. For example, the valves 60a, 60b, 60c, 60g and 60h of the pipes 55, 56, 57, 59a and 59b may be simultaneously opened in washing for feeding the wash water 21 from the permeate side while feeding the raw water 31 from the raw water side. In this case, an effect similar to that attained when feeding the raw water 31 after back wash reverse filtration as described above can be attained.

While the raw water 31 is fed from the raw water inlet 130 and taken out from the raw water outlet 131 in this example, raw water may alternatively be fed from the raw water outlet 131 and taken out from the raw water inlet 130 to be fed in the direction opposite to that in filtration in each spiral wound membrane element 1. In this case, an effect similar to that attained when feeding the raw water 31 in the same direction as that in filtration as described above can be attained. Further alternatively, raw water may be successively fed in the same direction as and in the opposite direction to that in filtration. In this case, contaminants distributed along the overall spiral wound membrane element 1 can be homogeneously removed and discharged.

While the raw water 31 taken out from the raw water outlet 131 is totally discharged from the system as waste water in this example, the raw water 31 may alternatively be partially discharged from the system as waste water and partially recycled as the raw water 7. For example, the valves 60c and 60d of the pipes 57 and 57a may be opened for partially returning the raw water 31 to the raw water tank 500 through the pipe 57a.

According to the aforementioned running method in washing, contaminants deposited on the separation membranes 2 in filtration can be effectively removed.

According to this running method, as hereinabove described, contaminants deposited on the membrane surfaces can be sufficiently removed, whereby running can be stably performed while maintaining a high permeate flux also in dead end filtration readily causing deposition of contaminants on the membrane surfaces, for efficiently obtaining the permeate 8. In this case, dead end filtration is performed, whereby no large pump may be employed for feeding the raw water 7 but the scale of the system can be reduced. Thus, the system cost is reduced.

While the spiral wound membrane module 100 shown in FIG. 6 is subjected to dead end filtration similarly to the example shown in FIG. 2 in the above description, the spiral wound membrane module 100 shown in FIG. 6 may alternatively be subjected to filtration while taking out the partial raw water 7a from the pressure vessel 110 similarly to the example shown in FIG. 4.

In filtration of the spiral wound membrane module 100 shown in FIG. 6, for example, the valve 60d of the pipe 57a may be regularly or intermittently opened for taking out the partial raw water 7a not permeated through the separation membranes 2 of the spiral wound membrane element 1 in the raw water 7 fed into the pressure vessel 110 from the pressure vessel 110 from the raw water outlet 131 through the pipe 57a and returning the same to the raw water tank 500. Thus, retention of any liquid can be suppressed in the clearance between the outer periphery of each spiral wound membrane element 1 and the inner peripheral surface of the pressure vessel 110. Further, an axial flow of raw water is formed from the first end toward the second end in each spiral wound membrane element 1, whereby partial contaminants can be discharged from the pressure vessel 110 along with the raw water 7a while suppressing sedimentation of contaminants in the raw water.

According to the running method performing filtration while partially taking out the raw water, more stable running can be performed without reducing the permeate flux over a long period. In this case, the raw water 7a taken out is circulated through the pipe 57a, whereby the permeate 8 can be obtained with high recovery. Further, no large pump may be employed for feeding the raw water 7 but the scale of the system can be reduced. Thus, the system cost is reduced.

Further, contaminants adhering to the membrane surface of each spiral wound membrane element 1 can be separated by performing liquid seal stopping of the spiral wound membrane module 100 in filtration running or back wash reverse filtration, for enabling more reliable and stable running. The timing for such liquid seal stopping in filtration running of washing, the time for performing liquid seal stopping and the liquids for sealing are identical to those described with reference to FIGS. 2 and 3. Such liquid seal stopping requires no specific equipment but the operation can be readily performed. Further, contaminants can be separated with liquids containing no washing chemicals, whereby the cost for such washing chemicals can be saved and the liquid seal stopping can be executed at a low cost.

Also in the spiral wound membrane module 100 according to this embodiment, separation membranes having the structure shown in FIG. 7 are employed.

EXAMPLES

In each of Inventive Examples 4 and 5 and comparative example 2, a spiral wound ultrafiltration membrane element including ultrafiltration membranes having the structure shown in FIG. 7 as the separation membranes 2 was so prepared as to perform a continuous water filtration test on the spiral wound membrane module shown in FIG. 1 comprising this spiral wound ultrafiltration membrane element.

The ultrafiltration membranes employed for the spiral wound ultrafiltration membrane element according to each of Inventive Examples 4 and 5 and comparative example 2 was prepared by the same method as that for the ultrafiltration membranes employed for the spiral wound ultrafiltration membrane element according to each of the aforementioned Inventive Examples 1 to 3 and comparative example 1.

The continuous water filtration test for the spiral wound membrane module comprising the ultrafiltration membranes prepared in the aforementioned manner is now described.

Table 1 shows the specifications of the spiral wound ultrafiltration membrane elements employed for Inventive Examples 4 and 5 and comparative example 2.

INVENTIVE EXAMPLE 4

In Inventive Example 4, industrial water (pH 6 to 8, water temperature: 15 to 30° C.) was fed into the spiral wound ultrafiltration membrane element as raw water, for performing the continuous water filtration test. Filtration was stopped once in three days, and the spiral wound ultrafiltration membrane element was soaked in a washing liquid employed for back wash reverse filtration for 1 hour after the back wash reverse filtration. In this back wash reverse filtration, permeate was employed as the washing liquid, which was fed by 60 L/min. with a back pressure of 0.2 MPa. Table 6 shows the running conditions.

TABLE 6

| Running Method | Constant flow Rate Filtration |
| --- | --- |
| Filtration System | Dead End Filtration |
| Filtration Rate | 2 m$^3$/m$^2$/day |
| Physical Washing Interval | 30 min. |
| Back Wash Reverse Filtration Time | 40 sec. |

TABLE 6-continued

| Running Method | Constant flow Rate Filtration |
| --- | --- |
| Liquid sealed in Dipping | Back Wash Reverse Filtration Liquid |
| Dipping Time | 1 h. |

INVENTIVE EXAMPLE 5

In Inventive Example 5, industrial water (pH 6 to 8, water temperature: 15 to 30° C.) was fed into the spiral wound ultrafiltration membrane element as raw water similarly to Inventive Example 4, for performing the continuous water filtration test. Filtration was stopped once in 10 days, and the spiral wound ultrafiltration membrane element was soaked in a washing liquid employed for back wash reverse filtration for 1 hour after the back wash reverse filtration. In this back wash reverse filtration, permeate containing sodium hypochlorite was employed as the washing liquid, which was fed by 60 L/min. with a back pressure of 0.2 MPa. A sealing liquid was prepared from the permeate containing sodium hypochlorite. Table 7 shows the running conditions.

TABLE 7

| Running Method | Constant flow Rate Filtration |
| --- | --- |
| Filtration System | Dead End Filtration |
| Filtration Rate | 2 m$^3$/m$^2$/day |
| Physical Washing Interval | 30 min. |
| Back Wash Reverse Filtration Time | 40 sec. |
| Liquid sealed in Dipping | Sodium hypochlorite 100 ppm |
| Dipping Time | 1 h. |

COMPARATIVE EXAMPLE 2

In comparative example 2, industrial water (pH 6 to 8, water temperature: 15 to 30° C.) was fed into the spiral wound ultrafiltration membrane element as raw water similarly to Inventive Examples 4 and 5, for performing the continuous water filtration test. In comparative example 2, however, the spiral wound ultrafiltration membrane element was not soaked in a liquid by stopping filtration after back wash reverse filtration. Table 8 shows the running conditions.

TABLE 8

| Running Method | Constant flow Rate Filtration |
| --- | --- |
| Filtration System | Dead End Filtration |
| Filtration Rate | 2 m$^3$/m$^2$/day |
| Physical Washing Interval | 30 min. |
| Back Wash Reverse Filtration Time | 40 sec. |
| Element Dipping | no |

FIG. 9 shows time change of the transmembrane pressure differences of the spiral wound membrane modules in Inventive Examples 4 and 5 and comparative example 2. In Inventive Example 4, increase of the transmembrane pressure difference was suppressed due to the running for soaking the spiral wound ultrafiltration membrane element in the back wash reverse filtration liquid for 1 hour after back wash reverse filtration once in three days, for enabling continuous running with the transmembrane pressure difference of not more than 0.1 MPa.

In Inventive Example 5, increase of the transmembrane pressure difference was further suppressed due to the running for soaking the spiral wound ultrafiltration membrane element in the back wash reverse filtration liquid containing 100 ppm of sodium hypochlorite for 1 hour after back wash reverse filtration once in 10 days, for enabling continuous running with the transmembrane pressure difference of not more than 0.06 MPa. In Inventive Example 5, it was possible to run the spiral wound ultrafiltration membrane element with the transmembrane pressure difference lower than that in Inventive Example 4 conceivably because microorganisms were inhibited from propagating on the membrane surface due to the effect of washing with sodium hypochlorite having a sterilizing function.

In comparative example 2 not soaking the spiral wound ultrafiltration membrane element in the liquid while stopping filtration, the transmembrane pressure difference was abruptly increased to disable continuous running.

As understood from the aforementioned Inventive Examples 4 and 5 and comparative example 2, contaminants adhering to the membrane surface of the spiral wound ultrafiltration membrane element can be separated for suppressing increase of the transmembrane pressure difference by performing liquid seal stopping in the spiral wound membrane module. Thus, reliable and stable running is enabled.

(3) Third Embodiment

A treatment system according to a third embodiment of the present invention is now described. The structure of a spiral wound membrane module employed in the treatment system according to this embodiment is similar to that of the spiral wound membrane module 100 shown in FIG. 1 or 5.

An exemplary method of running the spiral wound membrane module according to this embodiment is described with reference to FIGS. 2 and 3. This running method is applied to the spiral wound membrane module 100 shown in FIG. 1.

As shown in FIG. 2, the valves 30a and 30e of the pipes 25 and 28 are opened and the valves 30b, 30c, 30d and 30f of the pipes 26, 27, 27a and 29 are closed in filtration.

Raw water 7 taken from the raw water tank 500 is fed into the pressure vessel 10 from the raw water inlet 13 through the pipe 25. In the spiral wound membrane module, the fed raw water 7 is introduced into the first liquid chamber 18 of the pressure vessel 10 from the raw water inlet 13, and further fed into the spiral wound membrane element 1 from an end thereof.

As shown in FIG. 5, the raw water 7 fed into the spiral wound membrane element 1 from the first end surface thereof linearly flows toward the second end surface along the raw water spacer 6 in a direction (axial direction) parallel to the water collection pipe 5. In the process of the flow of the raw water 7 along the raw water spacer 6, part of the raw water 7 is permeated through the separation membranes 2 due to the pressure difference between the raw water side and the permeate side. This permeate 8 flows into the water collection pipe 5 along the permeate spacer 3, and is discharged from the end of the water collection pipe 5. The remaining raw water 7a not permeated through the separation membranes 2 is discharged from the second end surface of the spiral wound membrane element 1.

The permeate 8 discharged from the end of the water collection pipe 5 is taken out from the pressure vessel 10 from the permeate outlet 14 through the pipe 28, as shown in FIG. 2. The raw water 7a discharged from the second end surface of the spiral wound membrane element 1 is guided into the second liquid chamber 19. In this case, the valve 30c of the pipe 27 connected to the raw water outlet 15 and the valve 30d of the pipe 27a are closed, whereby permeation through the separation membranes 2 is facilitated in the spiral wound membrane element 1 for performing dead end filtration.

The fed raw water 7 may contain a chemical having a contaminant separating function or a sterilizing function. For example, the raw water 7 containing sodium hypochlorite of 1 to 10000 ppm in concentration, the raw water 7 containing chloramine of 0.1 to 10 ppm in concentration, the raw water 7 containing hydrogen peroxide of 10 to 10000 ppm in concentration, the raw water 7 of pH 1 to 3 containing sulfuric acid, the raw water 7 of pH 1 to 3 containing nitric acid, the raw water 7 of pH 1 to 3 containing hydrochloric acid, the raw water 7 of pH 10 to 13 containing sodium hydroxide, the raw water 7 containing peracetic acid of 10 to 10000 ppm in concentration, the raw water 7 containing isopropyl alcohol of 0.1 to 50% in concentration, the raw water 7 containing citric acid of 0.2 to 2% in concentration or the raw water 7 containing oxalic acid of 0.2 to 2% in concentration is fed into the spiral wound membrane module 100. In this case, contaminants adhering to the membrane surface of the spiral wound membrane element 1 can be separated, deposition of contaminants can be suppressed and microorganisms can be inhibited from propagating on the membrane surface. Thus, the spiral wound membrane module 100 can attain stable performance over a long period.

In the aforementioned filtration process, suspended, colloidal or dissolved matter contained in the raw water 7 is deposited on the membrane surfaces of the separation membranes 2 of the spiral wound membrane element 1 as contaminants. In particular, contaminants are readily deposited on the membrane surfaces of the separation membranes 2 in dead end filtration. Such deposition of contaminants results in reduction of the water permeation velocity, and hence the contaminants are removed by the following washing:

As shown in FIG. 3, the valves 30a, 30e and 30d of the pipes 25, 28 and 27a are closed and the valves 30b, 30f and 30c of the pipes 26, 29 and 27 are opened in washing, for performing back wash reverse filtration.

In this back wash reverse filtration, wash water 21 is fed to the opening end of the water collection pipe 5 from the permeate outlet 14 through the pipes 29 and 28, and introduced into the water collection pipe 5. The wash water 21 is prepared from the permeate 8, for example. The wash water 21 introduced into the water collection pipe 5 is guided into the separation membranes 2 from the outer peripheral surface of the water collection pipe 5, and permeated through the separation membranes 2 in a direction opposite to that in filtration. At this time, contaminants deposited on the membrane surfaces of the separation membranes 2 are separated from the separation membranes 2. The outer peripheral surface of the spiral wound membrane element 1 is covered with the sheath member, whereby the wash water 21 permeated through the separation membranes 2 axially flows through the spiral wound membrane element 1 along the raw water spacer 6, and is discharged into the first and second liquid chambers 18 and 19 from both ends of the spiral wound membrane element 1. Further, the wash water 21 is taken out from the raw water inlet 13 and the raw water outlet 15 through the pipes 26 and 27 respectively.

In this case, pressures on the sides of the permeate outlet 14, the raw water inlet 13 and the raw water outlet 15 are set to apply a back pressure of 0.05 to 0.3 MPa to the separation membranes 2. Thus, a necessary amount of the wash water 21 can be fed in a short time, so that contaminants deposited on the membrane surfaces of the separation membranes 2 can be effectively separated. Further, the separated contaminants can be inhibited from being captured by the raw water spacer 6 before the same are discharged from the end of the spiral wound membrane element 1, to be effectively removed.

While the wash water 21 taken out from the raw water inlet 13 is totally discharged from the system as waste water in this example, the wash water 21 may alternatively be partially discharged from the system as waste water and partially recycled as the raw water 7. For example, a further pipe may be provided downstream the valve 30b of the pipe 27 and connected to the raw water tank 500, for partially returning the wash water 21 to the raw water tank 500.

While the wash water 21 taken out from the raw water outlet 15 is totally discharged from the system as waste water in this example, the wash water 21 may alternatively be partially discharged from the system as waste water and partially recycled as the raw water 7. For example, the valves 30c and 30d of the pipes 27 and 27a may be opened for partially returning the wash water 21 to the raw water tank 500 through the pipe 27a.

While the wash water 21 is discharged from both ends of the spiral wound membrane element 1 and taken out from the raw water inlet 13 and the raw water outlet 15 through the pipes 26 and 27 respectively in back wash reverse filtration in the example shown in FIG. 3, the pressures on the sides of the permeate outlet 14 and the raw water inlet 13 may alternatively be so set that the wash water 21 is discharged into the first liquid chamber 18 from the first end of the spiral wound membrane element 1 and taken out from the raw water inlet 13 through the pipe 26. In this case, the valve 30c of the pipe 27 and the raw water outlet 15 are closed. Further alternatively, the pressures on the sides of the permeate outlet 14 and the raw water outlet 15 may be so set that the wash water 21 is discharged into the second liquid chamber 19 from the second end of the spiral wound membrane element 1 and taken out from the raw water outlet 15 through the pipe 27. In this case, the valve 30b of the pipe 26 and the raw water inlet 13 are closed.

After performing back wash reverse filtration in the aforementioned manner, the valves 30b and 30f of the pipes 26 and 29 are closed and the valve 30a of the pipe 25 is opened. Thus, raw water 31 taken from the raw water tank 500 is fed into the pressure vessel 10 from the raw water inlet 13 through the pipe 25, and introduced into the first liquid chamber 18. The raw water 31 is fed into the spiral wound membrane element 1 from the first end thereof, axially flows through the spiral wound membrane element 1 along the raw water spacer 6 and is thereafter discharged from the second end. Thus, contaminants separated from the separation membranes 2 are carried from the first end toward the second end of the spiral wound membrane element 1 along with the raw water 31, and discharged from the second end of the spiral wound membrane element 1 into the second liquid chamber 19 along with the wash water 21 remaining in the spiral wound membrane element 1. Further, the contaminants are taken out from the pressure vessel 10 from the raw water outlet 15 through the pipe 27 along with the raw water 31.

Therefore, the contaminants separated from separation membranes 2 in the spiral wound membrane element 1 can be quickly discharged from the system by performing flushing of feeding the raw water 31 in the same direction as that in filtration after back wash reverse filtration. Thus, the contaminants separated from the separation membranes 2 can be prevented from adhering to the separation membranes 2 again.

According to the aforementioned running method in washing, contaminants deposited on the separation membranes 2 in filtration can be effectively removed, whereby stable running can be performed without reducing the permeate flux over a long period also in dead end filtration readily causing deposition of contaminants on the membrane surfaces.

While flushing of axially feeding the raw water 31 is performed after back wash reverse filtration in this example, the former may alternatively be performed before the latter. According to this washing method, most contaminants captured on the membrane surface of the spiral wound membrane element 1 are removed by flushing, and contaminants remaining on the membrane surface of the spiral wound membrane element 1 can be removed by further introducing the wash water 21. Therefore, an effect similar to that of the aforementioned back wash reverse filtration can be attained also in this case.

Alternatively, flushing of axially feeding the raw water 31 may be performed in parallel with back wash reverse filtration. For example, the valves 30a, 30b, 30c and 30f of the pipes 25, 26, 27 and 29 may be simultaneously opened in washing for feeding the wash water 21 from the permeate side while feeding the raw water 31 from the raw water side. In this case, an effect similar to that attained when feeding the raw water 31 after back wash reverse filtration as described above can be attained.

While the raw water 31 is fed from the raw water inlet 13 and taken out from the raw water outlet 15 in this example, the raw water 31 may alternatively be fed from the raw water outlet 15 and taken out from the raw water inlet 13, to be fed through the spiral wound membrane element 1 in the direction opposite to that in filtration. In this case, an effect similar to that attained when feeding the raw water 31 in the same direction as that in filtration as described above can be attained.

When the raw water 31 is fed in the same direction as that in filtration, contaminants deposited on a side closer to the second liquid chamber 19 of the spiral wound membrane element 1 can be readily removed and discharged in particular. When the raw water 31 is fed in the direction opposite to that in filtration, contaminants deposited on a side closer to the first liquid chamber 18 of the spiral wound membrane element 1 can be readily removed and discharged in particular.

Further alternatively, raw water may be successively fed in the same direction as and in the opposite direction to that in filtration. In this case, contaminants distributed along the overall spiral wound membrane element 1 can be homogeneously removed and discharged.

While the raw water 31 taken out from the raw water outlet 15 is totally discharged from the system as waste water in this example, the raw water 31 may alternatively be partially discharged from the system as waste water and partially recycled as raw water. For example, the valves 30c and 30d of the pipes 27 and 27a may be opened for partially returning the raw water 31 to the raw water tank 500 through the pipe 27a.

According to this exemplary running method shown in FIGS. 2 and 3, contaminants deposited on the membrane surface of the spiral wound membrane element 1 can be sufficiently removed, whereby dead end filtration can be stably performed while maintaining a high permeate flux in the spiral wound membrane module 100 shown in FIG. 1, for efficiently obtaining the permeate 8. In this case, dead end filtration is performed, whereby no large pump may be required for feeding the raw water 7 but the scale of the system can be reduced. Thus, the system cost is reduced.

While the permeate 8 is employed as the wash water 21 in the aforementioned example, water (hereinafter referred to as permeate equivalent water) from which contaminants are removed permeate equivalent waterly to or beyond the permeate 8 may alternatively be employed as the wash water 21. For example, permeate equivalent water such as pure water, purified water, ion-exchange water, service water or the like may be employed as the wash water 21.

Further, the permeate or the permeate equivalent water employed as the wash water 21 may contain a chemical having a contaminant separating function or a sterilizing function. For example, permeate or permeate equivalent water containing sodium hypochlorite of 1 to 10000 ppm in concentration, permeate or permeate equivalent water containing chloramine of 0.1 to 10 ppm in concentration, permeate or permeate equivalent water containing hydrogen peroxide of 1 to 10000 ppm in concentration, permeate or permeate equivalent water of pH 1 to 3 containing sulfuric acid, permeate or permeate equivalent water of pH 1 to 3 containing hydrochloric acid, permeate or permeate equivalent water of pH 10 to 13 containing sodium hydroxide, permeate or permeate equivalent water containing peracetic acid of 10 to 10000 ppm in concentration, permeate or permeate equivalent water containing isopropyl alcohol of 0.1 to 50% in concentration, permeate or permeate equivalent water containing citric acid of 0.2 to 2% in concentration or permeate or permeate equivalent water containing oxalic acid of 0.2 to 2% in concentration is employed as the wash water 21 in back wash reverse filtration. In this case, contaminants adhering to the membrane surface of the spiral wound membrane element 1 can be effectively removed, and microorganisms can be inhibited from propagating on the membrane surface.

As a washing method other than back wash reverse filtration, the pressure vessel 10 may be filled with the permeate or the aforementioned permeate equivalent water serving as wash water and sealed, for soaking the spiral wound membrane element 1 in the permeate or the permeate equivalent water (permeate soaking). In this case, the valves 30a, 30b, 30c, 30d and 30e of the pipes 25, 26, 27, 27a and 28 are closed and the valve 30f of the pipe 29 is opened, for feeding the permeate or the permeate equivalent water into the water collection pipe 5 from the permeate side through the pipes 29 and 28. Alternatively, the valve 30a of the pipe 25 is opened and the valves 30b, 30c, 30d, 30e and 30f of the pipes 26, 27, 27a, 28 and 29 are closed for feeding the permeate or the permeate equivalent water into the pressure vessel 10 from the raw water side through the pipe 25. Thus, the permeate or the permeate equivalent water is fed from the permeate side or the raw water side, for replacing the raw water stored in the pressure vessel 10 with the permeate or the permeate equivalent water. Thereafter the pressure vessel 10 is held in the state filled with the permeate or the permeate equivalent water and sealed for a prescribed time.

In the spiral wound membrane module 100 filled with the permeate or the permeate equivalent water, the pressures on the raw water side and the permeate side of the separation membranes 2 of the spiral wound membrane element 1 are substantially held at the atmospheric pressure, so that no flows of any liquid are formed on the raw water side and the permeate side. Contaminants adhering to the membrane surface of the spiral wound membrane element 1 can be effectively separated due to such filling with the permeate or the permeate equivalent water and sealing.

In place of the aforementioned permeate soaking, permeate or permeate equivalent water containing the aforementioned chemical having a contaminant separating function or a sterilizing function may be fed into the pressure vessel 10 from the permeate side or the raw water side for soaking the spiral wound membrane element 1 therein (chemical soaking). In this case, the permeate or the permeate equivalent water containing the chemical is fed from the permeate side or the raw water side by a method similar to that in the case of permeate soaking, for replacing the liquid stored in the pressure vessel 10 with the permeate or the permeate equivalent water. Thereafter the pressure vessel 10 is held in the state filled with the permeate or the permeate equivalent water containing the chemical and sealed for a prescribed time. Contaminants adhering to the membrane surface of the spiral wound membrane element can be more effectively removed and microorganisms can be more effectively inhibited from propagating on the membrane surface due to such chemical soaking.

Particularly when turbid raw water 7 containing a large quantity of contaminants is subjected to dead end filtration, turbid components (contaminants) contained in the raw water 7 are captured and deposited on an end surface of the spiral wound membrane element 1 in a large quantity. Further, contaminants not captured on this end surface are deposited on the separation membranes 2. In back wash reverse filtration employing permeate or permeate equivalent water containing no chemical, therefore, it is difficult to completely remove the contaminants. When the aforementioned chemical soaking is performed in this case, the deposited contaminants can be readily separated for enabling effective washing.

The aforementioned spiral wound membrane module 100 is employed in the treatment system described below.

FIG. 10 is a schematic block diagram showing the treatment system according to the third embodiment of the present invention.

The treatment system shown in FIG. 10 is formed by connecting two units 151 and 152, each comprising the spiral wound membrane module 100, the pipes 25 to 27, 27a, 28 and 29 and the valves 30a to 30f shown in FIG. 1, in parallel with each other. The pipes 25 connected to the raw water inlets 13 (FIG. 1) of the spiral wound membrane modules 100 of the units 151 and 152 are coupled with each other upstream the valves 30a, and further connected to a raw water pressurizing pump 101. Further, a chemical injector 105 comprising a chemical injection pump and a chemical storage tank is provided downstream the raw water pressurizing pump 101. The pipes 28 connected to the permeate outlets 14 (FIG. 1) of the spiral wound membrane modules 100 of the units 151 and 152 are coupled with each other downstream the valves 30e. The coupled pipes 28 are further connected with a pipe 23, which is connected to a washing permeate tank 104. The washing permeate tank 104 is connected to a wash water pressurizing pump 102 through the pipe 29. The pipe 29 is provided with a chemical injector 103 comprising a chemical injection pump and a chemical storage tank, and connected to the pipes 28 upstream the valves 30e of the pipes 28 of the units 151 and 152.

The valves 30a to 30f of the units 151 and 152 are automatic valves. A timer (not shown) controls an operation of opening/closing each of the valves 30a to 30f, for opening each valve by a prescribed time at a prescribed time interval.

The chemical storage tanks of the chemical injectors 103 and 105 store a chemical such as sodium hypochlorite, chloramine, hydrogen peroxide, sulfuric acid, hydrochloric acid, sodium hydroxide, peracetic acid, isopropyl alcohol, citric acid or oxalic acid, for example, having a contaminant separating function or a sterilizing function.

The aforementioned treatment system performs filtration running of the unit 151 when washing the unit 152, and performs filtration running of the unit 152 when washing the unit 151.

A method of running the treatment system is now described.

When the treatment system is run, the valves 30a and 30e of the pipes 25 and 28 of the unit 151 are opened and the valves 30b, 30c, 30d and 30f of the pipes 26, 27, 27a and 29 are closed. Thus, raw water 51 pressurized by the raw water pressurizing pump 101 is fed into the spiral wound membrane module 100 of the unit 151 through the pipe 25, and subjected to dead end filtration. The details of filtration running of the spiral wound membrane module 100 are identical to those described with reference to FIG. 2. In this case, part of obtained permeate 52a is guided into the washing permeate tank 104 through the pipe 23, ad stored therein. The remaining permeate 52a is taken out through the pipe 28.

In the aforementioned filtration running, the chemical injector 105 injects the chemical having a contaminant separating function or a sterilizing function into the raw water 51 in the process of flow of the raw water 51 through the pipe 25. In this case, the raw water 51 containing the chemical described with reference to FIG. 2 is fed into the spiral wound membrane module 100, for example. Thus, contaminants adhering to the membrane surface of the spiral wound membrane element 1 can be separated and deposition of contaminants can be suppressed. Further, microorganisms can be inhibited from propagating on the membrane surface. Therefore, the spiral wound membrane element 1 can attain more stable performance over a long period.

In the aforementioned filtration running of the unit 151, the valves 30a, 30e, 30c and 30d of the pipes 25, 28, 27 and 27a of the unit 152 are closed and the valves 30b and 30f of the pipes 26 and 29 are opened. Thus, permeate 52b taken from the washing permeate tank 104 and pressurized by the wash water pressurizing pump 102 is fed into the spiral wound membrane module 100 of the unit 152 through the pipe 29 as wash water, for performing back wash reverse filtration. After this back wash reverse filtration, the valves 30b and 30f of the pipes 26 and 29 are closed and the valves 30a an 30c of the pipes 25 and 27 are opened for feeding raw water 51b to the spiral wound membrane module 100 of the unit 152 through the pipe 25 and performing flushing. The details of the aforementioned back wash reverse filtration and flushing are identical to those described with reference to FIG. 3.

The chemical having a contaminant separating function or a sterilizing function may be injected into the permeate 52b employed for back wash reverse filtration. In this case, the chemical injector 103 injects the chemical in the process of flow of the permeate 52b through the pipe 29, so that the permeate 52b containing the chemical described with reference to FIG. 3, for example, is fed into the spiral wound membrane module 100 as wash water. Thus, the spiral wound membrane element 1 can be more effectively washed in back wash reverse filtration.

After the aforementioned flushing, the valves 30a and 30c of the pipes 25 and 27 of the unit 152 are closed and the valve 30f of the pipe 29 is opened for feeding the permeate 52b into the spiral wound membrane module 100 through the pipe 29 again. At this time, the chemical injector 103 injects the chemical having a contaminant separating function or a sterilizing function into the permeate 52b in the process of flow of the permeate 52b through the pipe 29. In this case, the permeate 52b containing the chemical described with reference to FIG. 3, for example, is fed into the spiral wound membrane module 100 as wash water from the permeate side. Thereafter the valve 30f of the pipe 29 is closed for sealing the spiral wound membrane module 100 filled with the permeate 52b containing the chemical, thereby performing chemical soaking of the spiral wound membrane element 1. The details of this chemical soaking are identical to those described with reference to FIG. 3.

In the spiral wound membrane module 100 of the unit 152, the membrane function of the spiral wound membrane element 1 reduced by adhesion of contaminants is recovered due to the aforementioned back wash reverse filtration and chemical soaking.

After performing the aforementioned filtration running of the unit 151 and washing of the unit 152 for a prescribed time, the valves 30a and 30e of the pipes 25 and 28 of the unit 151 are closed and the valves 30b and 30f of the pipes 26 and 29 are closed while the valves 30a and 30e of the pipes 25 and 28 of the unit 152 are opened. Thus, the permeate 52b taken from the washing permeate tank 104 and pressurized by the wash water pressurizing pump 102 is fed into the spiral wound membrane module 100 of the unit 151 through the pipe 29 as wash water. On the other hand, the raw water 51 pressurized by the raw water pressurizing pump 101 and supplied with the chemical by the chemical injector 105 is fed into the spiral wound membrane module 100 of the unit 152 through the pipe 25. Therefore, the unit 151 is washed and the unit 152 is subjected to filtration running, contrarily to the aforementioned case where the unit 151 is subjected to filtration running and the unit 152 is washed. In this washing of the unit 151, back wash reverse filtration, flushing and chemical soaking are performed similarly to the aforementioned washing method for the unit 152. Thus, the membrane function of the spiral wound membrane element 1 reduced by adhesion of contaminants is recovered in the unit 151.

After performing washing of the unit 151 and filtration running of the unit 152 in the aforementioned manner, filtration running of the unit 151 and washing of the unit 152 are performed again by the aforementioned method.

In the aforementioned treatment system, the timer controls operations for opening/closing the valves 30a to 30f of the units 151 and 152 for switching the pipes for feeding the raw water 51 and the permeate 52b at a prescribed time interval and washing one of the units while performing filtration running of the remaining unit. In such a treatment system, filtration running can be continuously performed for enabling efficient running with high productivity. Further, the spiral wound membrane elements 1 of the units 151 and 152 can be successively washed so that filtration running can be regularly performed with the spiral wound membrane element 1 having the membrane function recovered by washing, whereby reliable and stable running can be performed. Thus, an extremely practical and useful system is implemented.

While back wash reverse filtration and chemical soaking are successively performed in the aforementioned washing, the order of back wash reverse filtration and chemical soaking is not restricted to this and the number of times of back wash reverse filtration and chemical soaking is not restricted to this either. For example, chemical soaking and back wash reverse filtration may be performed in this order in washing, back wash reverse filtration may be performed before and after chemical soaking, or only chemical soaking may be performed.

Alternatively, the permeate soaking described with reference to FIG. 3 may be performed in place of chemical soaking. In this case, the permeate 52b is fed into the spiral wound membrane module 100 from the permeate side through the pipe 29 as wash water, so that the spiral wound membrane module 100 is filed with the permeate 52b and sealed for soaking the spiral wound membrane element 1 therein. Thus, contaminants adhering to the membrane surface of the spiral wound membrane element 1 can be effectively separated.

While the wash water is fed from the permeate side through the pipe 28 connected to the permeate outlet 14 (FIG. 1) of the spiral wound membrane module 100 in the aforementioned chemical soaking and permeate soaking, the wash water may alternatively be fed from the raw water side through the pipe 25 connected to the raw water inlet 13 (FIG. 1) of the spiral wound membrane module 100. When the wash water is fed from the raw water side for chemical soaking, the chemical may be injected from the chemical injector 105.

In the aforementioned treatment system, the time for performing filtration running is preferably set to at least 3 minutes. If the filtration running time is shorter than 3 minutes, the frequency of back wash reverse filtration is so increased that filtration efficiency is reduced.

The time for performing back wash reverse filtration is preferably set to at least 10 seconds and up to 5 minutes at the maximum. If the back wash reverse filtration time is shorter than 10 seconds, contaminants adhering to the membrane surface of the spiral wound membrane element 1 etc. cannot be sufficiently separated. In general, the back wash reverse filtration time is 2 to 3 minutes.

The time for performing chemical soaking is preferably set to at least 10 minutes. If the chemical soaking time is shorter than 10 minutes, it is difficult to sufficiently separate contaminants adhering to the membrane surface of the spiral wound membrane element 1 etc. and to sufficiently inhibit microorganisms etc. from propagating on the membrane surface etc.

The time for performing permeate soaking is preferably set to at least 3 minutes. If the permeate soaking time is shorter than 3 minutes, it is difficult to sufficiently separate contaminants adhering to the membrane surface of the spiral wound membrane element 1 etc.

Therefore, the timer is so set as to satisfy the aforementioned conditions, for controlling the operations for opening/closing the valves 30a to 30f of the units 151 and 152.

While the chemical injector 103 injects the chemical into the permeate 52b when feeding the permeate 52b containing the chemical to the spiral wound membrane module 100 in washing in the aforementioned treatment system, the chemical may alternatively be directly injected into the permeate 52b stored in the washing permeate tank 104 for previously preparing wash water containing the chemical in prescribed concentration. In this case, the chemical concentration in the wash water can be correctly controlled.

While the permeate 52b is employed as the wash water in the aforementioned back wash reverse filtration, chemical soaking and permeate soaking, permeate equivalent water such as pure water, purified water, ion-exchange water or service water may be employed in place of the permeate 52b.

The permeate equivalent water may be stored in a tank for wash water for feeding the permeate equivalent water taken from the tank for wash water from the permeate side of the spiral wound membrane module 100 through the pipe 28 or from the raw water side of the spiral wound membrane module 100 through the pipe 25. Further, the chemical may be directly injected into the permeate equivalent water stored in the tank for wash water, for previously preparing wash water containing the chemical in prescribed concentration.

In the aforementioned treatment system, back wash reverse filtration is periodically performed by the timer or the like during filtration running of the units 151 and 152 independently of back wash reverse filtration in washing. When the spiral wound membrane module 100 of one of the units 151 and 152 in washing is subjected to back wash reverse filtration or soaking in this case, the spiral wound membrane module 100 of the remaining unit in filtration running may be subjected to back wash reverse filtration. However, the time for back wash reverse filtration in filtration running is short as described above, to hardly influence continuity of filtration running in the treatment system.

While the units 151 and 152 are alternately subjected to filtration running and washing in the aforementioned treatment system, the units 151 and 152 may alternatively be subjected to filtration running in parallel with each other when neither one of the units 151 and 152 is washed. In this case, the timer is so set as to perform filtration running in at least one of the units 151 and 152. When filtration running is performed in both units 151 and 152 in parallel with each other, the timer is so set as not to perform back wash reverse filtration in filtration running at the same time.

While the raw water pressurizing pump 101, the wash water pressurizing pump 102 and the chemical injectors 103 and 105 are provided in common for the units 151 and 152 in the aforementioned treatment system, the raw water pressurizing pump 101, the wash water pressurizing pump 102 and the chemical injectors 103 and 105 may alternatively be provided for each of the units 151 and 152.

While the timer controls the operations for opening/closing the valves 30a to 30f of the units 151 and 152 for switching filtration running and washing at prescribed time intervals in the aforementioned treatment system, the operations for opening/closing the valves 30a to 30f may alternatively be controlled in response to the states of contamination of the spiral wound membrane elements 1 (FIG. 2) of the spiral wound membrane modules 100 in filtration running, for switching the pipes and performing washing.

For example, the operations for opening/closing the valves 30a to 30f of each of the units 151 and 152 are controlled in response to the flow rate for feeding the raw water 51, the pressure for feeding the raw water 51, the flow rate of the permeate 52a, the pressure in the pipe 28 on the permeate side or the pressure difference between the raw water feeding side and the permeate takeout side in filtration running of the spiral wound membrane module 100, for switching filtration running to washing.

In the spiral wound membrane module 100, contaminants contained in the raw water 51 are deposited on the membrane surface of the spiral wound membrane element 1 following filtration running. While back wash reverse filtration is periodically performed in filtration running as described above, contaminants are gradually deposited due to continuous running. Therefore, it is difficult to remove such contaminants by back wash reverse filtration in filtration running. When the spiral wound membrane element 1 is gradually contaminated, the flow rate for feeding the raw water 51, the pressure for feeding the raw water 51, the flow rate of the permeate 52a, the pressure in the pipe 28 on the permeate side or the pressure difference between the raw water feeding side and the permeate takeout side in filtration running of the spiral wound membrane module 100 is changed. Therefore, washing can be efficiently performed by controlling the operations for opening/closing the valves 30a to 30f in response to such change and switching filtration running to washing. Thus, a stable treatment system having high filtration efficiency and reliability is implemented.

The treatment system, formed by the two units 151 and 152 in the above description, may alternatively be formed by at least three units. When the treatment system is formed by at least three units, filtration running is performed at least in one of the units while performing washing in the remaining units. In washing, any of back wash reverse filtration, chemical soaking and permeate soaking may be performed. Back wash reverse filtration, chemical soaking or permeate soaking may be independently performed, or any ones of these operations may be combined with each other. The details of filtration running, back wash reverse filtration, chemical soaking and permeate soaking in each unit are identical to those described with reference to the treatment system shown in FIG. 4.

Another exemplary method of running a spiral wound membrane module according to this embodiment is now described with reference to FIG. 4. FIG. 4 shows a running method in filtration, which is applied to the spiral wound membrane module 100 shown in FIG. 1 also in this example. A running method in washing in this example is similar to the aforementioned running method shown in FIG. 3.

As shown in FIG. 4, the valves 30a, 30e and 30d of the pipes 25, 28 and 27a are opened and the valves 30b, 30c and 30f of the pipes 26, 27 and 29 are closed in filtration.

In this case, the raw water 7 taken from the raw water tank 500 is introduced into the first liquid chamber 18 of the pressure vessel 10 from the raw water inlet 13 through the pipe 25, similarly to the case shown in FIG. 2. Further, the raw water 7 is fed into the spiral wound membrane element 1 from the first end thereof.

As shown in FIG. 5, partial raw water is permeated through the separation membranes 2, flows into the water collection pipe 5 and is discharged from the end of the water collection pipe 5 as the permeate 8 in the spiral wound membrane element 1. The remaining raw water 7a not permeated through the separation membranes 2 is discharged from the second end surface of the spiral wound membrane element 1.

The permeate 8 discharged from the end of the water collection pipe 5 is taken out from the pressure vessel 10 from the permeate outlet 14 through the pipe 28, as shown in FIG. 4. The raw water 7a discharged from the second end surface of the spiral wound membrane element 1 is guided into the second liquid chamber 19 and thereafter taken out from the raw water outlet 15 through the pipe 27a, to be returned to the raw water tank 500. Thus, filtration is performed in the spiral wound membrane module while taking out the partial raw water 7a from the raw water outlet 15 in this example. Thus, retention of any liquid can be suppressed in the clearance between the outer peripheral surface of the spiral wound membrane element 1 and the inner peripheral surface of the pressure vessel 10. Further, an axial flow of the raw water from the first end toward the second end is formed in the spiral wound membrane element 1, whereby partial contaminants can be discharged from the pressure vessel 10 along with the raw water 7a while suppressing sedimentation of contaminants contained in the raw water.

While the valve 30d is regularly opened for taking out the raw water 7a in the above description, the valve 30d may alternatively be intermittently opened for taking out the raw water 7a. Also in this case, the separation membranes 2 can be inhibited from adhesion of contaminants similarly to the case of regularly taking out the raw water 7a.

While the raw water 7a taken out from the pressure vessel 10 is totally returned to the raw water tank 500 in the above description, the raw water 7a taken out may alternatively be partially discharged from the system. For example, the valves 30d and 30c may be opened for partially discharging the raw water 7a from the system through the pipe 27.

Also in this example, back wash reverse filtration is performed with a high back pressure in washing by the running method in washing shown in FIG. 3 while introducing the raw water 31. Thus, contaminants deposited on the separation membranes 2 in filtration can be effectively removed.

According to the running method of this example, as hereinabove described, contaminants deposited on the membrane surfaces can be sufficiently removed, whereby stable running can be performed without reducing the permeate flux over a long period.

Particularly in this example, partial contaminants can be discharged from the pressure vessel 10 along with the raw water 7a while inhibiting contaminants contained in the raw water 7 from sedimenting on the membrane surfaces by taking out the partial raw water 7a from the pressure vessel 10 in filtration as shown in FIG. 4, whereby more stable filtration running can be performed. In this case, the raw water 7a taken out from the raw water outlet 15 is circulated through the pipe 27a, whereby the permeate 8 can be obtained with high recovery. Further, no large pump may be employed for feeding the raw water 7 but the scale of the system can be reduced. Thus, the system cost is reduced.

Also in the method of running the spiral wound membrane module 100 shown in FIG. 4, the fed raw water 7 may contain a chemical having a contaminant separating function or a sterilizing function, as described with reference to FIG. 2. Further, permeate containing a chemical having a contaminant separating function or a sterilizing function may be employed as wash water for back wash reverse filtration. In addition, permeate may be fed into the pressure vessel 10 as wash water from the permeate side or the raw water side for sealing the pressure vessel 10 filled with the permeate and soaking the spiral wound membrane element 1 therein (permeate soaking). Alternatively, permeate containing a chemical having a contaminant separating function or a sterilizing function may be fed into the pressure vessel 10 as wash water from the permeate side or the raw water side for sealing the pressure vessel 10 filled with the permeate and soaking the spiral wound membrane element 1 therein (chemical soaking). Further alternatively, pure water, purified water, ion-exchange water, service water or the like may be employed in place of the permeate in back wash reverse filtration, chemical soaking or permeate soaking. Also in this case, an effect similar to that described above with reference to FIG. 3 can be attained.

While the spiral wound membrane module 100 comprising the single spiral wound membrane element 1 is run in the above, the running method according to the present invention is also applicable to a spiral wound membrane module comprising a plurality of spiral wound membrane elements.

Still another exemplary spiral wound membrane module employed in the treatment system according to this embodiment is described with reference to FIG. 6. The structure of the spiral wound membrane module employed in this treatment system is similar to that of the spiral wound membrane module 100 shown in FIG. 6.

In filtration of the spiral wound membrane module, the valves 60a, 60e and 60f of the pipes 55, 58a and 58b are opened, and the valves 60b, 60g, 60h, 60c and 60d of the pipes 56, 59a, 59b, 57 and 57a are closed.

Raw water 7 taken from the raw water tank 500 is fed into the pressure vessel 110 from the raw water inlet 130 through the pipe 55. In the spiral wound membrane module, the raw water 7 fed from the raw water inlet 130 is introduced into the endmost spiral wound membrane element 1 closer to the end plate 120a from a first end surface thereof. In this spiral wound membrane element 1, partial raw water is permeated through the separation membranes 2 to flow into the water collection pipe 5, and discharged from an end of the water collection pipe 5, as shown in FIG. 6. The remaining raw water 7a not permeated through the separation membranes 2 is discharged from a second end surface. The discharged raw water 7a is introduced into the subsequent spiral wound membrane element 1 from a first end surface thereof, and separated into permeate 8 and raw water 7a similarly to the above. Thus, membrane separation is performed in each of the plurality of spiral wound membrane elements 1 serially connected with each other. In this case, the valves 60c and 60d of the pipes 57 and 57a are closed and hence permeation through the separation membranes 2 is facilitated in each spiral wound membrane element 1, for performing dead end filtration in the spiral wound membrane module similarly to the case shown in FIG. 2.

In the aforementioned filtration process, contaminants contained in the raw water 7 are deposited on the membrane surfaces of the separation membranes 2 of the spiral wound membrane elements 1. Particularly when dead end filtration is performed in the spiral wound membrane module comprising the plurality of spiral wound membrane elements 1 as described above, contaminants are readily deposited on the membrane surfaces of the separation membranes 2. Such deposition of contaminants results in reduction of the water permeation velocity, and hence the contaminants are removed by the following washing:

In washing, the valves 60a, 60e, 60f and 60d of the pipes 55, 58a, 58b and 57a are closed and the valves 60b, 60c, 60g and 60h of the pipes 56, 57, 59a and 59b are opened for performing back wash reverse filtration.

In back wash reverse filtration, wash water 21 is fed to first ends of the water collection pipes 5 closer to the end plate 120a from the permeate outlet 140 through the pipes 59a and 58a. Further, wash water 21 is fed to second ends of the water collection pipes 5 closer to the end plate 120b from the permeate outlet 140 through the pipes 59b and 58b. Thus, the wash water 21 is introduced into the water collection pipes 5 from both ends thereof. The wash water 21 introduced into the water collection pipes 5 is guided into the separation membranes 2 from the outer peripheral surface of the water collection pipe 5 in each spiral wound membrane element 1, and permeated through the separation membranes 2 in a direction opposite to that in filtration. At this time, contaminants deposited on the membrane surfaces of the separation membranes 2 are separated from the separation membranes 2. The wash water 21 permeated through the separation membranes 2 axially flows through the spiral wound membrane element 1 along a raw water spacer 6, and is discharged from both ends of each spiral wound membrane element 1. The discharged wash water 21 is taken out from the raw water inlet 130 and the raw water outlet 131 through the pies 56 and 57 respectively.

In this case, pressures on the sides of the permeate outlets 140, the raw water inlet 130 and the raw water outlet 131 are set to apply a back pressure of 0.05 to 0.3 MPa to the separation membranes 2 of each spiral wound membrane element 1. Thus, a necessary amount of the wash water 21 can be fed in a short time, for effectively separating contaminants deposited on the membrane surfaces of the separation membranes 2. Further, the separated contaminants can be inhibited from being captured by the raw water spacer 6 before the same are discharged from an end of each spiral wound membrane element 1, to be effectively removed.

While the wash water 21 taken out from the raw water inlet 130 is totally discharged from the system as waste water in this example, the wash water 21 may alternatively be partially discharged from the system as waste water and partially recycled as the raw water 7. For example, a further pipe may be provided downstream the valve 60b of the pipe 56 and connected to the raw water tank 500, thereby partially returning the wash water 21 to the raw water tank 500.

While the wash water 21 taken out from the raw water outlet 131 is totally discharged from the system as waste water in this example, the wash water 21 may alternatively be partially discharged from the system as waste water and partially recycled as the raw water 7. For example, the valves 60c and 60d of the pipes 57 and 57a may be opened for partially returning the wash water 21 to the raw water tank 500 through the pipe 57a.

While wash water 21 is taken out from the raw water inlet 130 and the raw water outlet 131 through the pipes 56 and 57 respectively in back wash reverse filtration in the example shown in FIG. 6, the pressures on the sides of the permeate outlets 140 and the raw water inlet 130 may alternatively be so set that the wash water 21 is taken out from the raw water inlet 130 through the pipe 56. In this case, the valve 60c of the pipe 57 and the raw water outlet 131 are closed. Further alternatively, the pressures on the sides of the permeate outlets 140 and the raw water outlet 131 may be so set that the wash water 21 is taken out from the raw water outlet 131 through the pipe 57. In this case, the valve 60b of the pipe 56 and the raw water inlet 130 are closed.

After performing back wash reverse filtration in the aforementioned manner, the valves 60b, 60g and 60h of the pipes 56, 59a and 59b are closed and the valve 60a of the pipe 55 is opened. Thus, raw water 31 taken from the raw water tank 500 is fed into the pressure vessel 110 from the raw water inlet 130 through the pipe 55. The raw water 31 is introduced into each spiral wound membrane element 1 from the first end thereof, axially flows through the spiral wound membrane element 1 along the raw water spacer 6 and is thereafter discharged from the second end. Thus, contaminants separated from the separation membrane 2 are carried from the first end toward the second end of the spiral wound membrane element 1 by the raw water 31, and discharged from the second end of the spiral wound membrane element 1 along with the wash water 21 remaining in the spiral wound membrane element 1. Further, contaminants and the wash water 21 are taken out from the pressure vessel 110 from the raw water outlet 131 through the pipe 57 along with the raw water 31.

Therefore, the contaminants separated from the separation membranes 2 in each spiral wound membrane element 1 can be quickly discharged from the system by performing flushing of feeding the raw water 31 in the same direction as that in filtration after back wash reverse filtration. Thus, the contaminants separated from the separation membranes 2 can be prevented from adhering to the separation membranes 2 again.

While flushing of axially feeding the raw water 31 is performed after back wash reverse filtration in this example, the former may alternatively be performed before the latter. According to this washing method, most contaminants captured on the membrane surface of the spiral wound membrane element 1 are removed by flushing, and contaminants remaining on the membrane surface of the spiral wound membrane element 1 can be removed by further introducing the wash water 21. Therefore, an effect similar to that of the aforementioned back wash reverse filtration can be attained also in this case.

Further alternatively, the raw water 31 may be axially fed in parallel with back wash reverse filtration. For example, the valves 60a, 60b, 60c, 60g and 60h of the pipes 55, 56, 57, 59a and 59b may be simultaneously opened in washing for feeding the wash water 21 from the permeate side while feeding the raw water 31 from the raw water side. In this case, an effect similar to that attained when feeding the raw water 31 after back wash reverse filtration as described above can be attained.

While the raw water 31 is fed from the raw water inlet 130 and taken out from the raw water outlet 131 in this example, raw water may alternatively be fed from the raw water outlet 131 and taken out from the raw water inlet 130 to be fed in the direction opposite to that in filtration in each spiral wound membrane element 1. In this case, an effect similar to that attained when feeding the raw water 31 in the same direction as that in filtration as described above can be attained. Further alternatively, raw water may be successively fed in the same direction as and in the opposite direction to that in filtration. In this case, contaminants distributed along the overall spiral wound membrane element 1 can be homogeneously removed and discharged.

While the raw water 31 taken out from the raw water outlet 131 is totally discharged from the system as waste water in this example, the raw water 31 may alternatively be partially discharged from the system as waste water and partially recycled as the raw water 7. For example, the valves 60c and 60d of the pipes 57 and 57a may be opened for partially returning the raw water 31 to the raw water tank 500 through the pipe 57a.

According to the aforementioned running method in washing, contaminants deposited on the separation membranes 2 in filtration can be effectively removed.

According to this running method, as hereinabove described, contaminants deposited on the membrane surfaces can be sufficiently removed, whereby running can be stably performed while maintaining a high permeate flux also in dead end filtration readily causing deposition of contaminants on the membrane surfaces, for efficiently obtaining the permeate 8. In this case, dead end filtration is performed, whereby no large pump may be employed for feeding the raw water 7 but the scale of the system can be reduced. Thus, the system cost is reduced.

Also in the spiral wound membrane module 100 shown in FIG. 6, the fed raw water 7 or the permeate employed as the wash water 21 in back wash reverse filtration may contain a chemical having a contaminant separating function or a sterilizing function, similarly to the spiral wound membrane module 100 shown in FIG. 1. Further, the permeate may be fed into the pressure vessel 110 as wash water from the permeate side or the raw water side in washing for sealing the pressure vessel 110 filled with the permeate and soaking each spiral wound membrane element 1 therein (permeate soaking). Alternatively, permeate containing a chemical may be fed into the pressure vessel 110 as wash water from the permeate side or the raw water side for sealing the pressure vessel 110 filled with the permeate and soaking each spiral wound membrane element 1 therein (chemical soaking). Further alternatively, pure water, purified water, ion-exchange water or service water may be employed in back wash reverse filtration, chemical soaking or permeate soaking in place of the permeate. Also in this case, an effect similar to that described above with reference to FIG. 3 can be attained.

The structure of the treatment system employing the aforementioned spiral wound membrane modules 100 is similar to that of the treatment system shown in FIG. 10 except the pipes 28 for taking out the permeate 52a shown in FIG. 10 are provided also on the permeate outlets 140 on the raw water inlet sides. A plurality of units each comprising the spiral wound membrane modules 100 shown in FIG. 6 are connected in parallel with each other to form the treatment system. When at least one of the units is washed in such a treatment system, filtration running is performed on the remaining unit(s) similarly to the treatment system shown in FIG. 10. Thus, filtration running can be continuously performed, while the module 100 having spiral wound membrane elements 1 recovered in membrane function by washing can be regularly used for filtration running. Therefore, an extremely practical and useful system is implemented.

In filtration of the spiral wound membrane module 100 shown in FIG. 6, for example, the valve 60d of the pipe 57a may be regularly or intermittently opened for taking out the partial raw water 7a, in the raw water 7 fed into the pressure vessel 110, not permeated through the separation membranes 2 of the spiral wound membrane element 1 from the pressure vessel 110 from the raw water outlet 131 through the pipe 57a to be returned to the raw water tank 500. Thus, retention of any liquid can be suppressed in the clearance between the outer periphery of each spiral wound membrane element 1 and the inner peripheral surface of the pressure vessel 110. Further, an axial flow of the raw water is formed from the first end toward the second end in each spiral wound membrane element 1, whereby partial contaminants can be discharged from the pressure vessel 110 along with the raw water 7a while suppressing sedimentation of contaminants contained in the raw water.

According to this running method performing filtration while partially taking out the raw water, more stable running is enabled without reducing the permeate flux over a long period. In this case, the raw water 7a taken out is circulated through the pipe 57a, whereby the permeate 8 can be obtained with high recovery. Further, no large pump is required for feeding the raw water 7 but the scale of the system can be reduced. Thus, the system cost is reduced.

Also in the spiral wound membrane module 100 according to this embodiment, the separation membranes have the structure shown in FIG. 7.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of running a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprising a step of feeding a raw liquid containing a chemical having a contaminant separating function or a sterilizing function from at least one end of said spiral wound membrane element and taking out a permeated liquid from at least one opening end of said perforated hollow pipe in running.

2. The method of running a spiral wound membrane element according to claim 1, wherein said chemical is sodium hypochlorite, chloramine, hydrogen peroxide, peracetic acid or ozone.

3. The method of running a spiral wound membrane element according to claim 1, wherein said raw liquid contains a flocculant.

4. The method of running a spiral wound membrane element according to claim 1, further comprising a step of introducing a washing liquid containing a chemical having a contaminant separating function or a sterilizing function from at least one opening end of said perforated hollow pipe and discharging the washing liquid derived from the outer peripheral surface of said perforated hollow pipe from at least one end of said spiral wound membrane element in washing thereby performing back wash reverse filtration on said separation membrane with a back pressure higher than 0.05 MPa and not more than 0.3 MPa.

5. The method of running a spiral wound membrane element according to claim 4, wherein said washing solution is a permeated liquid.

6. The method of running a spiral wound membrane element according to claim 1, further comprising a step of feeding a washing liquid containing a chemical having a contaminant separating function or a sterilizing function from at least one end of said spiral wound membrane element and axially feeding the washing liquid containing a chemical through said spiral wound membrane element in washing.

7. The method of running a spiral wound membrane element according to claim 6, wherein said washing liquid is a raw liquid.

8. The method of running a spiral wound membrane element according to claim 1, wherein said separation membrane is formed by bonding a permeable membrane body to a surface of a porous sheet member, and said permeable membrane body is bonded to said surface of said porous sheet member in an anchored state.

9. A method of running a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprising a step of introducing a washing liquid containing a chemical having a contaminant separating function or a sterilizing function from at least one end of said perforated hollow pipe and discharging the washing liquid derived from the outer peripheral surface of said perforated hollow pipe from at least one end of said spiral wound membrane element thereby performing back wash reverse filtration on said separation membrane with a back pressure higher than 0.05 MPa and not more than 0.3 MPa.

10. The method of washing a spiral wound membrane element according to claim 9, further comprising a step of regularly or periodically feeding a washing liquid containing a chemical from at least one end of said spiral wound membrane element in parallel with back wash reverse filtration performed by introducing the washing liquid containing a chemical from at least one opening end of said perforated hollow pipe.

11. The method of washing a spiral wound membrane element according to claim 9, further comprising a step of soaking said spiral wound membrane element in said washing liquid containing a chemical.

12. The method of washing a spiral wound membrane element according to claim 9, wherein said chemical is sodium hypochlorite, chloramine, hydrogen peroxide, sulfuric acid, hydrochloric acid, nitric acid, sodium hydroxide, peracetic acid, isopropyl alcohol, oxalic acid or citric acid.

13. A method of washing a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprising a step of feeding a washing liquid containing a chemical having a contaminant separatiang function or a sterilizing function from at least one end of said spiral wound membrane element and axially feeding the washing liquid containing a chemical through said spiral wound membrane element.

14. The method of washing a spiral wound membrane element according to claim 13, further comprising a step of regularly or periodically feeding a washing liquid containing a chemical from at least one end of said spiral wound membrane element in parallel with back wash reverse filtration performed by introducing the washing liquid containing a chemical from at least one opening end of said perforated hollow pipe.

15. A method running a spiral wound membrane module, comprising a pressure vessel having a raw liquid inlet and one or a plurality of spiral wound membrane elements stored in said pressure vessel, each spiral wound membrane element comprising an envelope separation membrane wound on the outer peripheral surface of a perforated hollow pipe and allowing back wash reverse filtration with a back pressure higher than 0.05 MPa and not more than 0.3 MPa, comprising a step of feeding a raw liquid containing a chemical having a contaminant separating function or a sterilizing function from at least one end of said spiral wound membrane element through said raw liquid inlet of said pressure vessel and taking out a permeated liquid from at least one opening end of said perforated hollow pipe in running.

16. A method of washing a spiral wound membrane module, comprising a pressure vessel and one or a plurality of spiral wound membrane elements stored in said pressure vessel, each spiral wound membrane element comprising an envelope separation membrane wound on the outer peripheral surface of a perforated hollow pipe and allowing back wash reverse filtration with a back pressure higher than 0.05 MPa and not more than 0.3 MPa, comprising a step of introducing a washing liquid containing a chemical having a contaminant separating function or a sterilizing function from at least one opening end of said perforated hollow pipe and discharging the washing liquid derived from the outer peripheral surface of said perforated hollow pipe from at least one end of said spiral wound membrane element for taking out the washing liquid from said pressure vessel thereby performing back wash reverse filtration on said separation membrane with a back pressure higher than 0.05 MPa and not more than 0.3 MPa.

17. A method of washing a spiral wound membrane module, comprising a pressure vessel and one or a plurality of spiral wound membrane elements stored in said pressure vessel, each spiral wound membrane element comprising an envelope separation membrane wound on the outer peripheral surface of a perforated hollow pipe and allowing back wash reverse filtration with a back pressure higher than 0.05 MPa and not more than 0.3 MPa, comprising a step of feeding a washing liquid containing a chemical having a contaminant separating function or a sterilizing function from at least one end of said spiral wound membrane element, axially feeding the washing liquid containing a chemical through said spiral wound membrane element and taking out the washing liquid from said pressure vessel.

18. A method of running a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprising a step of temporarily stopping running and holding said spiral wound membrane element in a state soaked in a liquid for a prescribed time in a running period.

19. The method of running a spiral wound membrane element according to claim 18, wherein said step of temporarily stopping running includes steps of:
feeding a raw liquid from an end of said spiral wound membrane element and taking out a permeated liquid from at least one opening end of said perforated hollow pipe in filtration running in said running period, and
stopping said filtration running and holding said spiral wound membrane element in said state soaked in the liquid for said prescribed time.

20. The method of running a spiral wound membrane element according to claim 19, wherein said step of temporarily stopping running further includes a step of restarting said filtration running after holding said spiral wound membrane element in said state soaked in the liquid for said prescribed time.

21. The method of running a spiral wound membrane element according to claim 19, wherein said step of temporarily stopping running further includes a step of holding said spiral wound membrane element in said state soaked in the liquid for said prescribed time and thereafter introducing a washing liquid from at least one opening end of said perforated hollow pipe and discharging the washing liquid from at least one end of said spiral wound membrane element thereby performing back wash reverse filtration on said separation membrane with a back pressure higher than 0.05 MPa and not more than 0.3 MPa.

22. The method of running a spiral wound membrane element according to claim 19, wherein said step of temporarily stopping running includes a step of holding said spiral wound membrane element in said state soaked in the liquid for said prescribed time and thereafter axially feeding a raw liquid through said spiral wound membrane element thereby performing flushing.

23. The method of running a spiral wound membrane element according to claim 18, wherein said step of temporarily stopping running includes steps of:
introducing a washing liquid from at least one opening end of said perforated hollow pipe and discharging the washing liquid from at least one end of said spiral wound membrane element thereby performing back wash reverse filtration on said separation membrane with a back pressure higher than 0.05 MPa and not more than 0.3 MPa in back wash reverse filtration in said running period, and
stopping said back wash reverse filtration and holding said spiral wound membrane element in said state soaked in the liquid for said prescribed time.

24. The method of running a spiral wound membrane element according to claim 23, wherein said step of temporarily stopping running further includes a step of holding said spiral wound membrane element in said state soaked in the liquid for said prescribed time and thereafter restarting said back wash reverse filtration.

25. The method of running a spiral wound membrane element according to claim 23, wherein said step of temporarily stopping running further includes a step of holding said spiral wound membrane element in said state soaked in the liquid for said prescribed time and thereafter feeding a raw liquid from an end of said spiral wound membrane element and taking out a permeated liquid from at least one opening of said perforated hollow pipe thereby performing filtration running.

26. The method of running a spiral wound membrane element according to claim 18, wherein said step of temporarily stopping running includes a step of feeding a liquid containing a chemical having a sterilizing function or a contaminant separating function to said spiral wound membrane element and soaking said spiral wound membrane element in said liquid containing said chemical.

27. The method of running a spiral wound membrane element according to claim 18, wherein said separation membrane is formed by bonding a permeable membrane body to a surface of a porous sheet member, and said permeable membrane body is bonded to said surface of said porous sheet member in an anchored state.

28. A method of running a spiral wound membrane module, comprising a pressure vessel having a raw liquid inlet and one or a plurality of spiral wound membrane elements stored in said pressure vessel, each spiral wound membrane element comprising an envelope separation membrane wound on the outer peripheral surface of a perforated hollow pipe and allowing back wash reverse filtration with a back pressure higher than 0.05 MPa and not more than 0.3 MPa, comprising a step of temporarily stopping running in a running period and holding said pressure vessel in a state filled with a liquid and sealed for a prescribed time.

29. The method of running a spiral wound membrane module according to claim 28, wherein said liquid contains a chemical having a sterilizing function or a contaminant separating function.

30. A method of running a treatment system, comprising a plurality of spiral wound membrane modules, connected in parallel with each other, each comprising a pressure vessel having a raw liquid inlet and one or a plurality of spiral wound membrane elements stored in said pressure vessel, each spiral wound membrane element comprising an envelope separation membrane wound on the outer peripheral surface of a perforated hollow pipe and allowing back wash reverse filtration with a back pressure higher than 0.05 MPa and not more than 0.3 MPa, comprising steps of:
- feeding a raw liquid from an end of said spiral wound membrane element through said raw liquid inlet of said pressure vessel of each spiral wound membrane module and taking out a permeated liquid from said pressure vessel from at least one opening end of said perforated hollow pipe in filtration running; and
- performing, when washing any of said plurality of spiral wound membrane modules, said filtration running on at least one of remaining said spiral wound membrane modules.

31. The method of running a treatment system according to claim 30, wherein
said washing includes introducing a washing liquid from at least one opening end of said perforated hollow pipe of each spiral wound membrane module and discharging the washing liquid from at least one end of said spiral wound membrane element for taking out the washing liquid from said pressure vessel thereby performing back wash reverse filtration on said separation membrane with a back pressure higher than 0.05 MPa and not more than 0.3 MPa.

32. The method of running a treatment system according to claim 30, wherein
said washing includes holding said pressure vessel of each spiral wound membrane module in a state filled with the washing liquid for a prescribed time.

33. The method of running a treatment system according to claim 32, wherein
said washing liquid is a permeated liquid or water equivalent to a permeated liquid.

34. The method of running a treatment system according to claim 32, wherein
said washing liquid contains a chemical having a contaminant separating function or a sterilizing function.

35. The method of running a treatment system according to claim 32, wherein
said washing includes introducing said washing liquid into said pressure vessel through said raw liquid inlet.

36. The method of running a treatment system according to claim 32, wherein
said washing includes introducing said washing liquid into said pressure vessel from at least one opening end of said perforated hollow pipe.

37. The method of running a treatment system according to claim 30, further comprising steps of:
- connecting a raw liquid feeding pipe and a washing liquid discharge pipe to said raw liquid inlet of each spiral wound membrane module while connecting a permeated liquid takeout pipe and a washing liquid feeding pipe to at least one opening end of said perforated hollow pipe, inserting a first valve in said raw liquid feeding pipe, inserting a second valve in said washing liquid discharge pipe, inserting a third valve in said permeated liquid takeout pipe and inserting a fourth valve in said washing liquid feeding pipe, and
- switching said filtration running and said washing of each spiral wound membrane module through an operation of opening/closing said first, second, third and fourth valves.

* * * * *